United States Patent
Kii et al.

(10) Patent No.: US 8,122,355 B2
(45) Date of Patent: Feb. 21, 2012

(54) INFORMATION PROCESSING APPARATUS, INFORMATION PROCESSING METHOD, INFORMATION PROCESSING PROGRAM AND RECORDING MEDIUM

(75) Inventors: Manabu Kii, Tokyo (JP); Makoto Imamura, Tokyo (JP); Shinichi Iriya, Kanagawa (JP); Shinji Kimura, Tokyo (JP); Yasuhiro Habara, Tokyo (JP)

(73) Assignee: Sony Corporation, Tokyo (JP)

( * ) Notice: Subject to any disclaimer, the term of this patent is extended or adjusted under 35 U.S.C. 154(b) by 392 days.

(21) Appl. No.: 11/640,275

(22) Filed: Dec. 18, 2006

(65) Prior Publication Data

US 2007/0229518 A1 Oct. 4, 2007

(30) Foreign Application Priority Data

Dec. 28, 2005 (JP) ................................. 2005-377374

(51) Int. Cl.
*G06F 3/00* (2006.01)
(52) U.S. Cl. ........................................ 715/716; 715/741
(58) Field of Classification Search .................. 715/741, 715/716
See application file for complete search history.

(56) References Cited

U.S. PATENT DOCUMENTS

| | | | |
|---|---|---|---|
| 2004/0041836 A1* | 3/2004 | Zaner et al. | 345/751 |
| 2005/0262186 A1* | 11/2005 | Szeto et al. | 709/203 |
| 2006/0012715 A1* | 1/2006 | Abe | 348/584 |
| 2007/0203984 A2* | 8/2007 | AlHusseini et al. | 709/205 |

FOREIGN PATENT DOCUMENTS

| | | |
|---|---|---|
| JP | 2001-075711 | 3/2001 |
| JP | 2002-163102 | 6/2002 |
| JP | 2004-040687 | 2/2004 |
| JP | 2004-289360 | 10/2004 |
| JP | 2006-518507 | 8/2006 |
| WO | WO 2004/075169 A2 | 9/2004 |
| WO | WO 2004/097635 | 11/2004 |

* cited by examiner

*Primary Examiner* — Tuyetlien Tran
(74) *Attorney, Agent, or Firm* — Finnegan, Henderson, Farabow, Garrett & Dunner, L.L.P.

(57) ABSTRACT

Disclosed herein is an information processing apparatus including: a display unit; a communication unit for carrying out a communication with an external apparatus; a reproduction unit for reproducing a content; and a control unit for executing control to change a predetermined display screen appearing on the display unit on the basis of whether or not the content being reproduced by the reproduction unit is a content acquired through the communication unit.

10 Claims, 39 Drawing Sheets

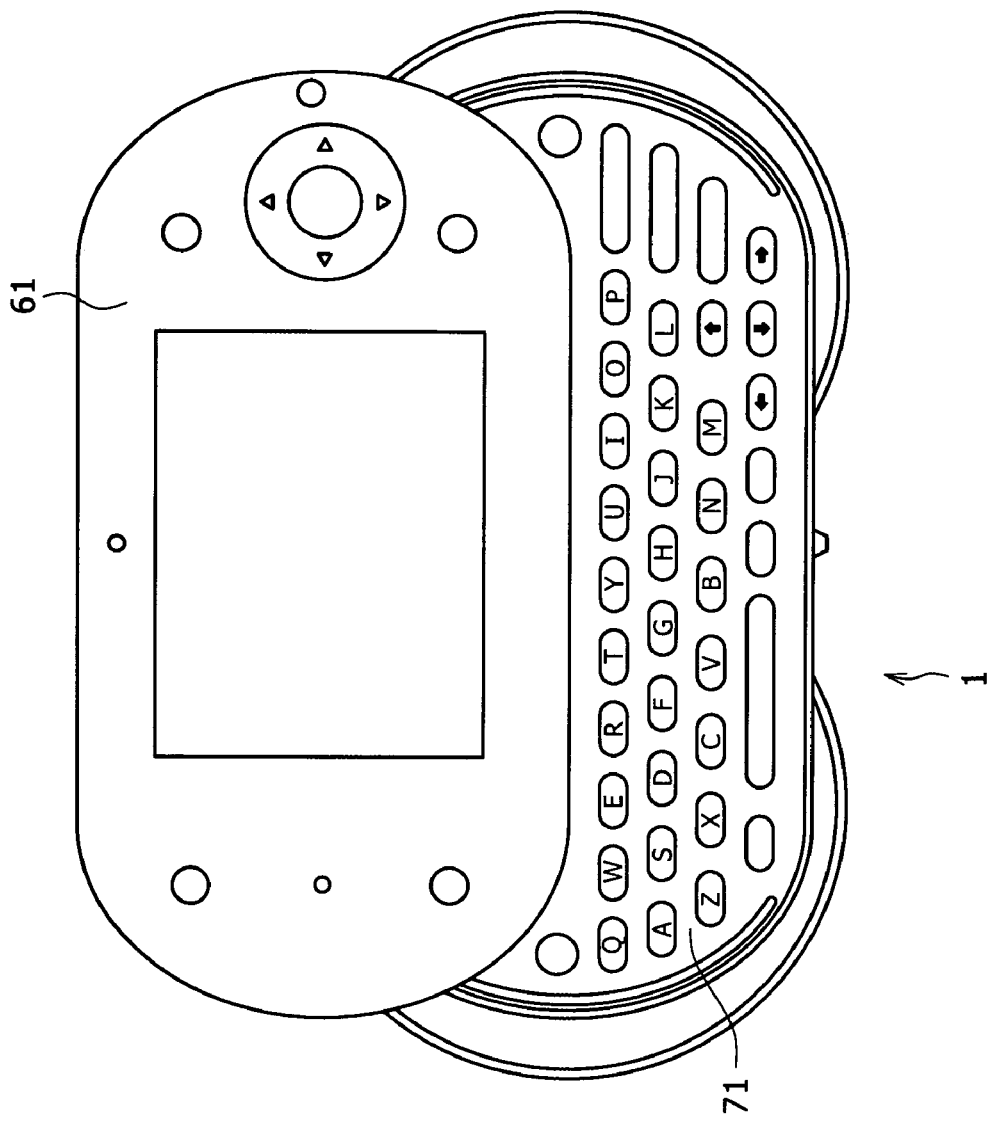

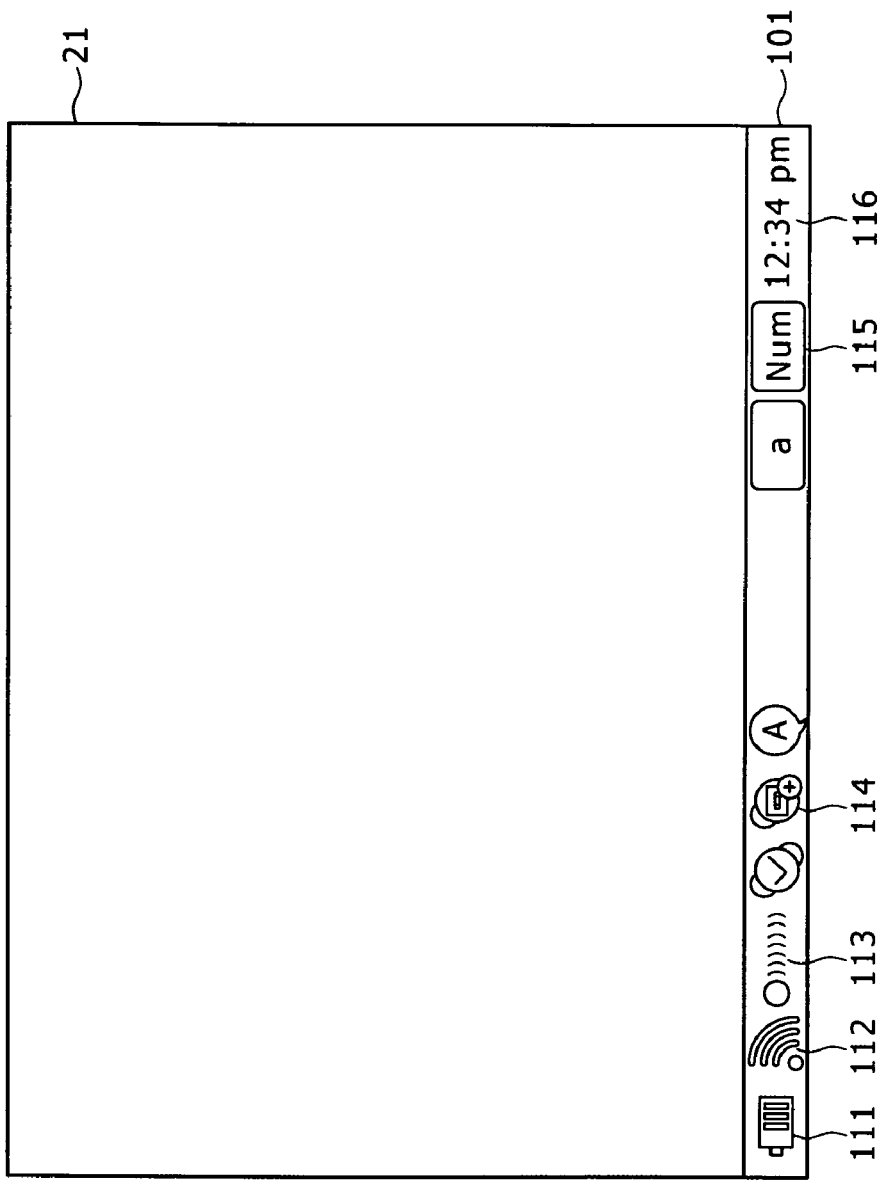

FIG.10

| ITEM | DESCRIPTION |
|---|---|
| BATTERY RESIDUAL CHARGE DISPLAY | SHOWS THE AMOUNT OF CHARGE REMAINING IN THE BATTERY. TYPICAL DISPLAYS ARE 0%, 25%, 50%, 75% AND 100%. WHEN THE BATTERY IS BEING CHARGED, AN ANIMATION INDICATING A BATTERY STATE OF BEING ELECTRICALLY CHARGED IS DISPLAYED. |
| WLAN STRENGTH DISPLAY | SHOWS THE STRENGTH OF THE WLAN. FOR EXAMPLE, THIS DISPLAY SHOWS THE STRENGTH OF THE WLAN AT 4 STAGES, i. e., 0, 1, 2 AND 3. |
| WLAN STATE DISPLAY | SHOWS THE MODE AND CONNECTION STATE OF THE WLAN. TYPICAL MODES OF THE WLAN INCLUDE AN OFF MODE, AN INFRASTRUCTURE MODE AND AN AD-HOC MODE WHEREAS THE CONNECTION STATE OF THE WLAN CAN BE A CONNECTED STATE OR AN OFFLINE STATE. |
| IP TELEPHONE STATE DISPLAY (IN THE WLAN INFRASTRUCTURE MODE) | SHOWS THE STATE OF AN IP TELEPHONE APPLICATION. |
| INSTANT MESSENGER STATE DISPLAY (IN THE WLAN INFRASTRUCTURE MODE) | SHOWS THE STATE OF AN INSTANT MESSENGER APPLICATION. |
| AD-HOC APPLICATION STATE DISPLAY (IN THE WLAN AD-HOC MODE) | SHOWS INFORMATION ON THE CONNECTION OF AN APPLICATION UTILIZING AN AD-HOC CONNECTION. |
| KEYBOARD INPUT MODE DISPLAY | SHOWS THE MODE OF A SPECIAL KEY ON THE KEYBOARD. THE SPECIAL KEYS CAN BE ALT, NUM, SHIFT OR Fn. IN THE CASE OF HOLD, A HOLD MARK IS DISPLAYED. |
| CLOCK DISPLAY | SHOWS A CLOCK. |

FIG.22

Text Editor.Album Comments

Love her or loathe her, uber-diva Jennifer Lopez knows how to deliver on record. She understands how to make the most of her limited vocal range, choosing to surround herself with able producers Rodney Jerkins, Timbaland, Big Boi and Cory Rooney, who oversaw Lopez's first

| about | as | ask | book |

X   about   as   ask   book

12:34 pm

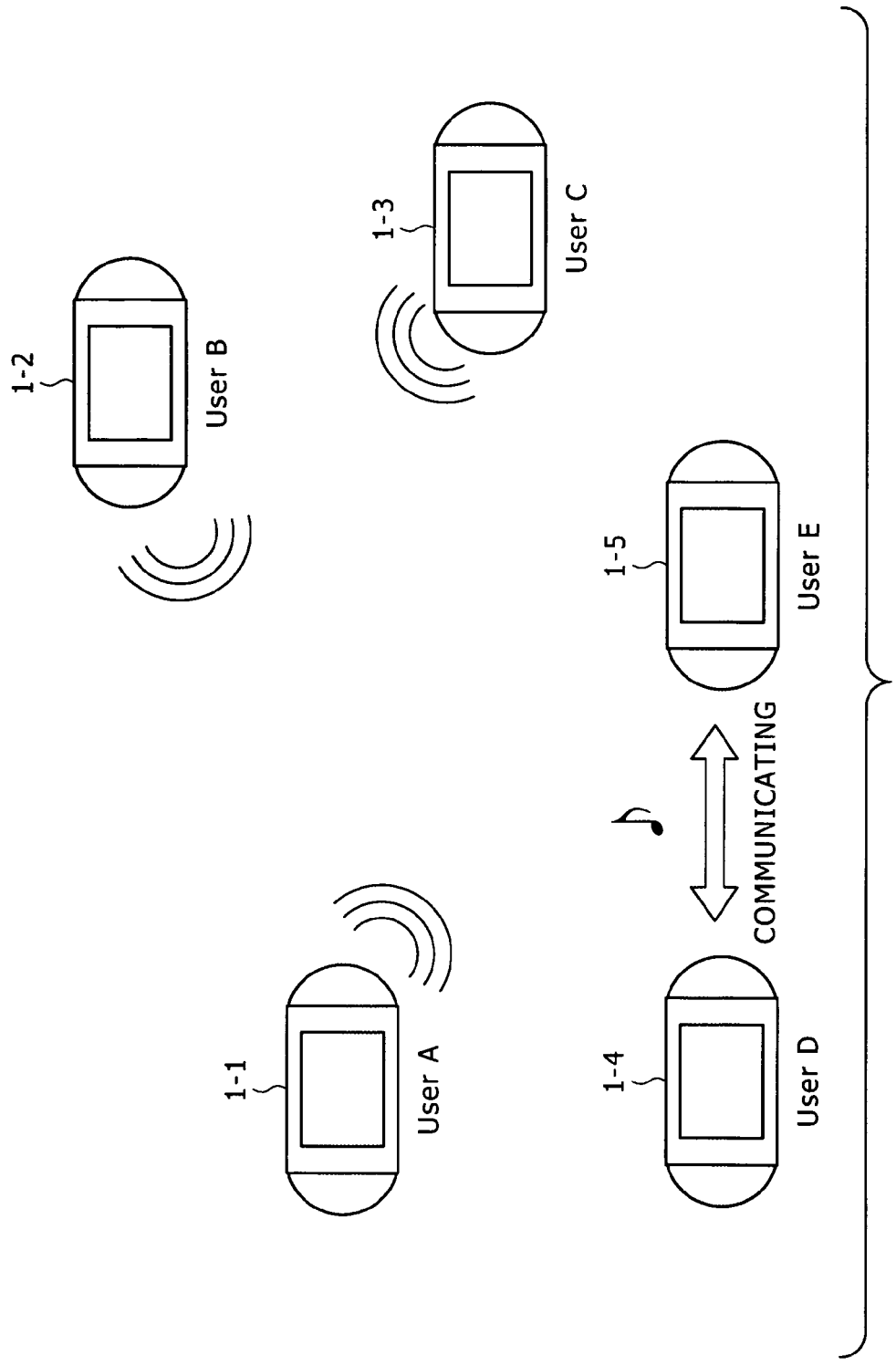

FIG.24

| ITEM | DESCRIPTION |
|---|---|
| UNIQUE IP ADDRESS/PORT OF THIS STATION | IP ADDRESS AND PORT NUMBER |
| UNIQUE ID OF THIS STATION | UNIQUE ID OF THE APPARATUS |
| USER ID | ID OF THE USER WITH A SET PROFILE |
| CONNECTION/DISCONNECTION INFORMATION | BUSY, READY OR THE LIKE |
| INFORMATION ON MUSIC BEING REPRODUCED | MUSIC TITLE AND ARTIST NAME |
| SEQUENCE NUMBER AND OBJECT HANDLE OF MUSIC BEING REPRODUCED | INFORMATION REQUIRED IN STREAMING REPRODUCTION OF MUSICAL DATA WITH A PROTECTED COPYRIGHT |
| OTHER INFORMATION ON A REPRODUCTION STATE OR THE LIKE | |
| USER TEXT MEMO | TEXT MEMO ENTERED BY THE USER |

FIG. 26

| ITEM | DESCRIPTION |
|---|---|
| APPARATUS ID | APPARATUS UNIQUE ID |
| USER ID | ID OF A USER WITH A SET PROFILE |
| TEXT MEMO | TEXT DATA ENTERED BY THE USER FOR REGISTERING |
| FACE ICON | 96×96 BITMAP |
| USER-COLOR INFORMATION | COLOR SET BY THE USER AS A COLOR OF THE USER (36 COLORS) |
| COMMUNICATION APPLICATION ID | ID OF A COMMUNICATION APPLICATION |
| IM ID | ID OF AN INSTANT MESSENGER |

INFORMATION PROCESSING APPARATUS, INFORMATION PROCESSING METHOD, INFORMATION PROCESSING PROGRAM AND RECORDING MEDIUM

CROSS REFERENCES TO RELATED APPLICATIONS

The present invention contains subject matter related to Japanese Patent Application JP 2005-377374, filed in the Japanese Patent Office on Dec. 28, 2005, the entire contents of which being incorporated herein by reference.

BACKGROUND OF THE INVENTION

1. Field of the Invention

The present invention relates to an information processing apparatus, an information processing method, an information processing program and a recording medium. More particularly, the present invention relates to an information processing apparatus suitable for communications of information among a plurality of apparatus and capable of carrying out such communications, as well as relates to an information processing method adopted by the information processing apparatus, a program implementing the information processing method and a recording medium used for recording the program.

2. Description of the Related Art

Accompanying progress of the contemporary technologies, an information communication terminal capable of carrying out a streaming reproduction process is developed.

During a streaming reproduction process carried out by an information communication terminal capable of carrying out a streaming reproduction process, for example, the information communication terminal normally displays a reproduction screen showing information introducing a content being reproduced and information indicating the reproduction state of the information communication terminal.

SUMMARY OF THE INVENTION

In the case of the conventional information communication terminal, however, the reproduction screen is uniform. To be more specific, for example, the background color of the reproduction screen does not change in accordance with an apparatus serving as a source supplying a content being reproduced in the streaming reproduction process.

Addressing the problem described above, inventors of the present invention have developed an information communication terminal capable of, for example, changing the background color of the reproduction screen in accordance with an apparatus serving as a source supplying a content being reproduced in the streaming reproduction process.

In accordance with a first embodiment of the present invention, there is provided an information processing apparatus. The apparatus includes: a display section; a communication section for carrying out a communication with an external apparatus; a reproduction section for reproducing a content; and a control section for executing control to change a predetermined display screen appearing on the display section on the basis of whether or not the content being reproduced by the reproduction section is a content acquired through the communication section.

It is possible to provide the information processing apparatus with a configuration in which the control section changes the predetermined display screen appearing on the display section also on the basis of setting information of a user owning the external apparatus.

It is possible to provide the information processing apparatus with a configuration in which the predetermined display screen is a content reproduction display screen showing information on a content being reproduced by the reproduction section.

It is possible to provide the information processing apparatus with a configuration in which: the setting information of a user includes information on a color; and the control section controls the display section to change the background color of a specific area of the content reproduction display screen on the basis of the information on a color.

It is possible to provide the information processing apparatus with a configuration in which the control section further controls the display section to display at least a portion of the information on a user in an area included in the content reproduction display screen as an area other than the specific area.

It is possible to provide the information processing apparatus with a configuration in which: the setting information of a user includes wallpaper information; and the control section controls the display section to change the wallpaper of a particular area of the content reproduction display screen on the basis of the wallpaper information.

It is possible to provide the information processing apparatus with a configuration in which the control section further controls the display section to display at least a portion of the information on a user in an area included in the content reproduction display screen as an area other than the particular area.

In accordance with a second embodiment of the present invention, there is provided an information processing method including the steps of: reproducing a content; changing a predetermined display screen appearing on a display section on the basis of whether or not the content being reproduced at the content reproducing step is a content acquired through a communication section; and displaying the predetermined display screen changed at the screen changing step on the display section.

In accordance with a third embodiment of the present invention, there is provided a computer-readable program to be executed by a computer to carry out processing including the steps of: reproducing a content; changing a predetermined display screen appearing on a display section on the basis of whether or not the content being reproduced at the content reproducing step is a content acquired through a communication section; and displaying the predetermined display screen changed at the screen changing step on the display section.

It is to be noted that the program described above can be recorded on a recording medium.

In accordance with the information processing apparatus according to the first embodiment of the present invention, the display screen of the apparatus is changed in a way depending on an apparatus serving as a source supplying a content being reproduced in the streaming reproduction process.

BRIEF DESCRIPTION OF THE DRAWINGS

FIG. 8 is a diagram showing the front view of the external appearance of the information communication terminal with its cover slid upward;

FIG. 9 is an explanatory diagram showing a continuous display panel;

FIG. 10 explains pieces of information shown on the continuous display panel;

FIG. 22 is an explanatory diagram referred to in description of a character predictive conversion function;

FIG. 23 is an explanatory diagram referred to in description of communications in an ad-hoc mode;

FIG. 24 is an explanatory diagram referred to in description of pieces of typical information transmitted by an information communication terminal in an ad-hoc mode by adoption of a broadcasting transmission technique;

FIG. 26 is an explanatory diagram referred to in description of typical user information exchanged in a mutual registration process;

DETAILED DESCRIPTION OF THE PREFERRED EMBODIMENTS

Before preferred embodiments of the present invention are explained, relations between disclosed inventions and the embodiments are explained in the following comparative description. This description is intended to ensure that the embodiments according to the present invention conform to the specification and drawings therein. It is to be noted that, even if there is an embodiment described in this specification but not included in the following comparative description as an embodiment corresponding to an invention, such an embodiment is not to be interpreted as an embodiment not corresponding to an invention. Conversely speaking, an embodiment included in the following comparative description as an embodiment corresponding to a specific invention is not to be interpreted as an embodiment not corresponding to an invention other than the specific invention.

In accordance with a first embodiment of the present invention, there is provided an information processing apparatus including: a display section (such as a display unit 21 shown in FIG. 2) for displaying information; a communication section (such as a radio communication module 148 shown in FIG. 11) for carrying out a communication with an external apparatus; and a reproduction section. The apparatus further includes a control section (such as a display control unit 875 shown in FIG. 33) for executing control to change a predetermined display screen appearing on the display section on the basis of whether or not the content being reproduced by the reproduction section is a content acquired through the communication section.

It is possible to provide the information processing apparatus with a configuration in which the control section changes the predetermined display screen appearing on the display section also on the basis of setting information (such as a user name in an example shown in FIG. 36) of a user owning the external apparatus.

Figure 36:
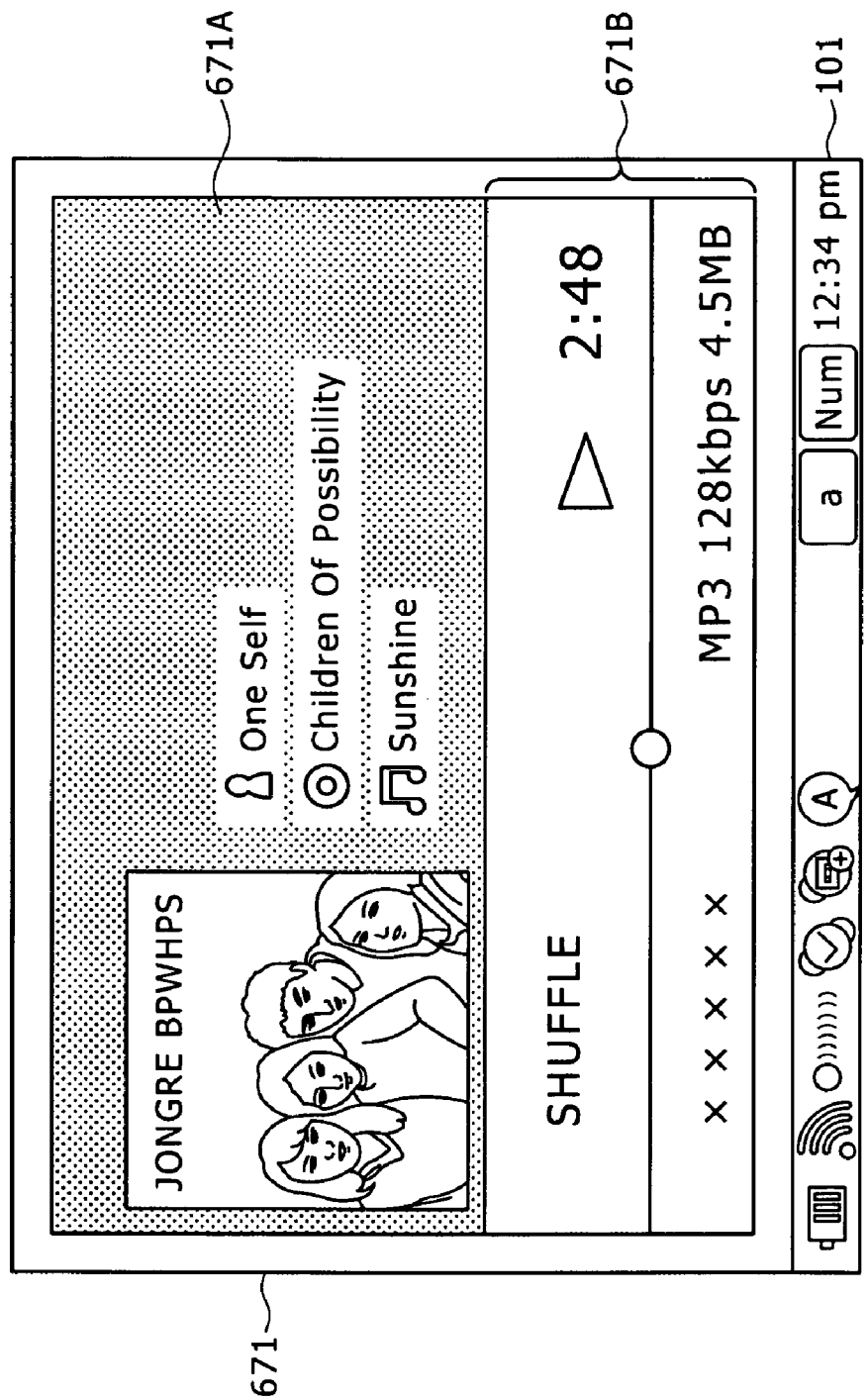
FIG. 36 is an explanatory diagram showing another musical-data reproduction display screen.

It is possible to provide the information processing apparatus with a configuration in which the predetermined display screen is a content reproduction display screen (such as a musical-data reproduction display screen 671 shown in FIG. 36) showing information on a content being reproduced by the reproduction section.

It is possible to provide the information processing apparatus with a configuration in which: the setting information of a user includes information on a color (such as user-color information shown in FIG. 26); and the control section controls the display section to change the background color of a specific area (such as a content-introduction information display area 671A shown in FIG. 36) of the content reproduction display screen on the basis of the information on a color.

It is possible to provide the information processing apparatus with a configuration in which the control section further controls the display section to display at least a portion of the information on a user in an area (such as a content-reproduction information display area 671B shown in FIG. 36) included in the content reproduction display screen as an area other than the specific area.

It is possible to provide the information processing apparatus with a configuration in which: the setting information of a user includes wallpaper information (such as wallpaper information shown in FIG. 26); and the control section controls the display section to change the wallpaper of a particular area (such as the content-introduction information display area 671A shown in FIG. 36) of the content reproduction display screen on the basis of the wallpaper information.

It is possible to provide the information processing apparatus with a configuration in which the control section further controls the display section to display at least a portion of the information on a user in another an area (such as the content-reproduction information display area 671B shown in FIG. 36) included in the content reproduction display screen as an area other than the particular area.

Figure 35:
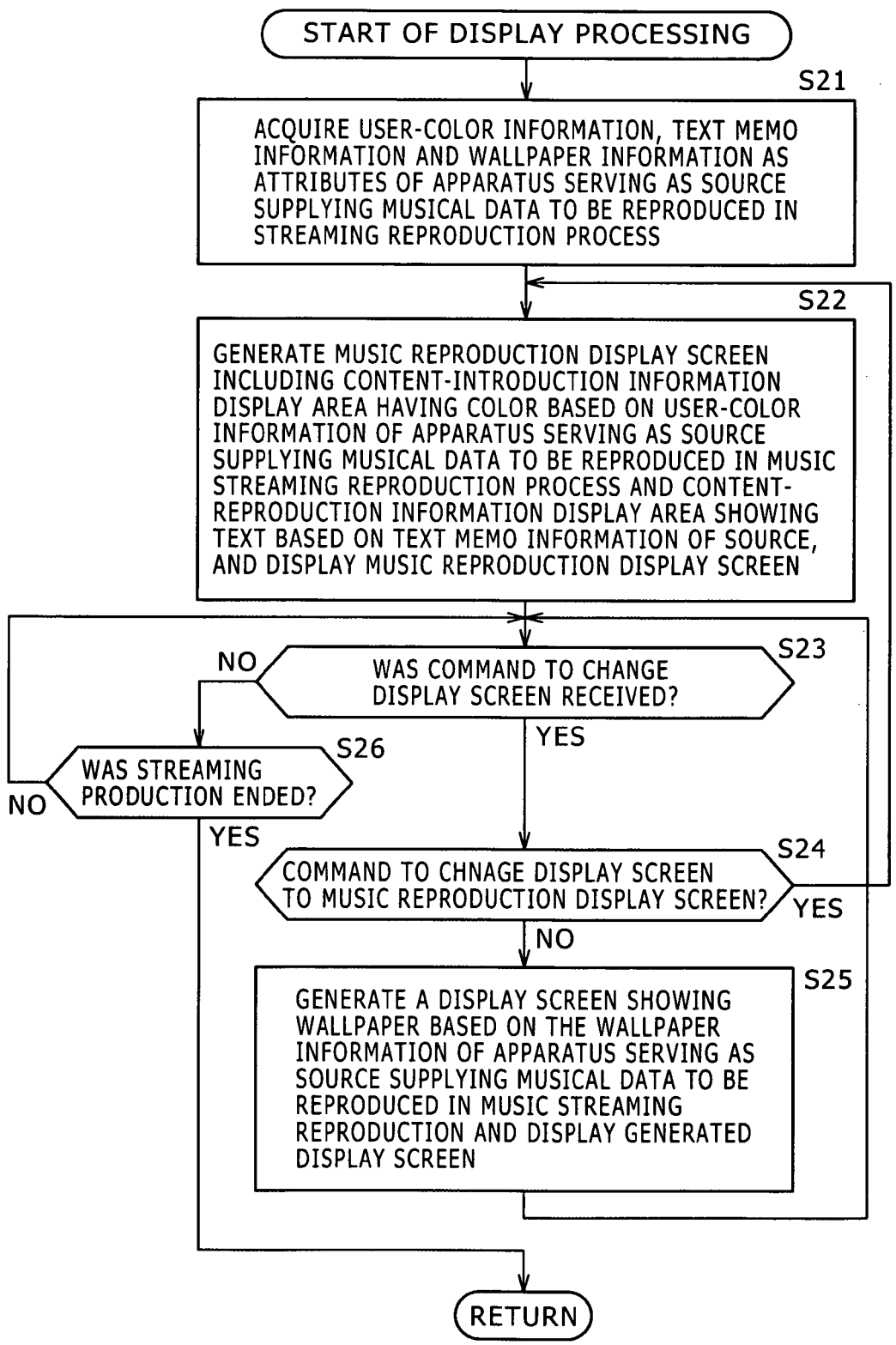
FIG. 35 shows a flowchart referred to in explanation of details of processing carried out at a step S11 of the flowchart shown in FIG. 34.

In accordance with a second embodiment of the present invention, there is provided an information processing method including: a reproducing step for reproducing a content; and a changing step for changing a predetermined display screen appearing on a display section on the basis of whether or not the content being reproduced at the content reproducing step is a content acquired through a communication section (for example at steps of a flowchart shown in FIG. 35). The method further includes a displaying step for displaying the predetermined display screen changed at the screen changing step on the display section (for example at a step S25 of the flowchart shown in FIG. 35).

In accordance with a third embodiment of the present invention, there is provided a computer-readable program to be executed by a computer to carry out processing. The program includes: a reproducing step for reproducing a content; and a changing step for changing a predetermined display screen appearing on a display section on the basis of whether or not the content being reproduced at the content reproducing step is a content acquired through a communication section (for example at the steps of the flowchart shown in FIG. 35). The program further includes a displaying step for displaying the predetermined display screen changed at the screen changing step on the display unit (for example at the step S25 of the flowchart shown in FIG. 35).

The embodiments of the present invention are explained by referring to diagrams as follows.

Figure 1:
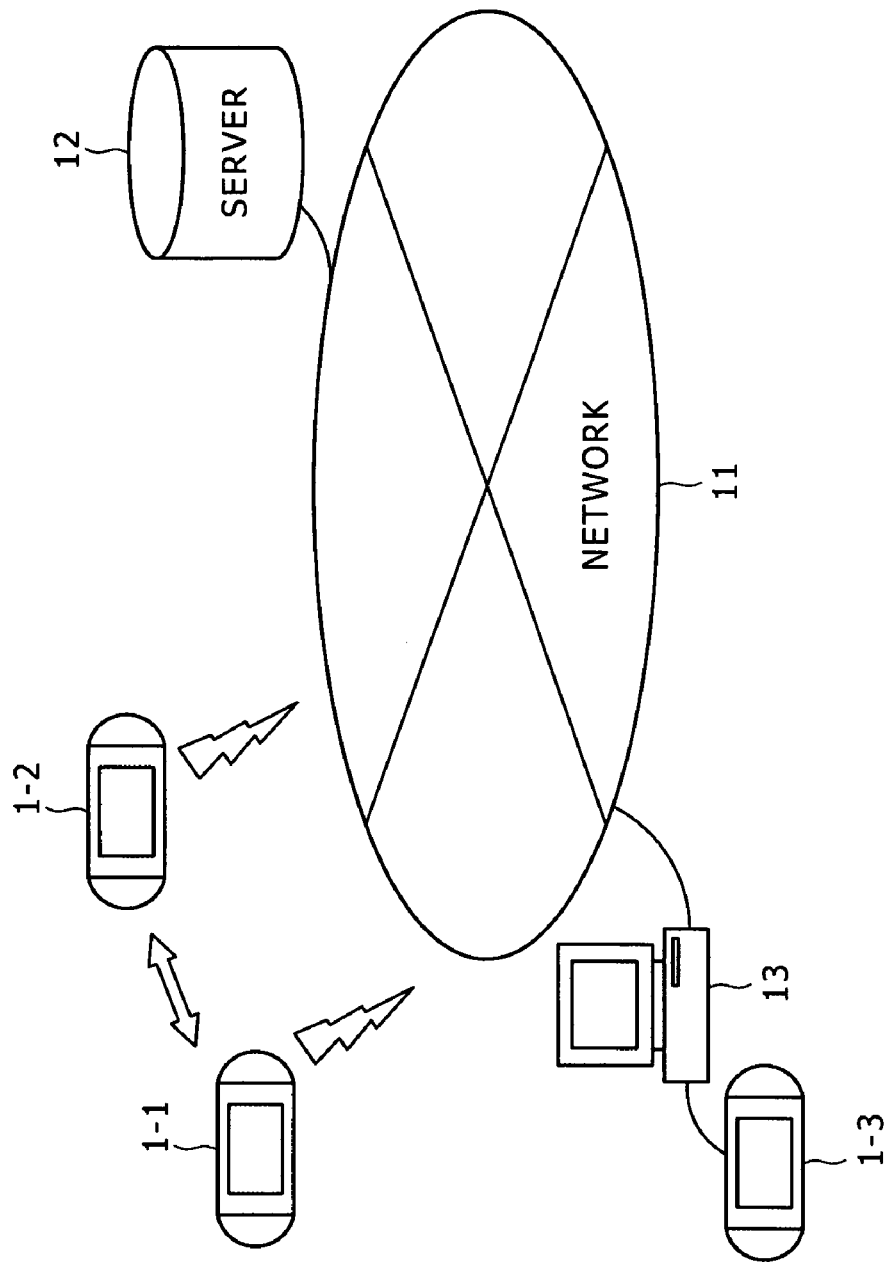
FIG. 1 is an explanatory diagram showing an information communication system including information communication terminals each provided by the present invention.

By referring to FIG. 1, the following description explains an information communication system including information communication terminals 1-1 to 1-3 each provided by the present invention. It is to be noted that the information communication terminals 1-1 to 1-3 shown in FIG. 1 have the same functions.

Typically, the information communication terminals 1-1 to 1-3 each execute a variety of programs in order to carry out a variety of functions such as a function to communicate information through radio or wired communication, a function to record various kinds of information, a function to reproduce audio and video data, a function to display various kinds of information such as recorded information, reproduced video information an GUI (Graphic User Interface) information serving as an aid helping the user enter an operation input via a variety of input devices and a function to receive an operation input entered by the user. In the following description, the information communication terminals 1-1 to 1-3 are each referred to simply as an information communication terminal 1, which is a generic name representing the information communication terminals 1-1 to 1-3, in case there is no need to distinguish the information communication terminals 1-1 to 1-3 from each other.

To put it concretely, the information communication terminal 1 has a WLAN (Wireless Local Area Network meaning a radio LAN) function conforming to typically a 802.11b standard as a function allowing the information communication terminal 1 to be connected to other apparatus and making the information communication terminal 1 capable of exchanging information with the other apparatus. The information communication terminal 1 is capable of selecting either an infrastructure mode or an ad-hoc mode. The WLAN infrastructure mode is a mode in which the information communication terminal 1 carries out a communication with another information communication terminal through an access point in the WLAN. On the other hand, the WLAN ad-hoc mode is a mode in which the information communication terminal 1 carries out a communication with another information communication terminal without using an access point in the WLAN. The information communication terminal 1 can also be connected to another apparatus by using a cable conforming to typically a USB (Universal Serial Bus) 2.0 standard so that the information communication terminal 1 is capable of exchanging information with the other apparatus. It is to be noted that the USB connection of the information communication terminal 1 may be implemented in accordance with either of an MSC (Mass Storage Class) mode and an MTP (Media Transfer Protocol) mode, either of which can be selected as a USB mode.

That is to say, if the information communication terminal 1 is an apparatus subscribing a predetermined service or an apparatus having a predetermined application program installed therein in order to implement predetermined setting, the information communication terminal 1 is capable of exchanging information with or without a predetermined access point with not only another information communication terminal, but also any other apparatus through a radio or wire communication.

Typically, the information communication terminal 1 includes a flash memory having a typical storage capacity of about 1 GB besides an ordinary volatile memory. In addition, if necessary, the information communication terminal 1 may be typically further provided with a large-capacity storage unit such as a hard disk. On top of that, the information communication terminal 1 has an LCD (Liquid Crystal Display) unit serving as a display device and also has a keyboard used as an input device. If necessary, the information communication terminal 1 may also be provided with other connected input devices such as a mouse and/or a joystick. The information communication terminal 1 may also be provided with a touch panel in addition to the LCD unit if required.

In addition, the information communication terminal 1 is capable of recording audio data supplied thereto and reproducing recorded audio data in accordance with an audio coding method such as an ATRAC3 (Advanced Transform Acoustic Coding 3) method, an MP3 (MPEG Audio Layer-3) method or a WMA (Windows (a registered trademark) Media Audio) method. Furthermore, the information communication terminal 1 also has the so-called photo viewer function for storing video data and reproducing as well as displaying the recorded video data. Moreover, the information communication terminal 1 is capable of avoiding operations such as distribution and exchanging of illegal data without a consent given by its copyright holder in accordance with various kinds of DRM (Digital Rights Management) such as OpenMG management or WMT10 (Janus) management.

On top of that, the information communication terminal 1 may have a variety of application programs installed therein as programs to be executed to carry out various kinds of processing. The application programs include an IP telephone program, an instant messenger, an email program, a web browser and a text editor.

Furthermore, the information communication terminal 1 has such a size that the information communication terminal 1 can be grasped by a hand of the user, providing desirable convenience such as portability to the user.

In addition, the information communication terminal 1 can be connected to a network 11 such as the Internet directly by a radio communication so that the information communication terminal 1 is capable of exchanging information with a variety of servers 12, a variety of personal computers 13 and other information communication terminals 1 through the network 11. The other information communication terminals 1 are any of the information communication terminals 1-1 to 1-3 shown in the figure.

Moreover, the information communication terminal 1 is also capable of exchanging information directly with other information communication terminals 1 by a radio communication. The other information communication terminals 1 are any of the information communication terminals 1-1 to 1-3 shown in the figure.

On top of that, the information communication terminal 1 can be connected to the personal computer so that the information communication terminal 1 is capable of exchanging information with the personal computer 13 as well as a variety of servers and other information communication terminals through the network 11 (such as the Internet) connected to the personal computer 13. In the example shown in the figure, the information communication terminal 1-3 is connected to the personal computer 13.

In addition, it is needless to say that the network 11 employed in the information communication system can be connected to more information communication terminals 1, more servers 12 and more personal computers 13.

Figure 2:
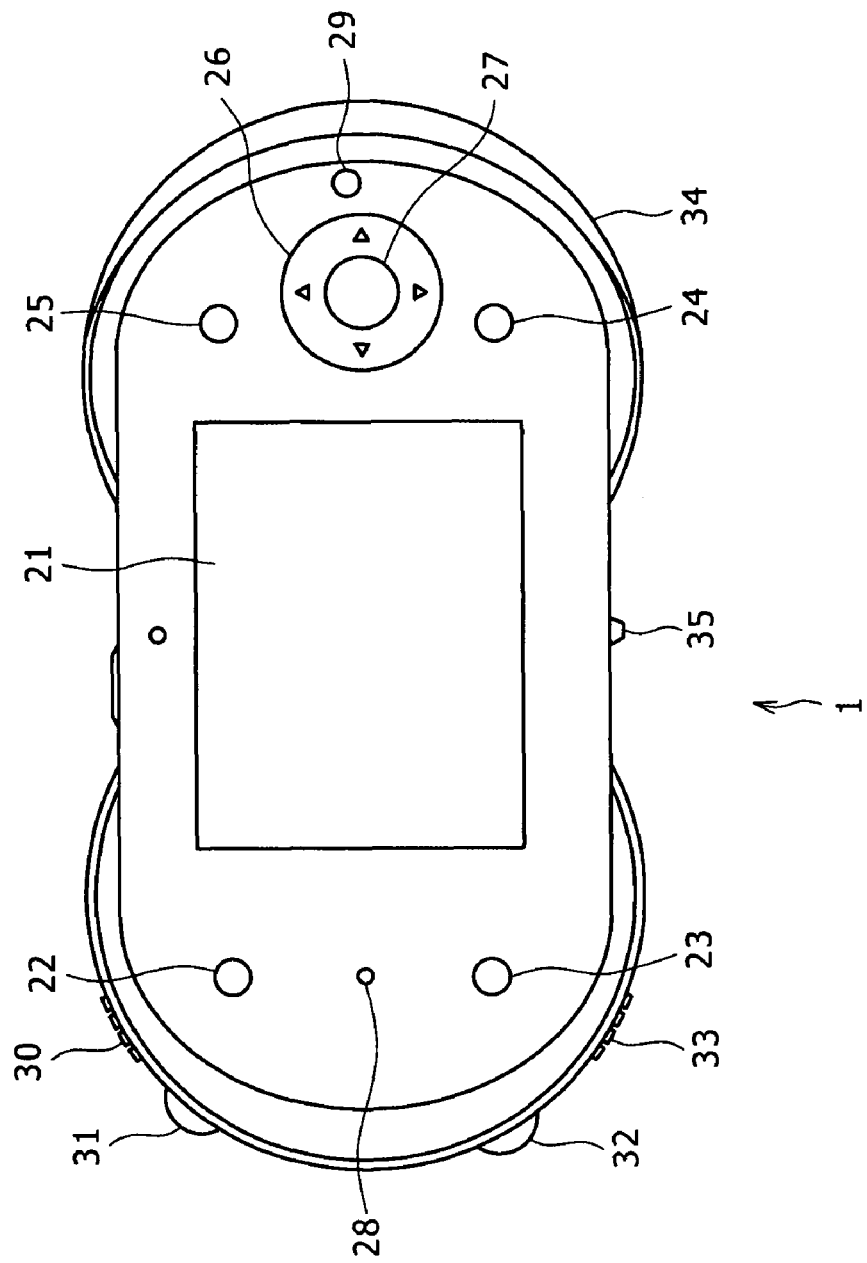
FIG. 2 is a diagram showing the front view of the external appearance of the information communication terminal.

Next, the external appearance of the information communication terminal 1 is explained by referring to FIGS. 2 to 8. FIG. 2 is a diagram showing the front view of the external appearance of the information communication terminal 1.

As shown in the figure, the front face of the information communication terminal 1 has a display unit 21, a WLAN-mode switching button 22, a home button 23, a back button 24, an option button 25, 4-direction keys 26, an enter button 27, a speaker 28 and a mike 29. The left-side face of the information communication terminal 1 includes a WLAN on/off switch 30, a WLAN-state notification light emitting unit 31, a power-supply-state notification light emitting unit 32 and a power-supply switch 33. The left-side face is a face located on the left side when seen from a position facing the display unit 21. The right-side face of the information communication terminal 1 has a communication-state notification light emitting unit 34. The right-side face is a face located on the right side when seen from the position facing the display unit 21. The bottom of the information communication terminal 1 has a music key 35. The bottom is a face located on the lower side when seen from the position facing the display unit 21.

The display unit 21 is typically a flat display unit such as an LCD unit capable of displaying various kinds of information. The information displayed on the display unit 21 includes information on the state of the information communication terminal 1. Displays of the information on the state of the information communication terminal 1 are explained by referring to FIGS. 8 and 9. Other information displayed on the display unit 21 in various kinds of processing carried out by the information communication terminal 1 will also be properly described later.

The WLAN-mode switching button 22 is a button to be operated by the user to enter an operation input for switching the radio LAN on and off.

The home button 23 is a button to be operated by the user to enter an operation input for displaying a home menu on the display unit 21 without regard to the type of information currently displayed on the display unit 21. The home menu will be described later by referring to FIG. 14.

The back button 24 is a button to be operated by the user to enter an operation input for restoring the display screen displayed immediately before the current display screen.

The option button 25 is a button to be operated by the user to enter an operation input for showing a display screen used for displaying a variety of optional tools.

The 4-direction keys 26 are each a key to be operated by the user to enter an operation input for moving typically a cursor over a screen of information displayed on the display unit 21 in one of four directions, changing typically a selected button or a selected icon or carrying out another operation.

The enter button 27 is a button to be operated by the user to enter an operation input for making a final decision to determine a selected menu, a selected button, a selected icon or another selected item.

The speaker 28 is a speaker for outputting voices of a phone conversation such as in an IP telephone call and sounds reproduced by a predetermined application. The sounds reproduced by a predetermined application are audio data recorded in advance in the information communication terminal 1.

The mike 29 is an input component for inputting voices of a phone conversation in an IP telephone call and sounds acquired by a predetermined application.

The WLAN on/off switch 30 is a switch to be operated by the user to switch a radio communication function of the information communication terminal 1 from an enabled state to a disabled state and vice versa.

The WLAN-state notification light emitting unit 31 is typically a light emitting device and a light guide tube or a plurality of light emitting devices and a plurality of light guide tubes. An example of the light emitting device is an LED (light emitting diode). The WLAN-state notification light emitting unit 31 is a component for notifying the user of an enabled state or a disabled state of the radio communication function included in the information communication terminal 1. For example, if the radio communication function included in the information communication terminal 1 is in the enabled state, the WLAN-state notification light emitting unit 31 is turned on to emit light. If the radio communication function included in the information communication terminal 1 is in the disabled state, on the other hand, the WLAN-state notification light emitting unit 31 is turned off to cease transmission of light. In order to turn on the WLAN-state notification light emitting unit 31 or put the WLAN-state notification light emitting unit 31 in a blinking state, the communication-state notification light emitting unit 34 drives the LEDs to emit light through the light guide tubes.

The power-supply-state notification light emitting unit 32 is typically a light emitting device having an LED (light emitting diode) or a plurality of LEDs. The power-supply-state notification light emitting unit 32 is a component for notifying the user of information such as information on whether or not the power supply of the information communication terminal 1 has been turned on and whether the power supply is being electrically charged or the process to electrically charge the power supply has been completed. For example, the power-supply-state notification light emitting unit 32 is put in an on state when the power supply is turned on. When the power supply is turned off, on the other hand, the power-supply-state notification light emitting unit 32 is also put in an off state as well. In addition, when the power supply is being electrically charged, the power-supply-state notification light emitting unit 32 is put in an on state showing a color different from a color, which is shown when the power supply is turned on.

The power-supply switch 33 is a switch for turning the power supply of the information communication terminal 1 on or off.

The communication-state notification light emitting unit 34 is typically a light emitting device having an LED (light emitting diode) or a plurality of LEDs. The communication-state notification light emitting unit 34 is a component for notifying the user of the communication state of the information communication terminal 1. For example, in a WLAN infrastructure mode, the communication-state notification light emitting unit 34 is put in an on state showing a color different from a color, which is shown in a WLAN ad-hoc mode. When an IP telephone call arrives, the communication-state notification light emitting unit 34 is put in either of an on state and a blinking state, which show another color. That is to say, the communication-state notification light emitting unit 34 is put in an off state or either of the on and blinking states showing different colors depending on the radio communication state of the information communication terminal 1.

The WLAN infrastructure mode is a mode adopting a method of communication through a radio LAN access point. On the other hand, the WLAN ad-hoc mode adopting a method to directly exchange data among apparatus without making use of a radio LAN access point.

The music key 35 is a key used for entering an input making a request for an operation such as an operation to start a reproduction process, an operation to end a reproduction operation, a fast-forward operation, a rewind operation, a temporary stop, a reversed-direction AMS (Auto Music Scan) for the beginning of a piece of music or another operation.

Figure 3:
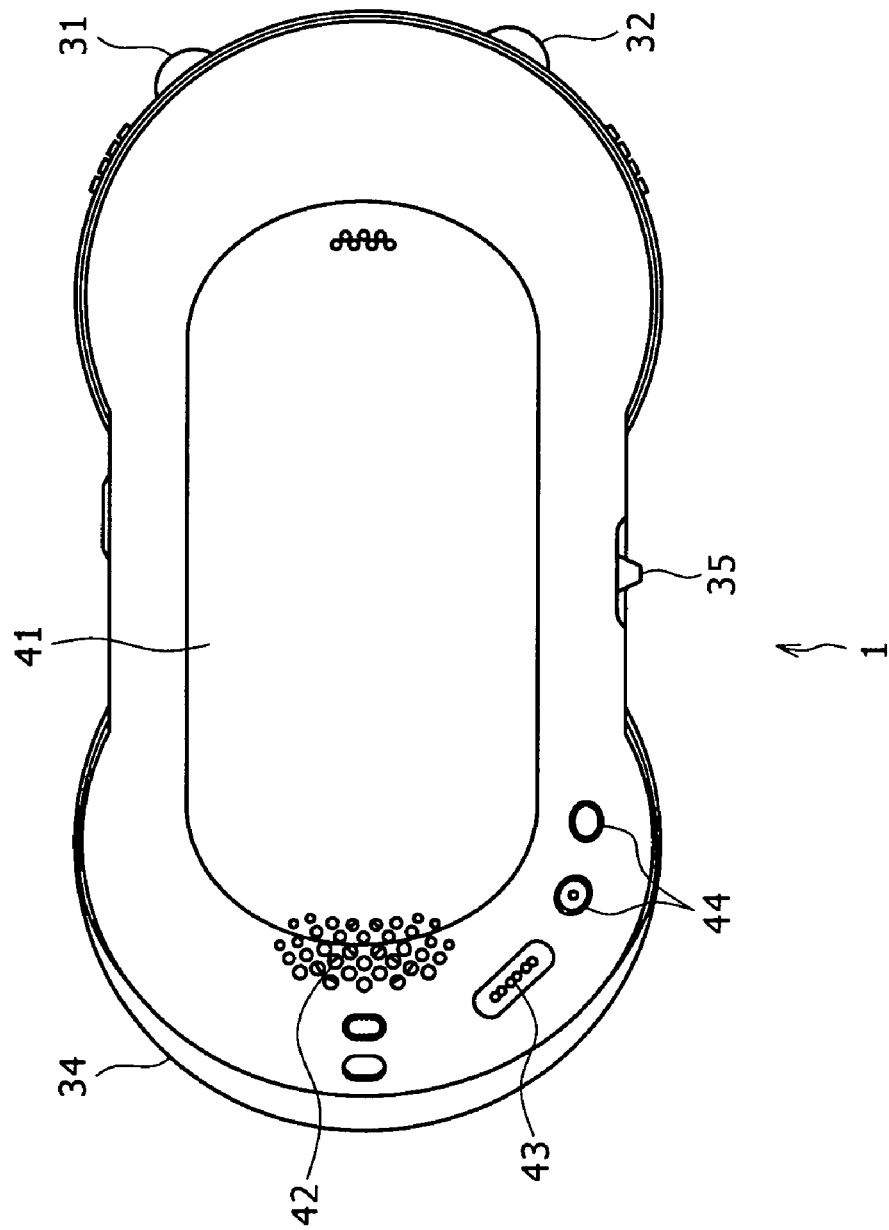
FIG. 3 is a diagram showing the rear view (opposite side to the face on which the display unit is visible) of the external appearance of the information communication terminal.

FIG. 3 is a diagram showing the rear view of the external appearance of the information communication terminal 1. The rear face is the face on the opposite side of the display unit 21.

As shown in the figure, the rear face of the information communication terminal 1 includes a battery cover 41 in addition to a ringer speaker 42, a hold switch 43 and a volume button 44, which are provided on a side in close proximity to the communication-state notification light emitting unit 34.

The battery cover 41 covers a battery mounting portion and a battery for supplying power to a variety of components employed in the information communication terminal 1.

The ringer speaker 42 is a speaker used mainly for outputting musical data stored on and reproduced from the information communication terminal 1 or outputting musical data streamed from another information communication terminal 1. The ringer speaker 42 is also a speaker for outputting, for example, a calling sound in the event of an arriving IP phone call.

The hold switch 43 is a switch to be operated by the user to invalidate inputs entered via all buttons and all switches in order to prevent an operation unintended by the user from being carried out due to an inadvertent operation performed on any of the buttons and switches typically when the information communication terminal 1 is kept in a pocket or a bag.

The volume button 44 is a button to be operated by the user to adjust the volume of a sound output by the ringer speaker 42.

Figure 4:
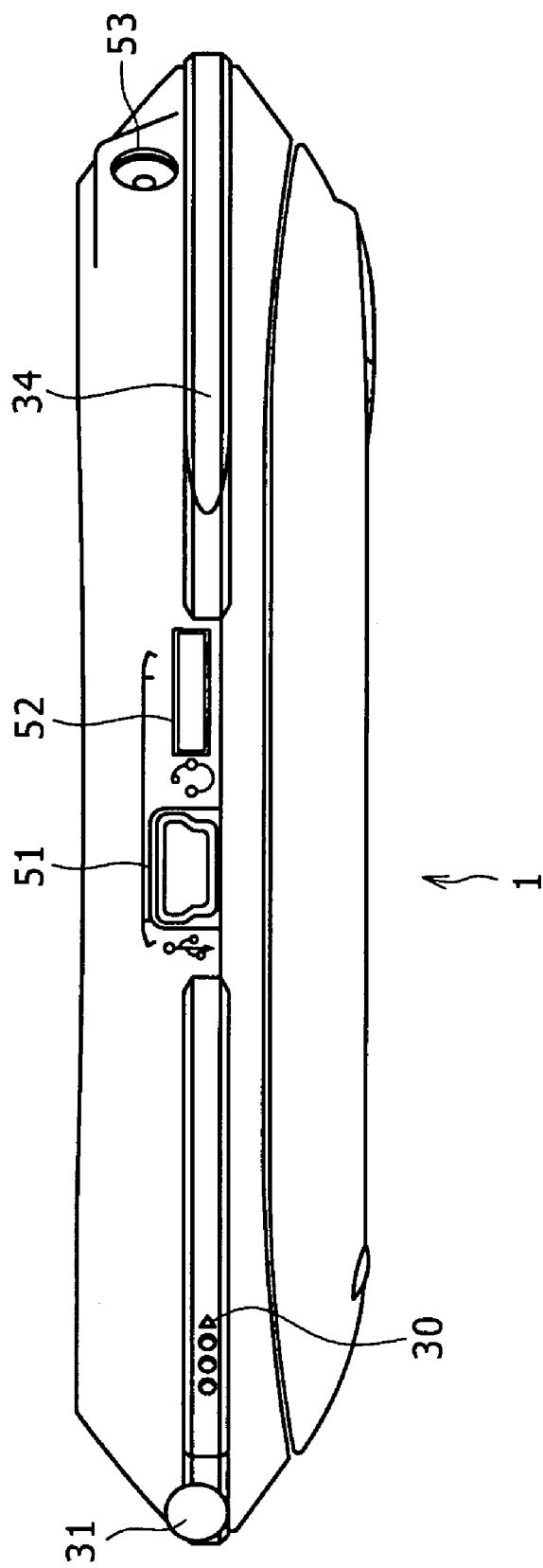
FIG. 4 is a diagram showing the top view of the external appearance of the information communication terminal where the top is defined as the side having a WLAN on/off switch.

FIG. 4 is a diagram showing the top view of the external appearance of the information communication terminal. In this case, the top is defined as the side having the WLAN on/off switch 30.

As shown in the figure, the top of the information communication terminal 1 includes a USB connector 51, a connector jack 52 and a DC jack 53.

A USB cable is connected to the USB connector 51, allowing the information communication terminal 1 to exchange information with another apparatus. As the USB connector 51, it is demanded to provide at least a downstream-side connector, and an upstream-side connector may be provided. The downstream-side connector is the so-called series-B or series-mini-B connector for connecting the information communication terminal 1 to the personal computer 13. On the other hand, the upstream-side connector is the so-called series-A connector for connecting the information communication terminal 1 to a peripheral apparatus. In addition, the information communication terminal 1 can receive a power supply via a USB connection.

The connector jack 52 is typically a 10-pin flat connector for connecting the information communication terminal 1 to an audio input/output device such as a headphone or a mike.

The DC jack 53 is used for receiving power of a DC power supply. In general, the DC jack 53 is connected to an AC/DC converter for converting the 100V AC power generated by the home power supply into a DC power supplied to the information communication terminal 1.

Figure 5:
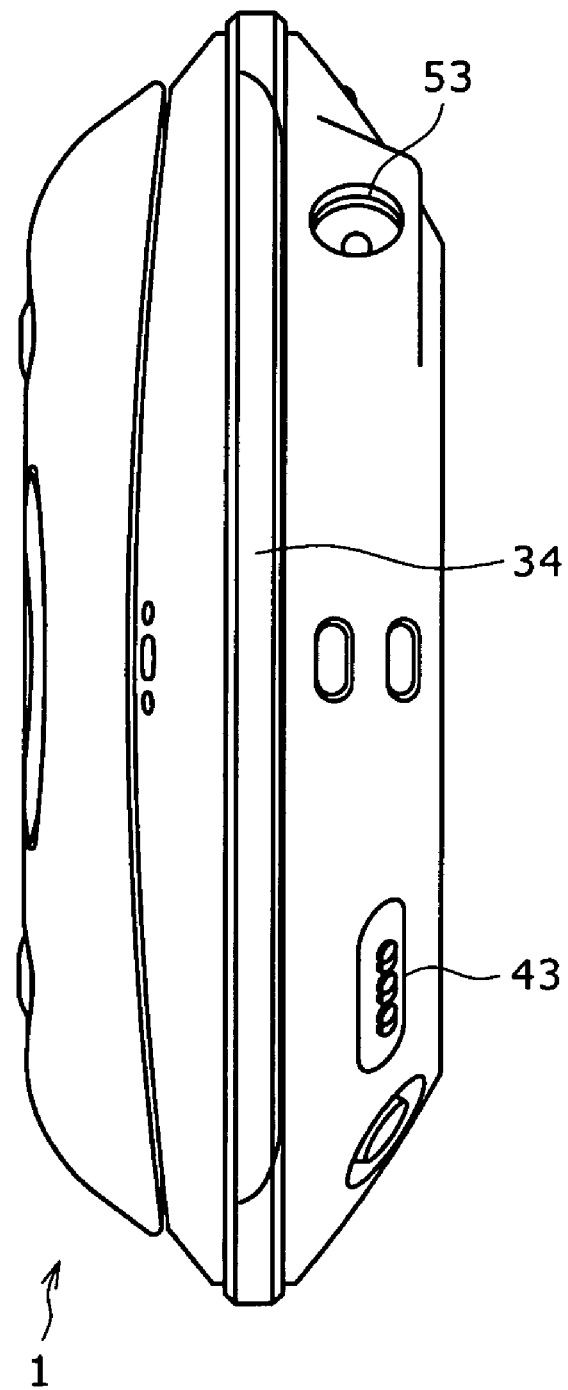
FIG. 5 is a diagram showing the right-side view of the external appearance of the information communication terminal where the right side is defined as the side located in the right when seen from a position at which a display unit of the information communication terminal is visible or, in other words, the right side is defined as the side having a communication-state notification light emitting unit.

FIG. 5 is a diagram showing the right-side view of the external appearance of the information communication terminal 1. In this case, the right side is defined as the side located in the right when seen from a position at which the display unit 21 of the information communication terminal 1 is visible or, in other words, the right side is defined as the side having a communication-state notification light emitting unit 34.

As shown in FIG. 5, the right-side face of the information communication terminal 1 also includes the hold switch 43 and the DC jack 53 in addition to the communication-state notification light emitting unit 34.

Figure 6:
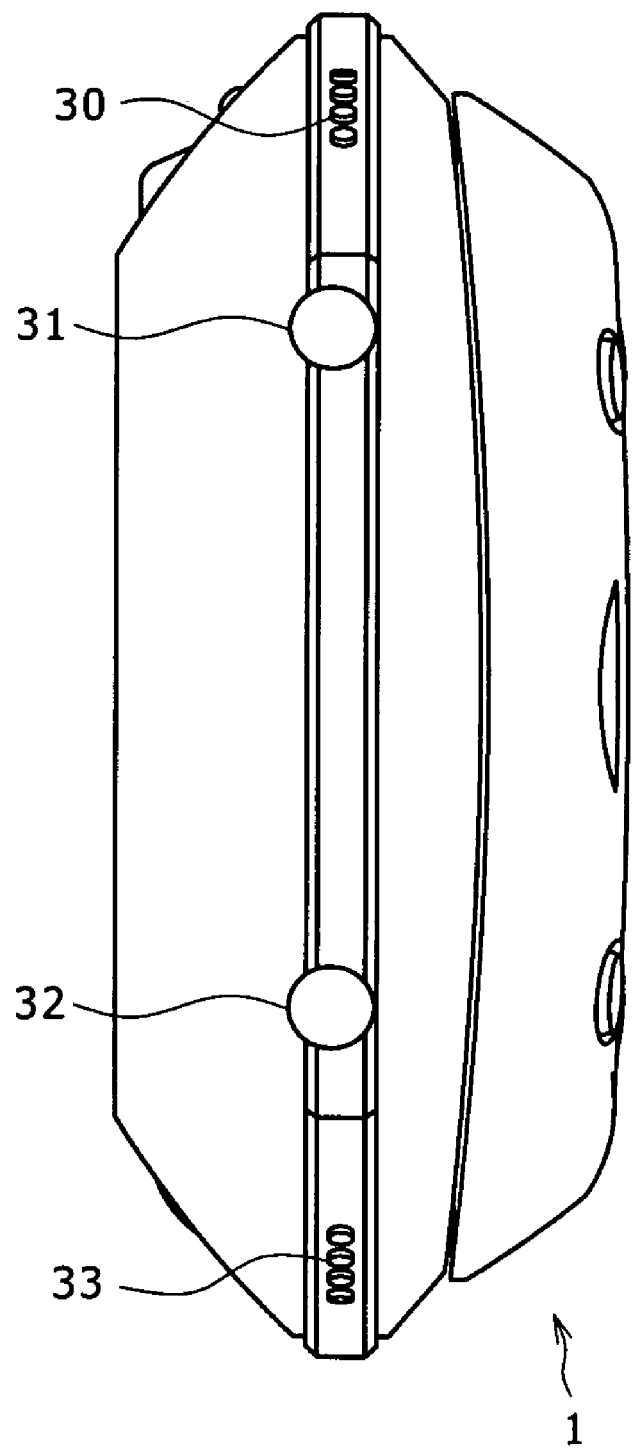
FIG. 6 is a diagram showing the left-side view of the external appearance of the information communication terminal where the left side is defined as the side located in the left when seen from a position at which the display unit of the information communication terminal is visible or, in other words, the right side is defined as the side having the WLAN on/off switch and a power-supply switch.

FIG. 6 is a diagram showing the left-side view of the external appearance of the information communication terminal 1. In this case, the left side is defined as the side located in the left when seen from a position at which a display unit 21 of the information communication terminal 1 is visible or, in other words, the right side is defined as the side having the WLAN on/off switch 30 and the power-supply switch 33.

As shown in FIG. 6, the left-side face of the information communication terminal 1 also includes the WLAN-state notification light emitting unit 31 and the power-supply-state notification light emitting unit 32 in addition to the WLAN on/off switch 30 and the power-supply switch 33.

Figure 7:
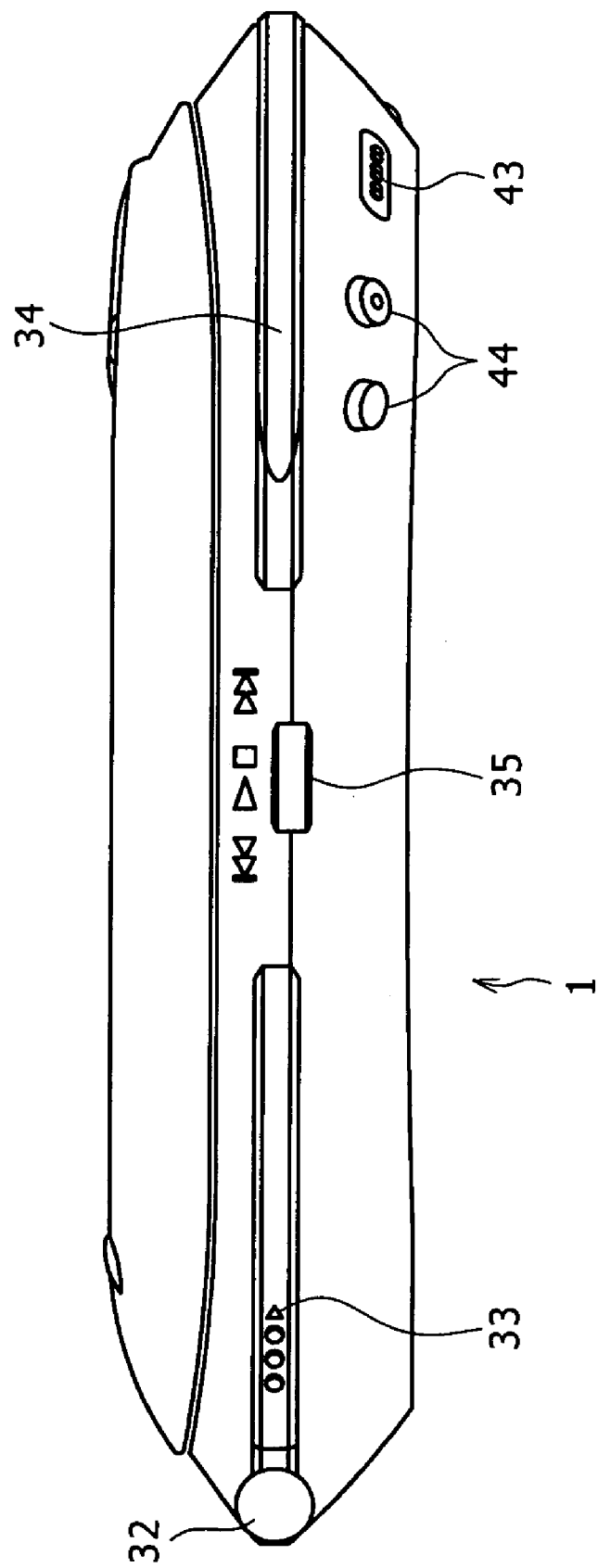
FIG. 7 is a diagram showing the bottom view of the external appearance of the information communication terminal where the bottom is defined as the side having the power-supply switch and a music key.

FIG. 7 is a diagram showing the bottom view of the external appearance of the information communication terminal 1. In this case, the bottom is defined as the side having the power-supply switch 33 and the music key 35.

As shown in FIG. 7, the bottom of the information communication terminal 1 also includes the power-supply-state notification light emitting unit 32, the communication-state notification light emitting unit 34, the hold switch 43 and the volume button 44 in addition to the power-supply switch 33 and the music key 35.

The information communication terminal 1 is configured to allow the cover 61 of the front face to be slid in the upward direction. As described earlier, the cover 61 has the display unit 21, the WLAN-mode switching button 22, the home button 23, the back button 24, the option button 25, the 4-direction keys 26, the enter button 27, the speaker 28 and the mike 29. The upward direction is an upward direction seen at a position in front of the display unit 21. With the cover 61 sled upward, a keyboard 71 is exposed to the user. FIG. 8 is a diagram showing the front view of the external appearance of the information communication terminal 1 with its front cover 61 slid upward.

The following description explains operation inputs related to the power supply and the WLAN as well as the states of the light emitting units explained above by referring to FIGS. 2 to 7.

First of all, with the power supply of the information communication terminal 1 put in an off state, the light emitting units including the power-supply-state notification light emitting unit 32 do not emit light either. Then, let us assume that the power-supply switch 33 is turned on in order to change the state of the power supply from the off state to an on state. In this case, the power-supply-state notification light emitting unit 32 emits light having a predetermined color indicating that the power supply has been put in the on state. In this state, the information communication terminal 1 is capable of accepting a normal operation input entered by the user.

With the power supply of the information communication terminal 1 put in an on state, that is, with the power-supply-state notification light emitting unit 32 put in a state of emitting light having a predetermined color indicating that the power supply has been put in the on state, the WLAN is still in an off state indicated by the WLAN-state notification light emitting unit 31 also being in an off state as well. In order to change the state of the WLAN from the off state to an on state, the user needs to operate the WLAN on/off switch 30. Typically, the WLAN on/off switch 30 is a slide-type switch to be slid in order to put the WLAN in an on or off state. In this case, the user can slide the WLAN on/off switch 30 in a predetermined direction in order to change the state of the WLAN from the off state to an on state. When the user slides the WLAN on/off switch 30 in the predetermined direction in order to change the state of the WLAN from the off state to the on state, the information communication terminal 1 is put in a state of being capable of carrying out a radio communication through the WLAN. In this state, the WLAN-state notification light emitting unit 31 is emitting light.

When the WLAN on/off switch 30 is operated in order to start a radio communication as described above, the information communication terminal 1 gets into a communication mode, which can be a WLAN infrastructure mode or a WLAN ad-hoc mode. Either the WLAN infrastructure or the WLAN ad-hoc mode is selected as the communication mode in accordance with setting. As an alternative, the information communication terminal 1 gets into the WLAN infrastructure mode or the WLAN ad-hoc mode, which was selected last as the communication mode.

The communication-state notification light emitting unit 34 is emitting light having a color determined on the basis of whether the present communication mode of the information communication terminal 1 is the WLAN infrastructure mode or the WLAN ad-hoc mode. In addition, the communication-state notification light emitting unit 34 emits light after the WLAN-state notification light emitting unit 31 emits light without regard to the state of the connection of the information communication terminal 1 to the WLAN. As an alternative, the communication-state notification light emitting unit 34 emits light only after such a connection has been established. On top of that, the communication-state notification light emitting unit 34 may emit light with an intensity determined by the strength of an electric wave received by the information communication terminal 1.

With the power supply of the information communication terminal 1 put in an on state, that is, with the power-supply-state notification light emitting unit 32 put in a state of emitting light having a predetermined color indicating that the power supply has been put in the on state and with the WLAN infrastructure mode selected as the communication mode, whereas the communication-state notification light emitting unit 34 put in a state of emitting light having a predetermined color indicating that the WLAN infrastructure mode has been selected as the communication mode, the user may want to change the communication mode from the WLAN infrastructure mode to the WLAN ad-hoc mode. In this case, the user needs to operate the WLAN-mode switching button 22. For example, the user presses the WLAN-mode switching button 22 downward in order to change the communication mode from the WLAN infrastructure mode to the WLAN ad-hoc mode. As a result, the communication mode is changed from the WLAN infrastructure mode to the WLAN ad-hoc mode indicated by the communication-state notification light emitting unit 34 emitting light with its color changed from the color indicating that the WLAN infrastructure mode has been selected as the communication mode to a predetermined color indicating that the WLAN ad-hoc mode has been selected as the communication mode.

With the WLAN ad-hoc mode selected as the communication mode of the information communication terminal 1, that is, with the WLAN-state notification light emitting unit 31 emitting light and the communication-state notification light emitting unit 34 emitting light having a predetermined color indicating the WLAN ad-hoc mode has been selected as the communication mode of the information communication terminal 1, let us assume that the user wants to switch the communication mode from the WLAN ad-hoc mode to the WLAN infrastructure mode. In this case the user needs to operate the WLAN-mode switching button 22. When the user operates the WLAN-mode switching button 22, the communication mode of the information communication terminal 1 is switched from the WLAN ad-hoc mode to the WLAN infrastructure mode as evidenced by the communication-state notification light emitting unit 34 emitting light with its color changed from the color indicating that the WLAN ad-hoc mode has been selected as the communication mode to a predetermined color indicating that the WLAN infrastructure mode has been selected as the communication mode.

With the power supply of the information communication terminal 1 put in an on state, that is, with the power-supply-state notification light emitting unit 32 put in a state of emitting light having a predetermined color indicating that the power supply has been put in the on state, let us assume that the user wants to turn of the WLAN off. In this case, the user needs to operate the WLAN on/off switch 30. Typically, the WLAN on/off switch 30 is a slide-type switch to be slid in order to put the WLAN in an on or off state. In this case, the user can slide the WLAN on/off switch 30 in a predetermined direction in order to change the state of the WLAN from the on state to an off state. When the user slides the WLAN on/off switch 30 in the predetermined direction in order to change the state of the WLAN from the on state to the off state, the information communication terminal 1 is put in a state of being no longer capable of carrying out a radio communication through the WLAN. In this state, the WLAN-state notification light emitting unit 31 is not emitting light anymore.

If the communication-state notification light emitting unit 34 emits light after the WLAN-state notification light emitting unit 31 emits light without regard to the state of the connection of the information communication terminal 1 to the WLAN, the communication-state notification light emitting unit 34 stops emitting light after the WLAN-state notification light emitting unit 31 ceases to emit light. If the communication-state notification light emitting unit 34 emits light after the connection of the information communication terminal 1 to the WLAN has been established, on the other hand, the communication-state notification light emitting unit 34 stops emitting light after the connection is cut off even if the WLAN is still an on state. The communication-state notification light emitting unit 34 also stops emitting light as the WLAN-state notification light emitting unit 31 ceases to emit light when the WLAN is turned off with the connection of the information communication terminal 1 to the WLAN established.

The power supply can be in one of two different off states. One of the two off state is referred to as a first power-supply off state or a user off state. The power supply is put in the first power-supply off state when the user turns off the power supply and no operation input is entered by the user within three days after the user turns off the power supply. In the first power-supply off state, however, power is supplied to a processor to be described later so that, when the user turns on the power supply with the power supply put in the first power-supply off state, the information communication terminal 1 can be activated immediately.

The other off state is referred to as a second power-supply off state or a deep off state. The power supply is put in the second power-supply off state when the user turns off the power supply and no operation input is entered by the user even after the lapse of three consecutive days since the user turns off the power supply. In the second power-supply off state, no power is supplied to the processor to be described later so that, when the user turns on the power supply with the power supply put in the second power-supply off state, it takes time of a predetermined length such as 30 seconds to put the information communication terminal 1 in a state of being ready for activation.

The information communication terminal 1 can be electrically charged by putting the information communication terminal 1 in a USB-connected state by making use of the USB connector 51 or by supplying DC power to the information communication terminal 1 by way of the DC jack 53. In general, the DC jack 53 is connected to an AC/DC converter for converting the 100V AC power generated by the home power supply into a DC power supplied to the information communication terminal 1. While the information communication terminal 1 is being electrically charged, the power-supply-state notification light emitting unit 32 is emitting light having a predetermined color indicating that the information communication terminal 1 is being electrically charged.

The following description explains the continuous display panel 101, which is basically displayed on the display unit 21 all the time.

As shown in FIG. 9, the continuous display panel 101 appears typically in a predetermined area stretched along the bottom line of the display unit 21. Basically, the continuous display panel 101 appears all the time. The continuous display panel 101 shows various kinds of information such as ones described in FIG. 10 as information on the state of the information communication terminal 1.

For example, the continuous display panel 101 includes a battery residual charge amount display area 111, a WLAN wave-strength display area 112, a WLAN state display area 113, a communication utilization application state display area 114, a keyboard input mode display area 115 and a clock display area 116.

The battery residual charge amount display area 111 is an area for showing information on the amount of electrical charge left in a battery. Typical displays in the battery residual charge amount display area 111 are 0%, 25%, 50%, 75% and 100%. When the battery is being charged, an animation indicating a battery state of being electrically charged is displayed.

The WLAN wave-strength display area 112 is an area for showing information on the strength of the WLAN. To put it concretely, this display typically shows the strength of the WLAN at four stages, i.e., 0, 1, 2 and 3.

The WLAN state display area 113 is an area for showing information on the mode and connection state of the WLAN. To put it concretely, the WLAN state display area 113 typically displays a WLAN mode such as an off mode, the WLAN infrastructure mode and the WLAN ad-hoc mode as well as a WLAN connection state such as a connected state (or a state of being connected) or an offline state.

The communication utilization application state display area 114 is an area for showing information on the state of execution of an Application carrying out a communication in either the WLAN infrastructure mode or the WLAN ad-hoc mode. Specifically, for example, in the WLAN infrastructure mode, if an IP telephone application is executed in order to carrying out a communication, the state of execution of the IP telephone application is shown in the communication utilization application state display area 114. If an instant messenger application is executed in order to carry out a communication in the WLAN infrastructure mode, the communication utilization application state display area 114 shows the state of execution of the instant messenger application. If an application making use of ad-hoc connection is executed in the WLAN ad-hoc mode, on the other hand, the communication utilization application state display area 114 shows connection information of the WLAN ad-hoc mode. An example of the connection information of the WLAN ad-hoc mode is information on whether or not a one-to-one communication is going on.

The keyboard input mode display area 115 is an area for showing information on the input mode of a special key on the keyboard. The special keys include Alt, Num, Shift and Fn. In the case of Hold, a Hold mark is displayed in the keyboard input mode display area 115.

The clock display area 116 is an area for showing information generated by a clock.

Let us keep in mind that it is needless to say that the continuous display panel 101 may also display various kinds of information on the states of the information communication terminal 1 other than the pieces of information described above.

Figure 11:
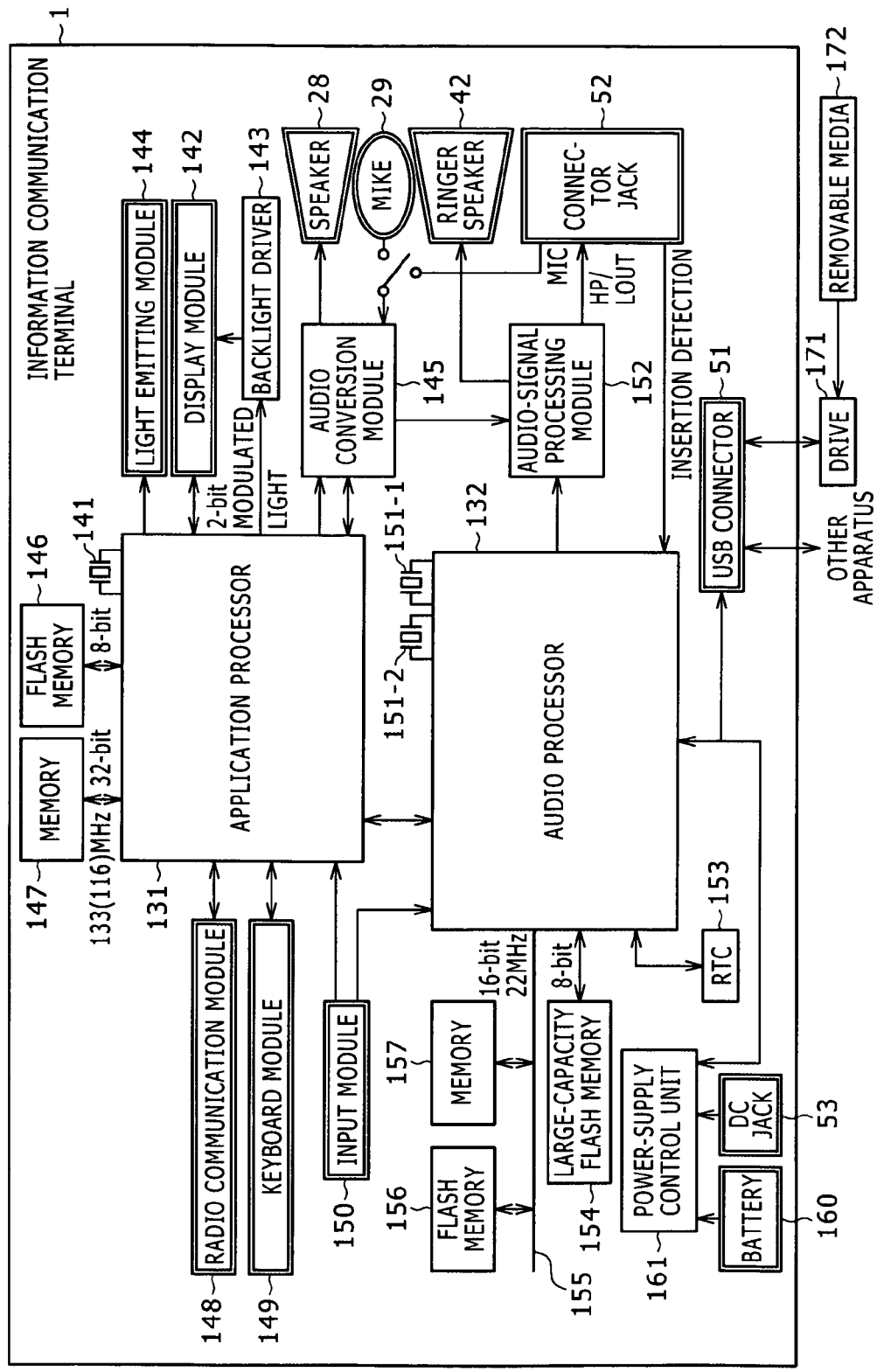
FIG. 11 is a block diagram showing the internal configuration of the information communication terminal.

FIG. 11 is a block diagram showing the internal configuration of the information communication terminal 1.

The information communication terminal 1 includes an application processor 131 and an audio processor 132. The application processor 131 is a processor used mainly for executing an application program. On the other hand, the audio processor 132 is a processor for executing functions such as management of audio data, coding and decoding of audio data and management of copyrights. The application processor 131 and the audio processor 132 are connected to each other typically by making use of one serial interface or one parallel interface or a plurality of serial or parallel interfaces so that the application processor 131 and the audio processor 132 are capable of exchanging control signals and data with each other.

The application processor 131 carries out various kinds of processing on the basis of a clock signal generated by a clock generation unit 141. Details of functions carried out by the application processor 131 will be described later by referring to FIG. 12.

The application processor 131 is connected to a display module 142, a backlight driver 143, a light emitting module 144, an audio conversion module 145, a flash memory 146, a memory 147, a radio communication module 148, a keyboard module 149 and an input module 150. The input module 150 is also connected to the audio processor 132.

The display module 142 is configured to include the display unit 21. If an LCD unit is employed as the display unit 21, the display module 142 is configured to also include an LCD driver, an LCD backlight and, if necessary, components such as a light guide tube required in an operation to display information on the display unit 21. The display module 142 displays various kinds of information on the display unit 21 in accordance with control executed by the application processor 131.

The backlight driver 143 is a driver for the backlight of the display unit 21.

The light emitting module 144 includes the WLAN-state notification light emitting unit 31, the power-supply-state notification light emitting unit 32, the communication-state notification light emitting unit 34 and drivers for driving light emitting devices employed in the WLAN-state notification light emitting unit 31, the power-supply-state notification light emitting unit 32 and the communication-state notification light emitting unit 34. The light emitting module 144 puts the WLAN-state notification light emitting unit 31, the power-supply-state notification light emitting unit 32 and the communication-state notification light emitting unit 34 in an on, blinking or off state in accordance with control executed by the application processor 131. In the on and blinking states, the WLAN-state notification light emitting unit 31, the power-supply-state notification light emitting unit 32 and the communication-state notification light emitting unit 34 each emit light having a predetermined color.

The audio conversion module 145 includes embedded components such as a PLL circuit, an A/D converter, a D/A converter and a DSP core. The DSP core is capable of carrying out filter processing and equalizer processing. The filter processing includes processing of a high-pass filter and a notch filter. To be more specific, in accordance with control executed by the application processor 131, the audio conversion module 145 carries out an A/D conversion process on a sound input by the mike 29 or a mike connected to the connector jack 52, and carries out predetermined processing such as filtering on the result of the process. Then, the audio conversion module 145 supplies the result of the predetermined processing to the application processor 131. On the other hand, the audio conversion module 145 carries out a D/A conversion process on audio data received from the application processor 131 and outputs the result of the D/A conversion process to the speaker 28 as a reproduced sound, or outputs audio data obtained as a result of the D/A conversion process to typically a headphone connected to the connector jack 52 as a reproduced sound by way of the connector jack 52.

The flash memory 146 is a memory having a typical storage capacity of about 64 MB. The flash memory 146 is used for storing programs to be executed by the application processor 131 and information that remains stored in the flash memory 146 even after the power supply is put in an off state. The information stored in the flash memory 146 includes data and a variety of register variables. The data and the register variables are information required in the execution of the programs.

The memory 147 is typically an SDRAM (Synchronous Dynamic Random Access Memory) having a typical storage capacity of about 64 MB. The memory 147 is used for storing information required in processing carried out by the application processor 131.

The radio communication module 148 is a unit for implementing a WLAN function conforming to the 802.11b standard. In accordance with control executed by the application processor 131, the radio communication module 148 carries out a radio communication in order to exchange information with another apparatus directly or through an access point and a network.

The keyboard module 149 is configured to include the keyboard 71 for receiving an operation input entered by the user and supplying a signal representing the operation to the application processor 131.

The input module 150 is configured to include the WLAN-mode switching button 22, the home button 23, the back button 24, the option button 25, the 4-direction keys 26, the enter button 27, the WLAN on/off switch 30, the power-supply switch 33, the music key 35, the hold switch 43 and the volume button 44. The input module 150 is a module for receiving an operation input entered by the user and supplying a signal representing the operation to the application processor 131 or the audio processor 132.

The audio processor 132 carries out various kinds of processing on the basis of a clock signal generated by a clock generation unit 151-1 or a clock generation unit 151-2. Since the audio processor 132 is a processor for handing mainly audio data, it is proper for the audio processor 132 to use two different clock signals. One of the clock signals is a basic clock signal used for processes such as processing to code and decode audio data. The other clock signal is a basic clock signal used for other signal processing. Functions carried out by the audio processor 132 will be described in detail by referring to FIG. 13.

The audio processor 132 is connected to the input module 150 described above, an audio-signal processing module 152, the USB connector 51, a real-time clock (RTC) 153, a large-capacity flash memory 154 and a memory bus 155. The memory bus 155 is connected to a flash memory 156 and a memory 157. The audio processor 132 also receives a signal indicating whether a device such as a headphone has been inserted into the connector jack 52 or pull out from the connector jack 52.

The audio-signal processing module 152 includes embedded components such as a D/A converter, a digital filter and an audio output amplifier for the headphone or the speaker. The audio-signal processing module 152 carries out a D/A conversion process on audio data received from the audio processor 132 or the audio conversion module 145, carries out a filtering process on the result of the D/A conversion process if necessary, amplifies the result of the filtering process and supplies the output of the amplifier to the ringer speaker 42 or the connector jack 52 as a reproduced signal. In addition, the audio-signal processing module 152 also receives a command from the audio processor 132 as a command to output not only an audio signal, but also the so-called beep sound or a calling sound of typically an arriving IP telephone call. The audio-signal processing module 152 outputs the beep sound or the calling sound of an arriving IP telephone call to the ringer speaker 42 or the connector jack 52.

The real-time clock (RTC) 153 is a clock for finding the present time by counting the number of pulses output by a pulse generator and supplying the present time to the audio-signal processing module 152.

The large-capacity flash memory 154 is a flash memory having a typical large storage capacity in the range 1 to several GB. The large-capacity flash memory 154 is used for storing information received from the audio processor 132. It is to be noted that the large-capacity flash memory 154 is also used for storing information generated by or acquired from a process carried out by the application processor 131 and supplied by the application processor 131 to the large-capacity flash memory 154 by way of the audio processor 132.

In addition, the large-capacity flash memory 154 is also used for storing information on other registered users. The information on another registered user is used in a process to exchange information with the other user by making use of an exchange tool such as an instant messenger, an IP phone, chatting or an email. The information exchanged with the other user typically includes a content such as musical data reproducible in a process carried out by the audio processor 132 and data generated as a result of executing a variety of application programs. On top of that, the large-capacity flash memory 154 is also used for storing information on registration of the user itself, who owns the information communication terminal 1, or information on registration of the information communication terminal 1. This registration information is transmitted to the apparatus owned by the other user serving as a partner of the information exchange process. The information on registration of the user itself, who owns the information communication terminal 1, or the information on registration of the information communication terminal 1 is stored in the large-capacity flash memory 154 in such a way that the user is capable of properly modifying the stored information.

The flash memory 156 is typically a memory having a typical storage capacity of about 64 MB. The flash memory 156 is used for storing a program to be executed by the audio processor 132 and information that remains stored in the flash memory 156 even after the power supply is put in an off state. The information stored in the flash memory 156 includes data and a variety of register variables. The data and the register variables are information required in the execution of the program.

The memory 157 is typically an SDRAM (Synchronous Dynamic Random Access Memory) having a typical storage capacity of about 64 MB. The memory 157 is used for storing information required in processing carried out by the audio processor 132.

The USB connector 51 is connected to an external apparatus by making use of a USB cable. An example of the external apparatus is the personal computer 13 explained before by referring to FIG. 1. If necessary, the USB connector 51 is also connected to a drive 171 on which a removable medium 172 is mounted. Examples of the removable medium 172 are a magnetic disk, an optical disk, a magneto-optical disk and a semiconductor memory. If necessary, a computer program read out from the removable medium 172 is installed in the flash memory 146 or the flash memory 156 in an executable state.

A signal received from an external apparatus such as the personal computer 13 through the USB connector 51 is supplied to the audio processor 132 and, if necessary, supplied to the application processor 131. On the other hand, the audio processor 132 outputs a predetermined signal to the external apparatus such as the personal computer 13 by way of the USB connector 51.

DC power supplied through the USB connection, DC power supplied through the DC jack 53 or DC power supplied from a battery 160 mounted on the information communication terminal 1 is distributed to components composing the information communication terminal 1 by a power-supply control unit 161.

Figure 12:
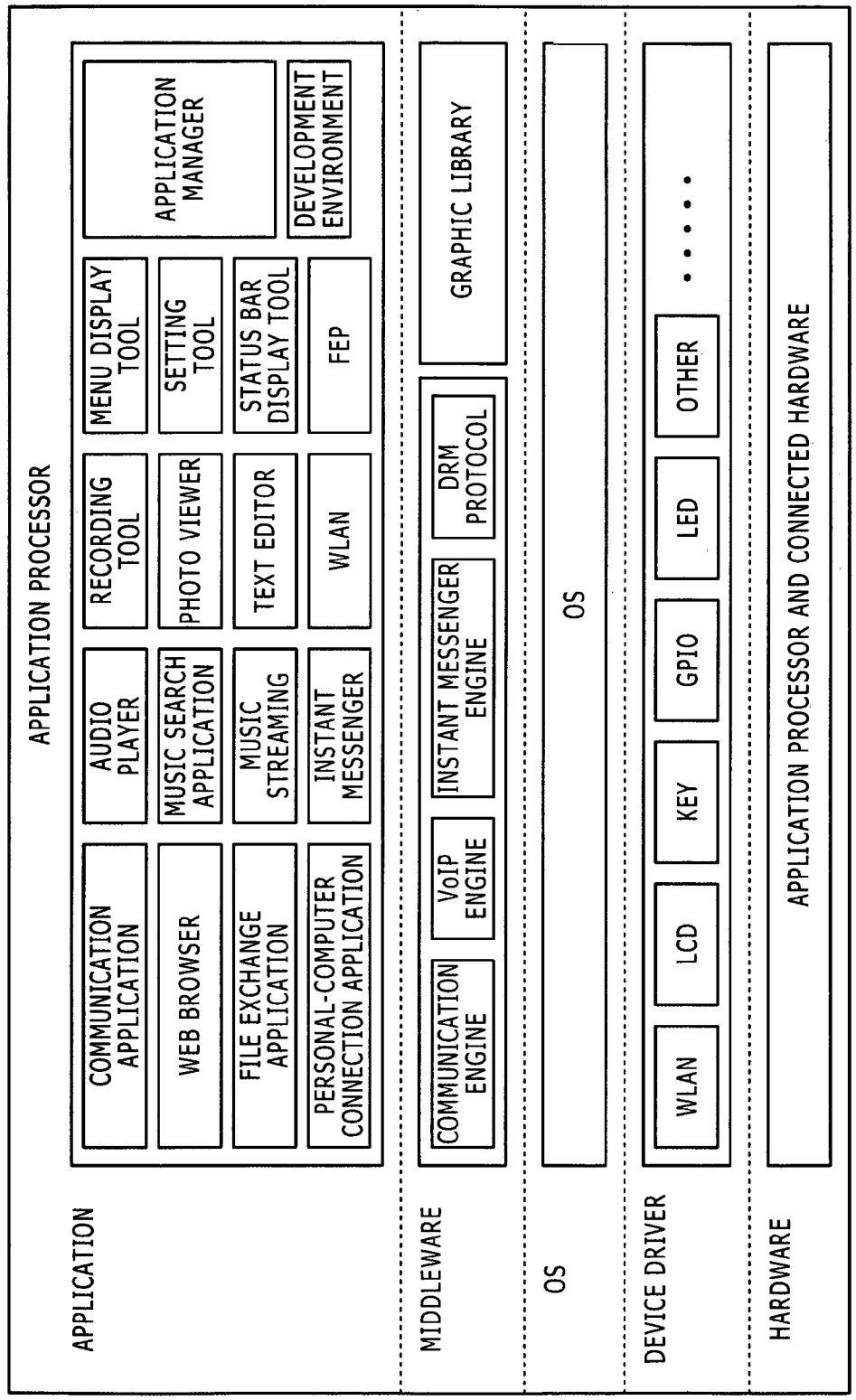
FIG. 12 is a software-stack diagram showing the configuration of software executed by an application processor.

FIG. 12 is a software-stack diagram showing the configuration of software executed by the application processor 131.

As shown in FIG. 12, the configuration of the software to be executed by the application processor 131 includes the following layers: a hardware layer at the bottom of the configuration, a device-driver layer above the hardware layer, an OS layer above the device-driver layer, a middleware layer above the OS layer and an application layer on the top of the configuration.

The device-driver layer is dedicated software for driving the application processor 131 and hardware connected to the application processor 131. To put it concretely, the device-driver layer includes a WLAN device driver WLAN for driving the radio communication module 148, an LCD driver for driving LCDs employed in the display module 142 for displaying an image on the display unit 21, a KEY keyboard driver for driving the keyboard module 149, a GPIO device driver for driving general-purpose ports of the application processor 131 and an LED driver for driving light emitting diodes employed in the WLAN-state notification light emitting unit 31, the power-supply-state notification light emitting unit 32 and the communication-state notification light emitting unit 34, which are included in the light emitting module 144.

In addition, the device-driver layer also properly includes other required device drivers such as a device driver for driving the backlight driver 143, a variety of memory drivers, a device driver for driving the audio conversion module 145, a mouse driver for driving a mouse if a mouse is employed in the information communication terminal 1 as an input device, a hard-disk driver for driving an embedded hard disk used for storing information if the hard disk is embedded in the information communication terminal 1 and a printer driver for driving an external printer connected to the information communication terminal 1 as an output device to which the information communication terminal 1 outputs information to be printed.

The OS layer is an OS (operating system) for controlling basic operations of the application processor 131. The OS is a basic program for managing a variety of resources driven by the device drivers. The OS manages the entire system by providing basic functions common to a number of application programs on the middleware and application layers to be described later as functions available to middleware and the application programs. For example, when any of the application programs executes an instruction, a device driver associated with the instruction is activated to carry out an operation requested by the instruction. Examples of the operation carried out by the device driver are an operation to input or output data from or to the flash memory 146, the memory 147 or the audio processor 132 and an operation to execute management of input/output functions such as a function to input data from the keyboard and a function to output an image to a screen. The OS can be Windows (a registered trademark) 95 (a trademark), Windows (a registered trademark) 98 (a trademark), Windows (a registered trademark) NT (a trademark), LINUX or OS/2 (a trademark). In addition, the OS also manages some software resources included typically in a context of execution of an application program on the application layer to be described later. The context of execution of an application program includes a set of registers, a main-memory image and a file handler.

Executed on the OS, the middleware on the middleware layer provides application programs with functions more sophisticated and more practical than the functions offered by the OS.

The middleware thus has an intermediate characteristic between the OS and application programs. If a function common to a number of application programs is developed individually for each of the application programs, the software development will become inefficient. In order to solve this problem, such a common function to be used by the application programs is developed as a function of the middleware. Thus, the middleware is a collection of such common functions, which are each generally a basic function in many cases.

To put it concretely, the middleware includes software elements such as a communication engine, a VoIP (Voice over IP) engine, an instant-messenger engine, a DRM (Digital Rights Management) protocol and a graphic library. The communication engine is software for providing basic functions of communication applications such as the IP phone. The VoIP engine is software for providing basic functions of a technology for exchanging audio data by making use of a TCP/IP network such as the Internet or an intranet. The instant-messenger engine is software for providing basic functions of an instant messenger. The DRM protocol is software for realizing a function for implementing processes such as a process to encrypt digital data in order to protect the copyright of the digital data. The graphic library is a collection of GUI components to be displayed on the display unit 21 to accompany execution of a variety of application programs.

To be more specific, the graphic library is a collection of general-purpose functions and general-purpose data, which are to be used in image processing carried out by a variety of application programs executed on the application layer. To put it more concretely, the graphic library is used for collecting some general-purpose functions to be used in the image processing in the same way as a book room is used for collecting books. That is to say, functions necessary for execution of application programs are made sharable by the programs as an independent file referred to as a graphic library. In general, the graphic library is loaded at an execution time separately from an application program and distinguished from subroutines of an application program.

On the application layer at the top of the software configuration, a variety of application programs are executed. In case of the information communication terminal 1, the application programs include application software, utilities, an application manager and a development environment. The application software includes individual applications such as a communication application, a web browser, a file exchange application, a personal-computer connection application, an audio player, a music search application, a music streaming application, an instant messenger, a recording tool, a photo viewer and a text editor. The utilities include a WLAN interface, a menu display tool, a setting tool, a status-bar display tool and an FEP (Front End Processor). The application manager is a program for managing the application software.

The communication application is an application program making use of the communication engine and the VoIP engine to allow the user to communicate with (a user utilizing) another apparatus through the so-called IP telephone function or a voice chatting function.

The web browser is an application used for viewing a web page through a network. To put it concretely, the web browser implements functions to download a file such as an HTML file, an image file or a musical file from a web server through the network and analyze the layout of the page in order to display/reproduce the file. The web browser also implements a function of allowing the user to transmit data to the web server by making use of a displayed form. In addition, the web browser also implements a function to execute application software written in a language such as Java (a trademark) Script, Flash or Java (a trademark).

The file exchange application is an application program having a file transfer function to exchange a data file with another apparatus connected to the information communication terminal 1 through a network or directly. The personal-computer connection application is an application program having a function to connect the information communication terminal 1 to the personal computer 13 in order to allow the information communication terminal 1 to exchange information with the personal computer 13.

The audio player is an application program having a function to reproduce musical data. The music search application is an application program having a function to store audio data in an internal database and allow the user to search the database for desired musical data. The music streaming application is an application program having a function to transmit multimedia data such as video and audio data to another apparatus through a network and reproduce multimedia data in a streaming reproduction process while receiving the data from another apparatus through the network.

The instant-messenger application is an application program having a function to produce a result of determination as to whether or not a peer connected to the network such as the Internet or a LAN as a peer making use of the same software is in an online state. The instant-messenger application also has a function to allow chatting with the peer or a transfer of a file to/from the peer if the result of the determination indicates that the peer is in an online state.

The recording tool is an application program having a function to record audio data input by the mike 29 in a way similar to the so-called voice memo and reproduce the recorded audio data. The photo viewer is an application program having a function to manage image data (or photo data) recorded internally in the information communication terminal 1 and control a process to reproduce and display the recorded image data by making use of a variety of display methods such as a method to display image data as a list of thumbnail images and a slideshow display method. The text editor is an application program having a function to create text data on the basis of operation inputs entered by the user via an input device such as the keyboard 71.

Individual application programs other than those mentioned and described above include table-calculation software, database creation software, an email application and a variety of game applications. These other application programs can also be properly installed in the information communication terminal 1 as well.

The WLAN interface is a utility for implementing a WLAN function conforming typically to the 802.11b standard. The menu display tool is a utility for controlling a display appearing on the display unit 21 as a display showing information such as a menu or a standby image. The setting tool is a utility for setting a variety of functions of the information communication terminal 1 on the basis of operation inputs entered by the user. The status-bar display tool is a utility for displaying various kinds of information on the continuous display panel 101 explained earlier by referring to FIGS. 9 and 10. The FEP is a utility serving as kanji conversion software used for handing inputs entered in the Japanese language.

Figure 13:
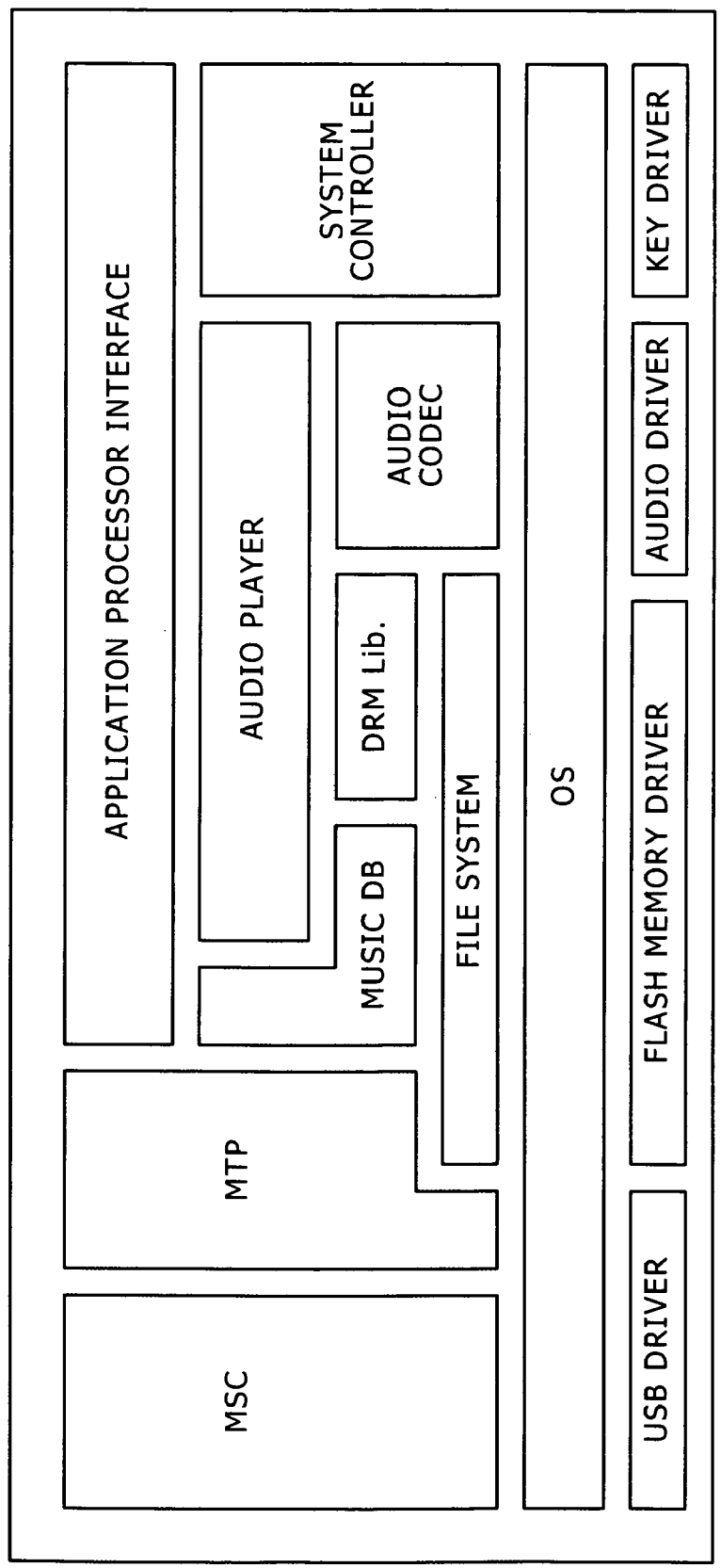
FIG. 13 is a software-stack diagram showing the configuration of software executed by an audio processor.

FIG. 13 is a software-stack diagram showing the configuration of software executed by the audio processor 132.

The device-driver layer at the bottom of the configuration is dedicated software for driving the audio processor 132 and hardware connected to the audio processor 132. To put it concretely, the device-driver layer includes a USB driver, a flash-memory driver, an audio driver and a key driver. The USB driver is a device driver for implementing USB-connection and USB-streaming functions. The flash-memory driver is a device driver for driving the large-capacity flash memory 154 connected to the audio processor 132. The audio driver is a device driver for driving the audio-signal processing module 152. The key driver is a device driver for driving an input device employed in the input module 150. An example of the input device is a music key 35 for inputting an operation input concerning a process to be carried out by the audio processor 132.

The device-driver layer may also properly include other required device drivers such as a memory driver for driving a memory other than the large-capacity flash memory 154 and a GPIO device driver for driving a general-purpose port of the application processor 131.

The OS is a basic program for controlling basic operations carried out by the audio processor 132. As the OS of the audio processor 132, it is desirable to employ a real-time OS designed for an embedded system. An example of the real-time OS designed for an embedded system is uITRON.

A variety of application programs are executed on the OS.

In implementing USB connection, the information communication terminal 1 is capable of switching a USB mode from an MSC (Mass Storage Class) mode, which is one of two USB modes, to an MTP (Media Transfer Protocol) mode serving as the other USB mode and vice versa.

The MSC (Mass Storage Class) mode is a USB mode providing the host apparatus with a function to recognize and control a connected USB apparatus as a storage apparatus. In this case, the USB apparatus is the information communication terminal 1 connected to the personal computer 13. That is to say, having a MSC (mass storage class) interface, the information communication terminal 1 is recognized as a driver by an OS running on the personal computer 13. Thus, an application executed in the personal computer 13 is capable of reading out data stored internally in the information communication terminal 1. The data stored internally in the information communication terminal 1 includes image data and musical data. The application executed in the personal computer 13 to read out data stored internally in the information communication terminal 1 is not limited to a special application, but may also be an explorer or the like.

The MTP (Media Transfer Protocol) mode is a USB mode providing a protocol for connecting the information communication terminal 1 and the personal computer 13 to each other and exchanging musical data, moving-picture data and still-picture data between the information communication terminal 1 and the personal computer 13. MTP software for the MTP mode is executed on a layer of communication with any storage device including the USB MSC (mass storage class) storage apparatus, allowing a content having a copyright protection flag to be transferred with a high degree of safety.

A file system is software for managing files stored in a memory (such as the large-capacity flash memory 154) connected to the audio processor 132. Some of the files managed by the file system are stored in a database. To be more specific, musical-data files managed by the file system are stored in a musical DB (database). The copyrights of the musical-data files are protected in a DRM (Data Rights Management) library.

The DRM library is a collection of general-purpose functions and general-purpose data, which are used by a variety of application programs to encrypt digital data such as musical data, moving-picture data and still-picture data in order to implement a function of avoiding illegal data copies and illegal transfers of data to other apparatus.

Musical data stored in a memory (such as the large-capacity flash memory 154) connected to the audio processor 132 is data compressed by an audio coding/decoding unit in a compression format such as an MP3 (MPEG Audio layer-3) format, an ATRAC3 (Adaptive TRansform Acoustic Coding-3) format, a WMA (Windows (a trademark) Media Audio) format or an ASF (Advanced Streaming Format). Thus, the audio coding/decoding unit is also capable of decompressing the compressed musical data by adoption of a decompression method for the compression format.

An audio player is software for controlling a process to decompress compressed audio data in the audio coding/decoding unit by adoption of a predetermined decompression method and output the audio data as reproduced data. The compressed audio data to be decompressed is supplied to the audio processor 132 by way of an application processor interface. The compressed audio data is audio data subjected to copyright protection based on the DRM library and managed by making use of the musical DB in accordance with control signals output by various kinds of software executed by the application processor 131.

A system controller is software for controlling a variety of functions implemented by the audio processor 132.

An application processor interface is software for providing a function to control exchanges of various kinds of information and control signals between the application processor 131 and the audio processor 132.

By referring to display screens appearing on the display unit 21, the following description explains typical and concrete executions of a variety of application programs in the information communication terminal 1.

A variety of application programs executed by the information communication terminal 1 can be classified into a category not making use of processing of communications with another apparatus and a category making use of processing of communications with another apparatus through a network. The category not making use of processing of communications with another apparatus includes the audio player, the recording tool (or the so-called voice memo tool), the photo viewer and the text editor. As described earlier, the audio player is an application program for reproducing audio data. On the other hand, the category making use of processing of communications with another apparatus includes the file exchange application, the music streaming application, the communication application, the instant messenger and the web browser. As described before, the file exchange application is an application program having a file transfer function to exchange a data file with another apparatus connected to the information communication terminal 1 through a network or directly. Also as explained earlier, the music streaming application is an application program having a function to transmit multimedia data such as video and audio data to another apparatus through a network and reproduce multimedia data while receiving the data from another apparatus through the network in a streaming reproduction process. Also as described earlier, the communication application is an application program making use of the communication engine and the VoIP engine in order to allow the user to communicate with (a user utilizing) another apparatus through the so-called IP telephone function or a voice chatting function through a network. Also as explained before, the instant-messenger application is an application program having a function to allow chatting or a transfer of a file through a network. Also as explained earlier, the web browser is an application program used for viewing a web page through a network.

There are also application programs each having a plurality of functions. There are also application programs each having a plurality of functions making use of and not making use of processing of communications with another apparatus through a network. The functions not making use of processing of communications with another apparatus include a function to record audio data (such as mainly musical data), a still picture and a moving picture and a function to organize stored data into a database. On the other hand, the functions making use of processing of communications with another apparatus through a network include a function to exchange data with another apparatus and a function to reproduce data while receiving the data from another apparatus in a streaming reproduction process.

Figure 14:
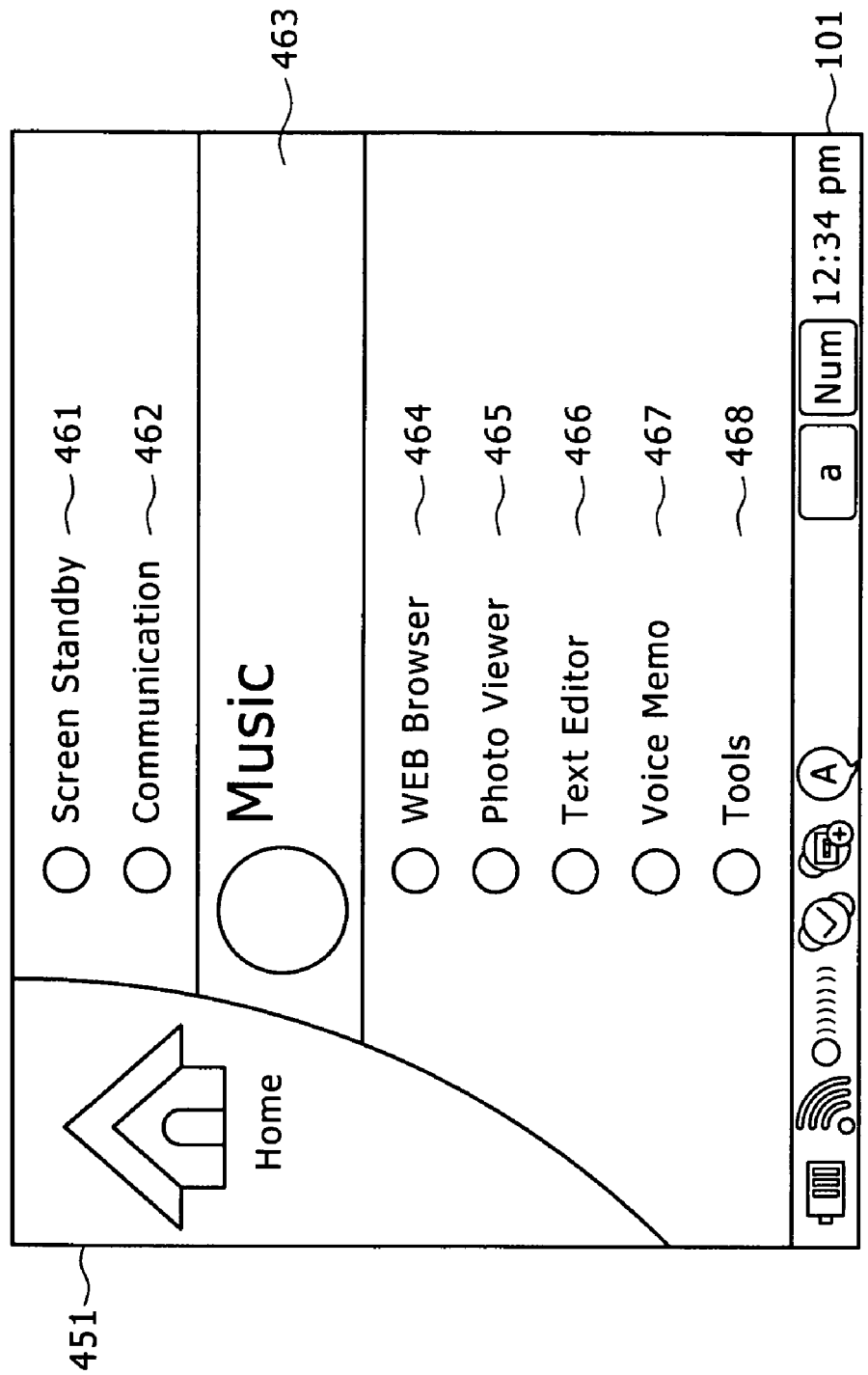
FIG. 14 is a diagram showing a typical display of a home screen.

FIG. 14 is a diagram showing a typical display of a home screen 451, which immediately appears on the display unit 21 employed in the information communication terminal 1 typically when the power supply is turned on or when the home button 23 is pressed. The home screen 451 shows a menu as a list of application programs that can be executed in the information communication terminal 1. As an alternative, the displayed menu can also be a list of items each including a plurality of such application programs. In the case of the home screen 451 shown in FIG. 14, the displayed menu shows a standby screen 461, a communication application 462, a music tool 463, a web browser 464, a photo viewer 465, a text editor 466, a voice memo tool 467 and a variety of tools 468 in a state of being selectable. If application programs executable in the information communication terminal 1 cannot all be displayed on one page of the home screen 451, the user may operate an up or down key of the 4-direction keys 26 in order to scroll the displayed list of the menu in the upward or downward direction respectively. In this way, the user is capable of viewing all the application programs included on the list. The user is allowed to select an application program from the displayed menu of the home screen 451 appearing on the display unit 21 and activate the selected program.

It is to be noted that, in accordance with a typical method adopted by the user to select and determine an application program from the menu, for example, the user operates the down or up key of the 4-direction keys 26 to change the selected item in the menu. The selected item in the menu is an item pointed to by a cursor. The menu is scrolled in the upward direction when the user presses the up key of the 4-direction keys 26 with the menu top item pointed by the cursor and scrolled in the downward direction when the user presses the down key of the 4-direction keys 26 with the menu bottom item pointed by the cursor. Then, after placing the cursor at a position to point to a desired item in the menu by operating the down or up key, the user presses the enter button 27 in order to confirm the selection of the desired menu item pointed to by the cursor as a selected application program. When the user confirms the selection of the desired menu item pointed to by the cursor as the selected application program by pressing the enter button 27, the program is activated. In accordance with another typical method adopted by the user to select an application program and confirm the selection of the application program from the menu, for example, with the third item in the menu assumed to be an always selected menu item, the user operates the down or up key of the 4-direction keys 26 in order to scroll the entire menu in the downward or upward direction respectively. In this way, different programs occupy the position of the third item serving as the always selected menu item. The user continues scrolling the menu till the desired application program occupies the position of the third item serving as the always selected menu item. As the desired application program occupies the position of the third item serving as the always selected menu item, the user presses the enter button 27 in order to confirm the selection of the third menu item as a selected application program. When the user confirms the selection of the third menu item as the selected application program by pressing the enter button 27, the program is activated.

First of all, by referring to FIGS. 14 to 18, the following description explains typical processing when the voice memo tool 467 is selected from the menu shown on the home screen 451 and the recording and reproduction tool (or the so-called voice memo) represented by the voice memo tool 467 is executed. As described above, the home screen 451 of FIG. 14 shows a menu as a list of application programs that can be executed in the information communication terminal 1 or, as an alternative, the displayed menu can also be a list of items each including a plurality of such application programs.

Figure 15:
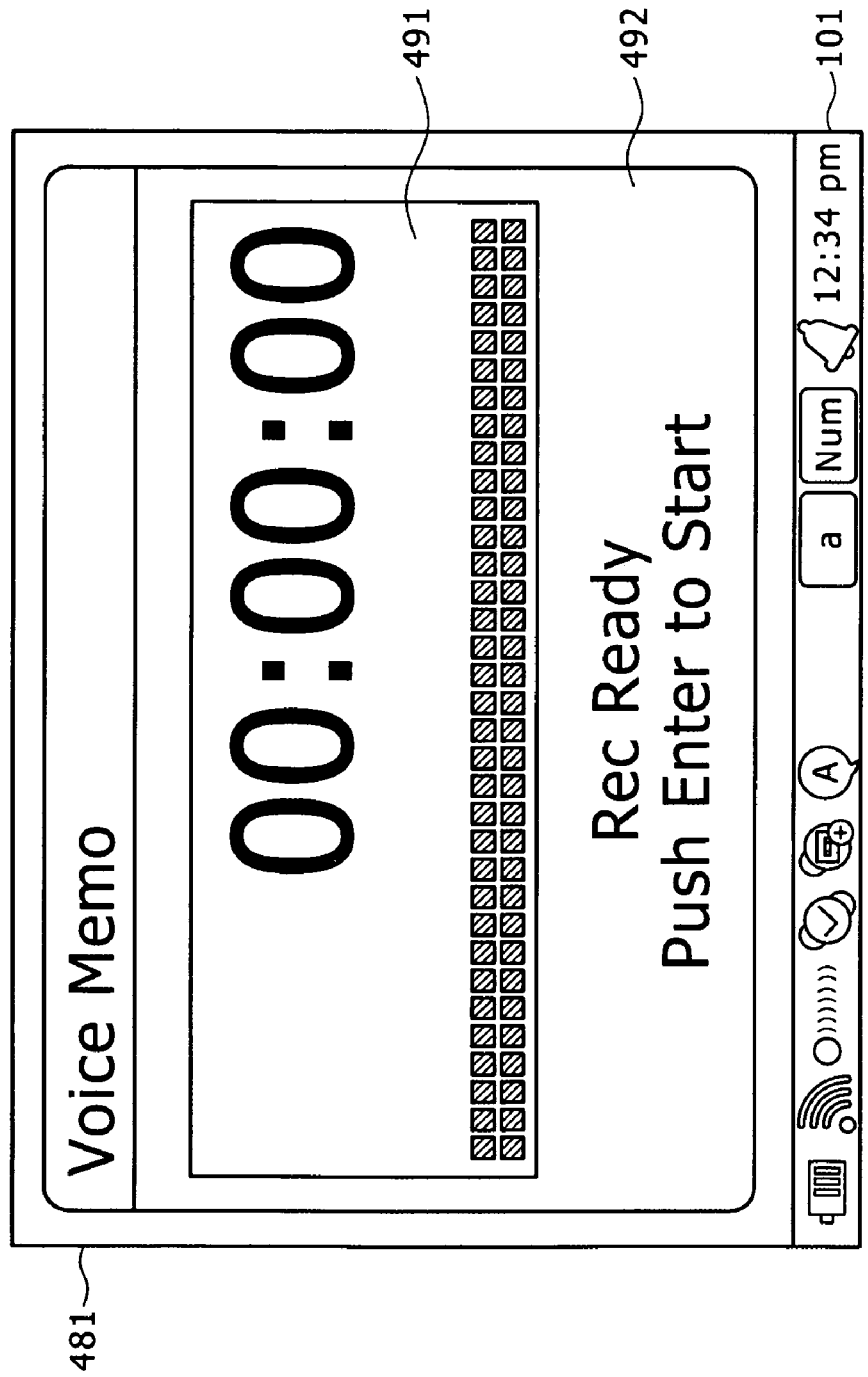
FIG. 15 is a diagram showing a typical display of the screen in a recording wait state.

FIG. 15 is a diagram showing a typical display of a screen 481 appearing initially in a recording wait state when the recording and reproduction tool is activated.

The display screen 481 of the recording and reproduction tool includes a recording-duration display area 491 for showing a recording length and a message display area 492 for showing a message to the user. The recording-duration display area 491 not only shows a recording or a reproduction length but may also show other information such as the volume of recorded or reproduced audio data and the present reproduction position (or the reproduction-stop position) of recorded audio data in a reproduction process.

As shown in FIG. 15, in the recording wait state, the recording length shown in the recording-duration display area 491 is 0 and the message display area 492 shows a message saying: "Rec Ready. Push Enter to Start."

When the user presses the enter button 27, that is, when a signal representing an operation input entered by the user is received from the input module 150, the application processor 131 drives the mike 29 or a mike connected to the connector jack 52 to input voices, receives audio data completing an A/D conversion process in the audio conversion module 145 and supplies the data to the audio processor 132. The audio processor 132 encodes the data and stores the encoded data in the large-capacity flash memory 154.

Figure 16:
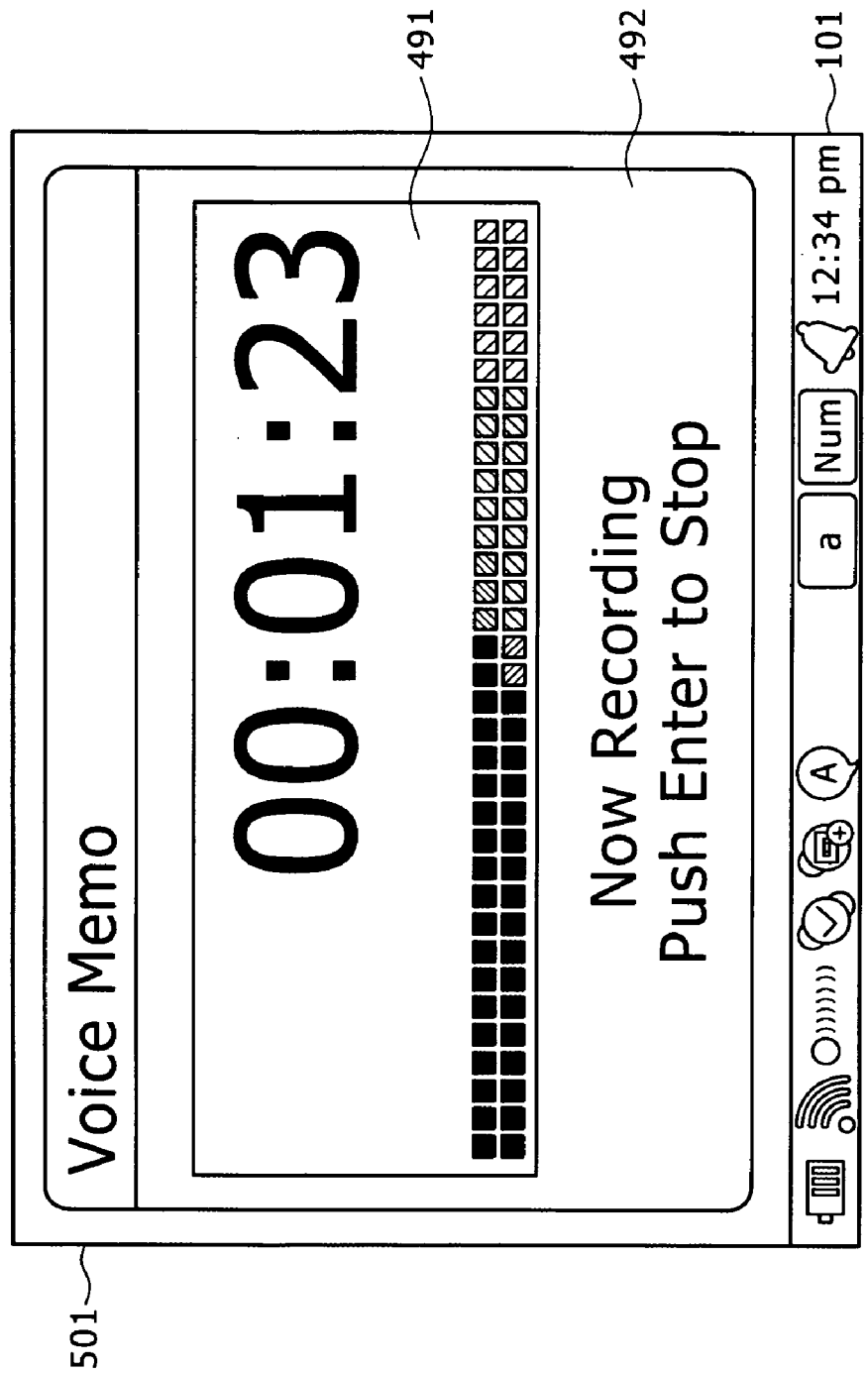
FIG. 16 is a diagram showing a typical display of the screen in a recording state.

FIG. 16 is a diagram showing a typical display of a screen 501 in a recording state.

As shown in FIG. 16, in a recording state, the recording-duration display area 491 shows an increasing recording length whereas the message display area 492 shows a message saying: "Now Recording. Push Enter to Stop."

When the user presses the enter button 27, that is, when a signal representing an operation input entered by the user is received from the input module 150, the application processor 131 stops the process to input voices by making use of the mike 29 or the mike connected to the connector jack 52.

Figure 17:
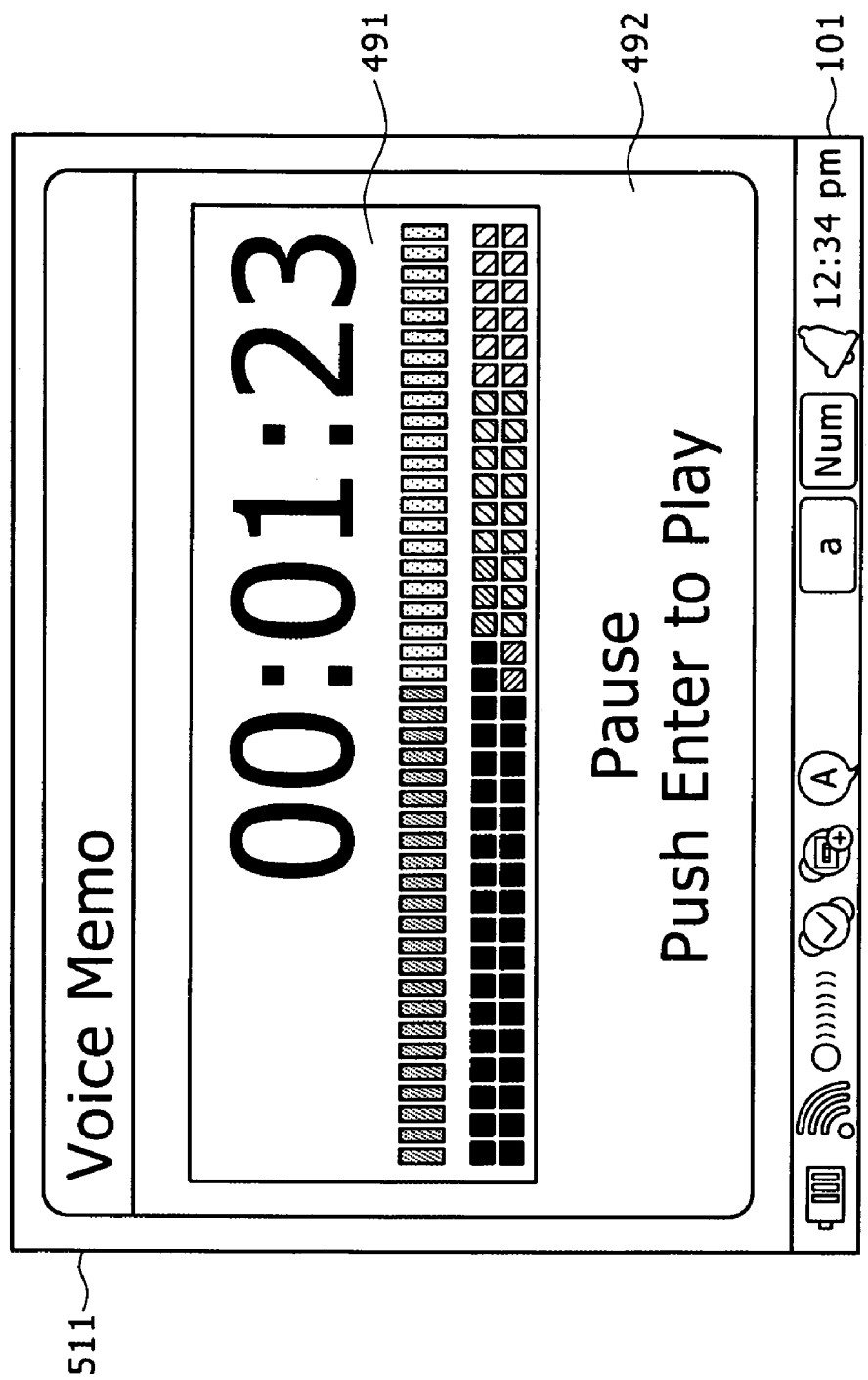
FIG. 17 is a diagram showing a typical display of the screen in a stopped-recording state, that is, a state of waiting for reproduction of recorded audio data (or, a temporarily stopped reproduction state)

FIG. 17 is a diagram showing a typical display of a screen 511 in a stopped-recording state, that is, a state of waiting for reproduction of recorded audio data (or, a reproduction pause state).

As shown in FIG. 17, in a reproduction pause state, the recording-duration display area 491 shows a fixed recording length and information on the progress of reproduction of the recorded sound data whereas the message display area 492 shows a message saying: "Pause. Push Enter to Play."

When the user presses the enter button 27, that is, when a signal representing an operation input entered by the user is received from the input module 150, the application processor 131 drives the audio processor 132 to read out recorded audio data from the large-capacity flash memory 154 and supply the data to the audio conversion module 145 after decoding the data. The audio conversion module 145 carries out a D/A conversion process on the audio data received from the audio processor 132 and outputs the data resulting from the D/A conversion process to the speaker 28 as reproduced data or outputs audio data obtained as a result of the D/A conversion process to typically a headphone connected to the connector jack 52 as a reproduced sound by way of the audio-signal processing module 152.

Figure 18:
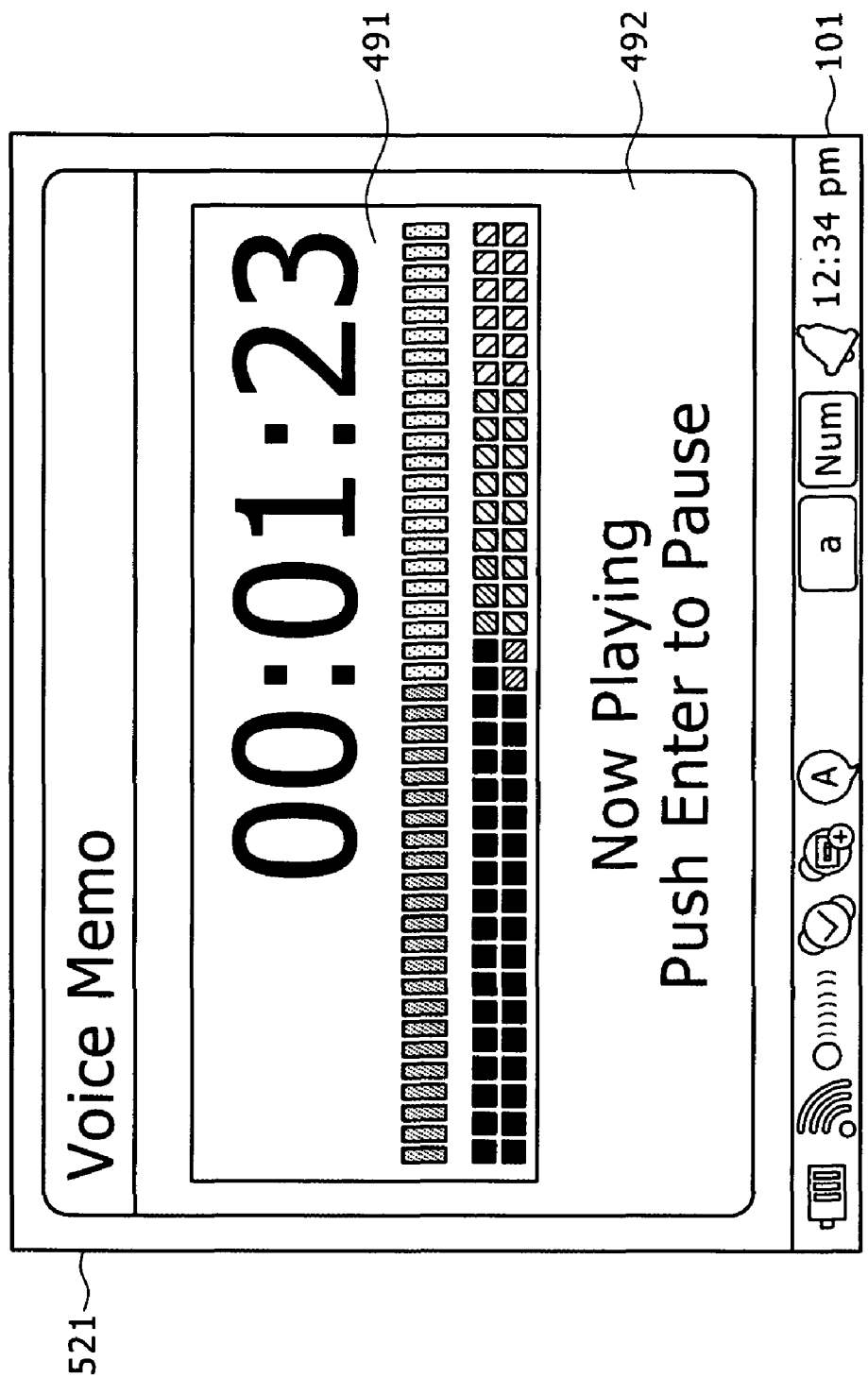
FIG. 18 is a diagram showing a typical display of the screen in a state of reproducing recorded audio data.

FIG. 18 is a diagram showing a typical display of a screen 521 in a state of reproducing recorded audio data.

As shown in FIG. 18, in a reproduction state, the recording-duration display area 491 shows a reproduction length and information on the progress of reproduction of the recorded sound data whereas the message display area 492 shows a message saying: "Now Playing. Push Enter to Pause," meaning that the information communication terminal 1 is in a reproduction state, which can be stopped by pressing the enter button 27. When the user presses the enter button 27 in the state shown in FIG. 18, the reproduction process is temporarily stopped to enter the reproduction pause state explained earlier by referring to FIG. 17.

The following description explains typical processing carried out by execution of the photo viewer 465 selected by confirmation from items included in a menu displayed on the home screen 451 explained earlier by referring to FIG. 14. As described before, the displayed menu is a list of application programs that can be executed in the information communication terminal 1 or, as an alternative, the displayed menu can also be a list of items each including a plurality of such application programs.

Figure 19:
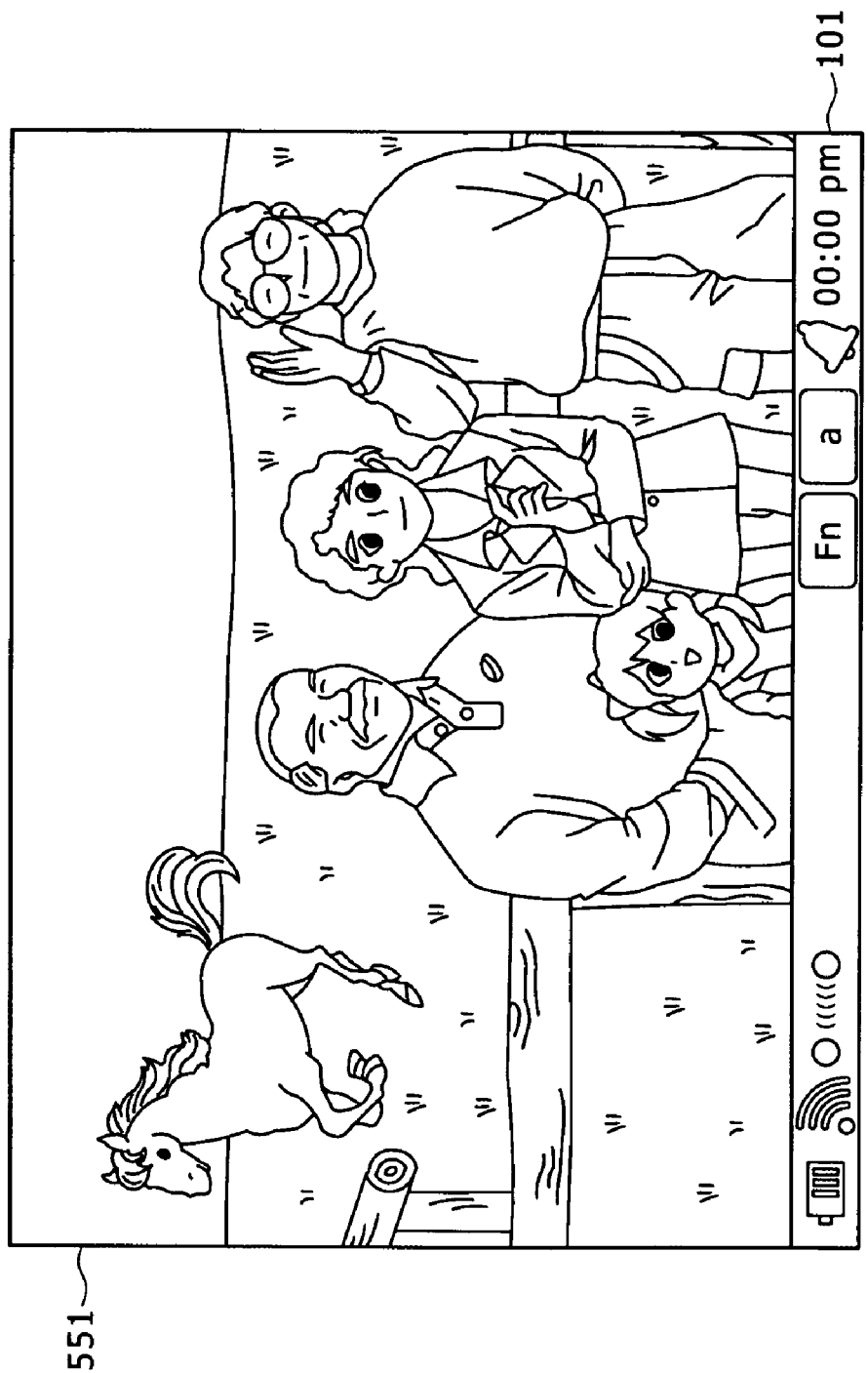
FIG. 19 is a diagram showing a typical display screen in execution of a photo viewer.

FIG. 19 is a diagram showing a typical display screen 551 in execution of the photo viewer 465. The photo viewer 465 is an application program for carrying out a process to read out the data of still pictures from the large-capacity flash memory 154 and display the data on the display unit 21 in accordance with an operation input entered by the user. Typically, the photo viewer 465 converts each of the still pictures into a thumbnail image and displays the data as a list of thumbnail images on the display unit 21. As an alternative, the photo viewer 465 displays the thumbnail images on the display unit 21 in units according to classification done by the user. As another alternative, the photo viewer 465 displays the thumbnail images on the display unit 21 in a slide-show format.

Figure 20:
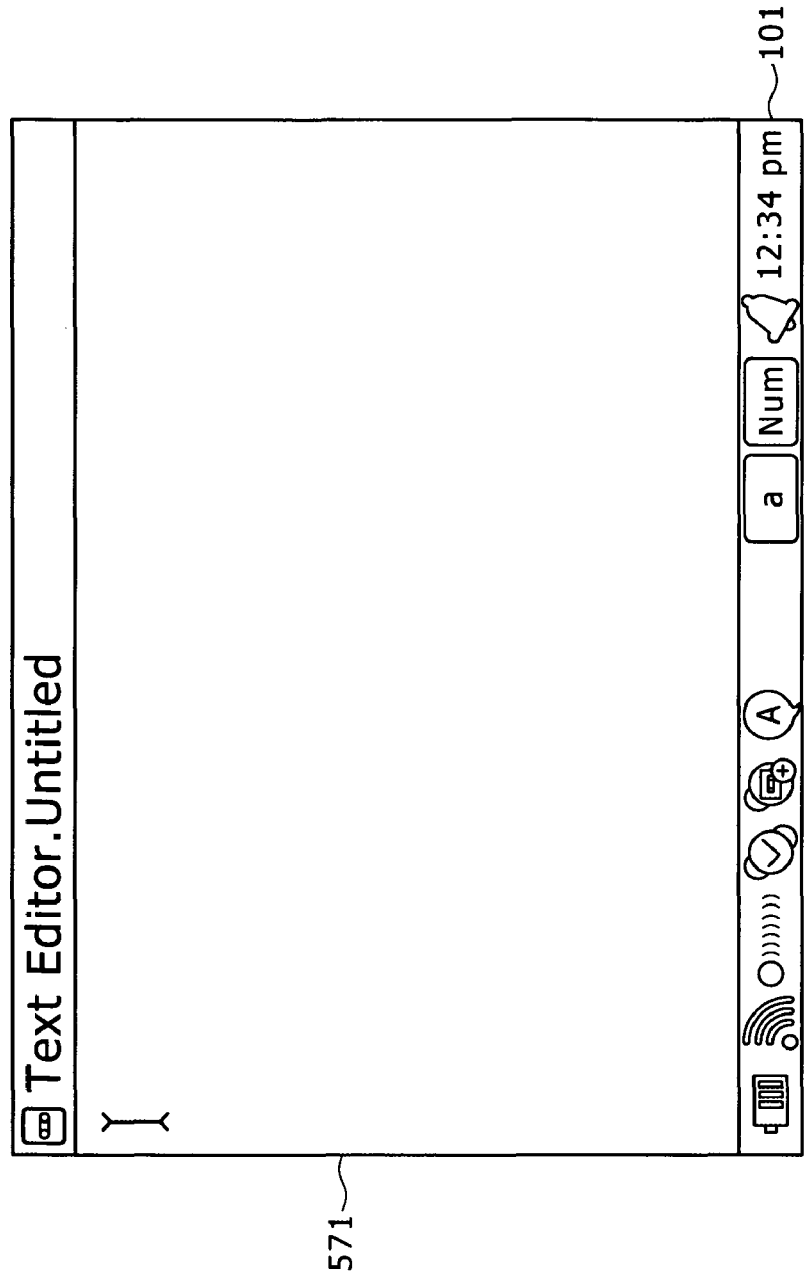
FIG. 20 is a diagram showing a typical screen for creation of a new text.
Figure 21:
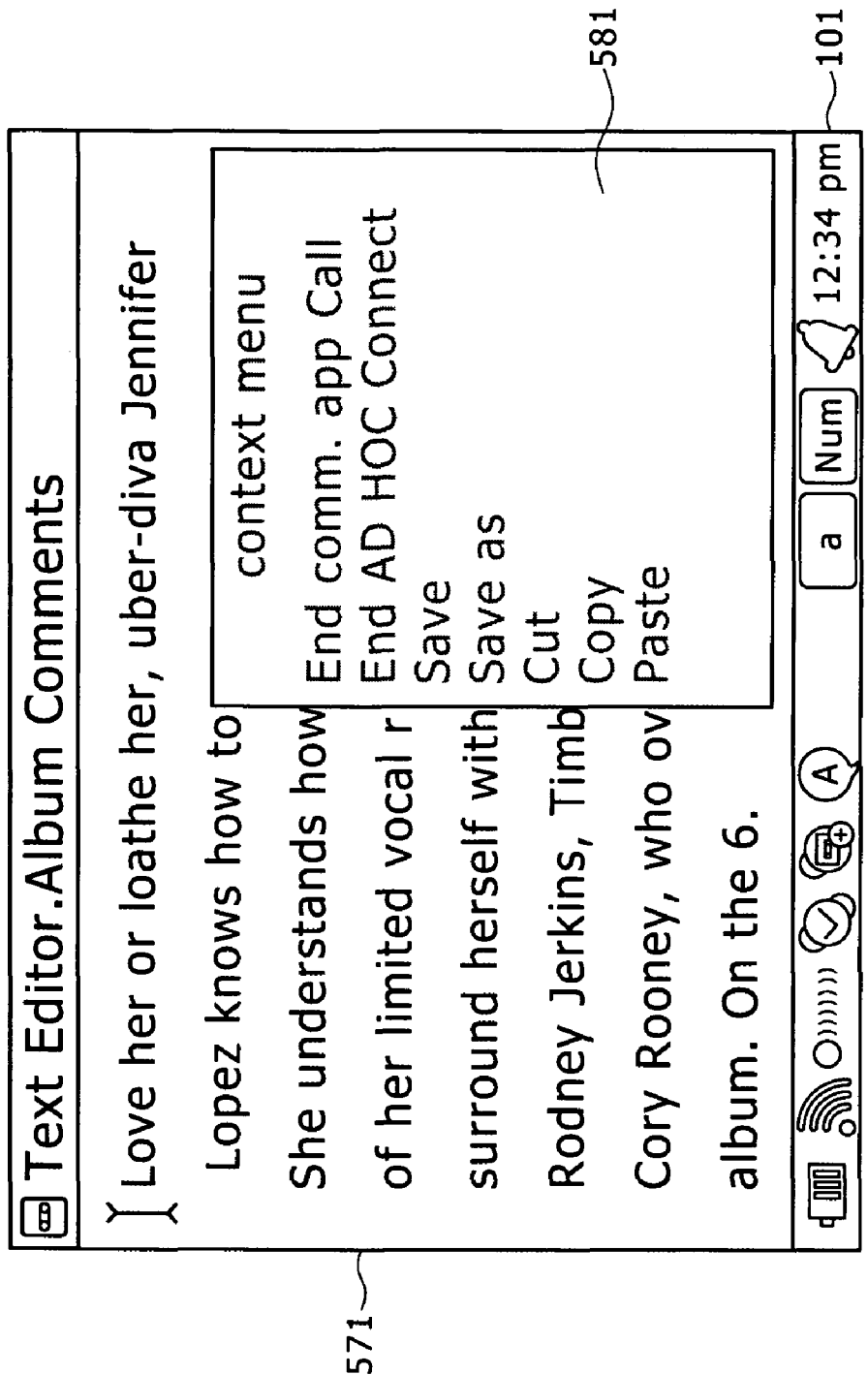
FIG. 21 is an explanatory diagram showing a context menu.

By referring to FIGS. 20 to 22, the following description explains typical processing carried out by execution of the text editor 466 selected by confirmation from items included in a menu displayed on the home screen 451 explained earlier by referring to FIG. 14. As described before, the displayed menu is a list of application programs that can be executed in the information communication terminal 1 or, as an alternative, the displayed menu can also be a list of items each including a plurality of such application programs.

FIG. 20 is a diagram showing a typical screen 571 for creation of a new text by making use of the text editor 466. On the top of the new-text creation screen 571, the name of a text file to be used for storing the new text is shown. If the user has not yet entered the name of a text file to be used for storing the new text, the name 'untitled' is used. In addition, the new-text creation screen 571 also shows a cursor pointing to the present edit position in a text input area.

While a text is being entered, it is possible to display a context menu 581 like one shown in FIG. 21 in accordance with an operation input entered by the user. The context menu 581 typically shows commands including 'End Comm. App. Call', 'End AD HOC Connect', 'Save', 'Save As', 'Cut', 'Copy' and 'Paste'. 'End Comm. App. Call' is the name of a command to terminate the text editor 466 and activate the communication application. 'End AD HOC Connect' is the name of a command to terminate the text editor 466 and start an ad-hoc connection mode. 'Save' is the name of a command to keep a created text. 'Save As' is the name of a command to keep a created text in a file by giving a name to the file. 'Cut' is the name of a command to cut out a portion of a text from the text. The portion to be cut out from the text is a character string in a specified range. 'Copy' is the name of a command to copy a portion of a text. The portion to be copied is a character string in a specified range. 'Paste' is the name of a command to paste a portion at a position in a text. The portion to be pasted to the text is a character string cut out from a text by making use of the 'Cut' command or a character string copied by making use of the 'Copy' command.

In addition, the text editor 466 also has a character predictive conversion function. The character predictive conversion function works as follows. When the user moves the cursor to a place at which a string of characters is to be entered and enters the first character of the string, the character predictive conversion function automatically displays a plurality of predicted candidates for the character string to be entered at the position of the entered first character as a string starting with the entered first character. The character predictive conversion function automatically displays the predicted candidates in a character-string predictive conversion bar 591 at the bottom of the new-text creation screen 571 as shown in FIG. 22.

If the predicted candidates shown in a character-string predictive conversion bar 591 include the character string to be entered by the user at the position of the entered first character, the user can carry out an operation to select the string of characters from the character-string predictive conversion bar 591 in order to enter the selected string of characters to the position. In this way, the user is capable of entering a desired string of characters to the position of the entered first character by carrying out only few text-character input operations. The user is capable of deleting the character-string predictive conversion bar 591 from the new-text creation screen 571 by carrying out an input operation of deciding to select an x box at the left end of the new-text creation screen 571.

The keyboard 71 shown in FIG. 8 as a keyboard employed in the information communication terminal 1 may have the so-called + character keys in addition to the 4-direction keys 26 provided on the cover 61. By providing the + character keys, the user may enjoy more convenience of selecting the + character keys or the 4-direction keys 26 as follows.

For example, the user may operate a key of the 4-direction keys 26 or a left-direction or right-direction key of the + character keys on the keyboard 71 in order to enter a command to move the cursor over the new-text creation screen 571 of the text editor 466 in a direction indicated by the operated key. On the other hand, the user may operate an upward-direction or downward-direction key of the + character keys on the keyboard 71 in order to enter a command to select a string of characters among a plurality of candidates shown in the character-string predictive conversion bar 591.

The software described above as the application programs implementing the photo viewer 465, the text editor 466 and the voice memo tool 467 is executed to carry out no processing of communication with an external apparatus. However, let us take functions each handling a musical content as an example. In this case, such a function may be executed to carry out processing of communication with an external apparatus or processing of no communication with an external apparatus. All the functions each handling a musical content are typically collected in a menu. This is because it is desirable to let the user utilize any of the functions each handling a musical content as an application program by selecting the program from the menu without the need to be aware of whether or not the selected program entails a communication with an external apparatus or without the need to distinguish the functions entailing a communication with an external apparatus and functions entailing no communication with an external apparatus from each other.

The method of communication with another apparatus can be implemented by wire connection making use of a USB cable or by radio connection making use of the WLAN. In the case of radio connection making use of the WLAN, the WLAN ad-hoc mode or the WLAN infrastructure mode can be adopted as described before.

The WLAN communication adopting the WLAN ad-hoc mode is explained by referring to FIGS. 23 to 26 as follows.

Let us assume for example that information communication terminals 1-1 to 1-5 operated by users A to E respectively exist in a range of implementable communications as shown in FIG. 23. Also let us assume that the information communication terminal 1-4 operated by user D is communicating in the WLAN ad-hoc mode with the information communication terminal 1-5 operated by user E.

In this case, each of the information communication terminals existing in the range of implementable communications as a terminal for the WLAN ad-hoc mode is not set to allow the information communication terminals to freely transfer files among each other and freely reproduce a transferred musical content in a streaming reproduction process. Instead, each of the WLAN ad-hoc mode information communication terminals existing in the range of implementable communications is set to allow only mutually registered information communication terminals to freely transfer files among each other and freely reproduce a transferred musical content in a streaming reproduction process. Two information communication terminals serving as mutual communication partners are said to be mutually registered information communication terminals if any specific one of the terminals is a terminal registered in the other terminal and the other terminal is a terminal registered in the specific terminal.

In the WLAN ad-hoc mode, each of the information communication terminals 1-1 to 1-5 operated by users A to E respectively as shown in FIG. 23 transmits its unique information and information on its present condition to all apparatus in the range of implementable communications by adoption of a broadcasting transmission technique, which does not specify any specific destination of the transmission.

The unique information of a information communication terminal 1 is information that basically remains unchanged. On the other hand, the information on the present condition of a information communication terminal 1 is information that varies from time to time. FIG. 24 is a diagram explaining pieces of typical information transmitted by an information communication terminal 1 in an ad-hoc mode by adoption of the broadcasting transmission technique.

As shown in the figure, the typical information transmitted by an information communication terminal 1 in an ad-hoc mode by adoption of the broadcasting transmission technique includes a unique IP address and unique port number of this terminal, a unique apparatus ID of this terminal, a user ID with a set profile, connection/disconnection information typically indicating a busy or ready state or the like, information on music being reproduced (or now playing) including such as the music title and the artist name, information required in a streaming reproduction process for a musical content being reproduced as a content with a protected copyright, other information such as information on a reproduction state or the like and a text memo entered by the user. The sequence number and object handle of music being reproduced are typical information required in a streaming repro implementable duction process for a musical content being reproduced as a content with a protected copyright.

The unique IP address and unique port number of this terminal, the unique apparatus ID of this terminal and the user ID with a set profile, which are included in the information communication terminal 1 in an ad-hoc mode, are information that basically remains unchanged. On the other hand, the information on music being reproduced (or now playing), the information required in a streaming reproduction process for a musical content being reproduced as a content with a protected copyright and other information such as information on a reproduction state or the like are information varying from time to time. The text memo entered by the user is basically unchanged but the user may enter a text memo with contents varying from time to time.

In addition, each of the information communication terminals 1 setting the WLAN ad-hoc mode may transmit information other than that explained above by referring to FIG. 24 to all apparatus in the range of implementable communications by adoption of the broadcasting transmission technique as long as the other information is information that can be disclosed to any user not registered as a communication partner in the WLAN ad-hoc mode set typically for exchanging information. For example, each of the information communication terminals 1 setting the WLAN ad-hoc mode may transmit image data of an icon (or the thumbnail) of the sender itself along with the information explained above by referring to FIG. 24 to any other information communication terminal 1 setting the WLAN ad-hoc mode. The icon will be displayed on a standby screen of the other information communication terminal 1 operated by an ad-hoc communication partner, who is a user not mutually registered yet. The icon is an icon letting the user, who is not a mutually registered user, display a screen of the owner of the icon. The standby screen will be described later in detail.

On the other hand, each of the information communication terminals 1-1 to 1-5 operated by users A to E respectively as shown in FIG. 23 receives the information explained above by referring to FIG. 24 from each of the information communication terminals 1-1 to 1-5, and produces a result of determination as to whether the information communication terminals 1-1 to 1-5 each serving as a sender is owned by a user registered as an ad-hoc communication partner in order to recognize the states of communication with the information communication terminals 1-1 to 1-5 each owned by a user registered as an ad-hoc communication partner and recognize information on each user owning another information communication terminal 1 existing in the range of implementable communications as an unregistered information communication terminal 1.

Then, in the WLAN ad-hoc mode, the information communication terminal 1 displays an ad-hoc user list display screen on the display unit 21. The ad-hoc user list display screen is a screen showing a list of pieces of information on users each registered as an ad-hoc communication partner owning the information communication terminal 1 and users each owning another information communication terminal 1 existing in the range of implementable communications as an unregistered information communication terminal 1.

To put it concretely, the ad-hoc user list display screen shows the states of communication with the information communication terminals 1 each owned by a user registered as an ad-hoc communication partner and any other information communication terminal 1 existing in the range of implementable communications as an unregistered information communication terminal 1. The state of communication with another information communication terminal 1 owned by a user registered as an ad-hoc communication partner can be an online state, an offline state or a busy state. The online state of another information communication terminal 1 is a state in which a communication with the other information communication terminal 1 can be carried out. The offline state of another information communication terminal 1 is a state in which a communication with the other information communication terminal 1 cannot be carried out due to the fact that the other information communication terminal 1 does not exist in the range of implementable communications. The busy state of another information communication terminal 1 is a state in which a communication with the other information communication terminal 1 cannot be carried out due to the fact that the other information communication terminal 1 is communicating with another apparatus. As for the state of communication with any other information communication terminal 1 existing in the range of implementable communications as an unregistered information communication terminal 1, an unknown state is displayed.

Let us assume for example that users B, Z, D and E are each a user registered in the information communication terminal 1 owned by user A as a communication partner of user A. In this case, the ad-hoc user list display screen of user A displays a list shown on the left side of FIG. 25 as a list of users. The list of users shows user B in an online state, user Z in an offline state, user D in a busy state, user E in a busy state and user C in an unknown state. That is to say, a communication with user B can be carried out, a communication with user Z cannot be carried out due to the fact that the information communication terminal 1 owned by user Z does not exist in the range of implementable communications, a communication with either of users D and E cannot be carried out due to the fact users D and E are each communicating with another apparatus whereas the information communication terminal 1 owned by user C exists in the range of implementable communications as an unregistered information communication terminal 1.

By the same token, let us assume for example that users A, D and E are each a user registered in the information communication terminal 1 owned by user B as a communication partner of user B. In this case, the ad-hoc user list display screen of user B displays a list shown in the middle of FIG. 25 as a list of users. The list of users shows user A in an online state, user D in a busy state, user E in a busy state and user C in an unknown state. That is to say, a communication with user A can be carried out, a communication with either of users D and E cannot be carried out due to the fact users D and E are each communicating with another apparatus whereas the information communication terminal 1 owned by user C exists in the range of implementable communications as an unregistered information communication terminal 1.

In the same way, let us assume for example that users D and E are each a user registered in the information communication terminal 1 owned by user C as a communication partner of user C. In this case, the ad-hoc user list display screen of user C displays a list shown on the right side of FIG. 25 as a list of users. The list of users shows user D in a busy state, user E in a busy state, user A in an unknown state and user C in an unknown state. That is to say, a communication with either of users D and E cannot be carried out due to the fact that users D and E are each communicating with another apparatus whereas the information communication terminals 1 owned by users A and C each exist in the range of implementable communications as an unregistered information communication terminal 1.

In addition, the ad-hoc user list display screen may also display the name of a user identifiable from at least a user ID included in various kinds of information broadcasted by another information communication terminal 1, the state of communication with the information communication terminal 1 owned by the user and, if necessary, other information. As described above, the state of communication with the information communication terminal 1 owned by the identified user can be an online, offline, busy or unknown state. In the examples shown in FIG. 25, the ad-hoc user list display screen displays the name of each user, the state of communication with the information communication terminal 1 owned by the user and information on a now playing musical content, that is, a musical content being reproduced. In addition, the ad-hoc user list display screen may also display information such as a text memo entered by the user if necessary.

Various kinds of information broadcasted by another information communication terminal 1 include information that cannot be displayed on the ad-hoc user list display screen. The information that cannot be displayed on the ad-hoc user list display screen may be recognized as a user information property.

Figure 25:
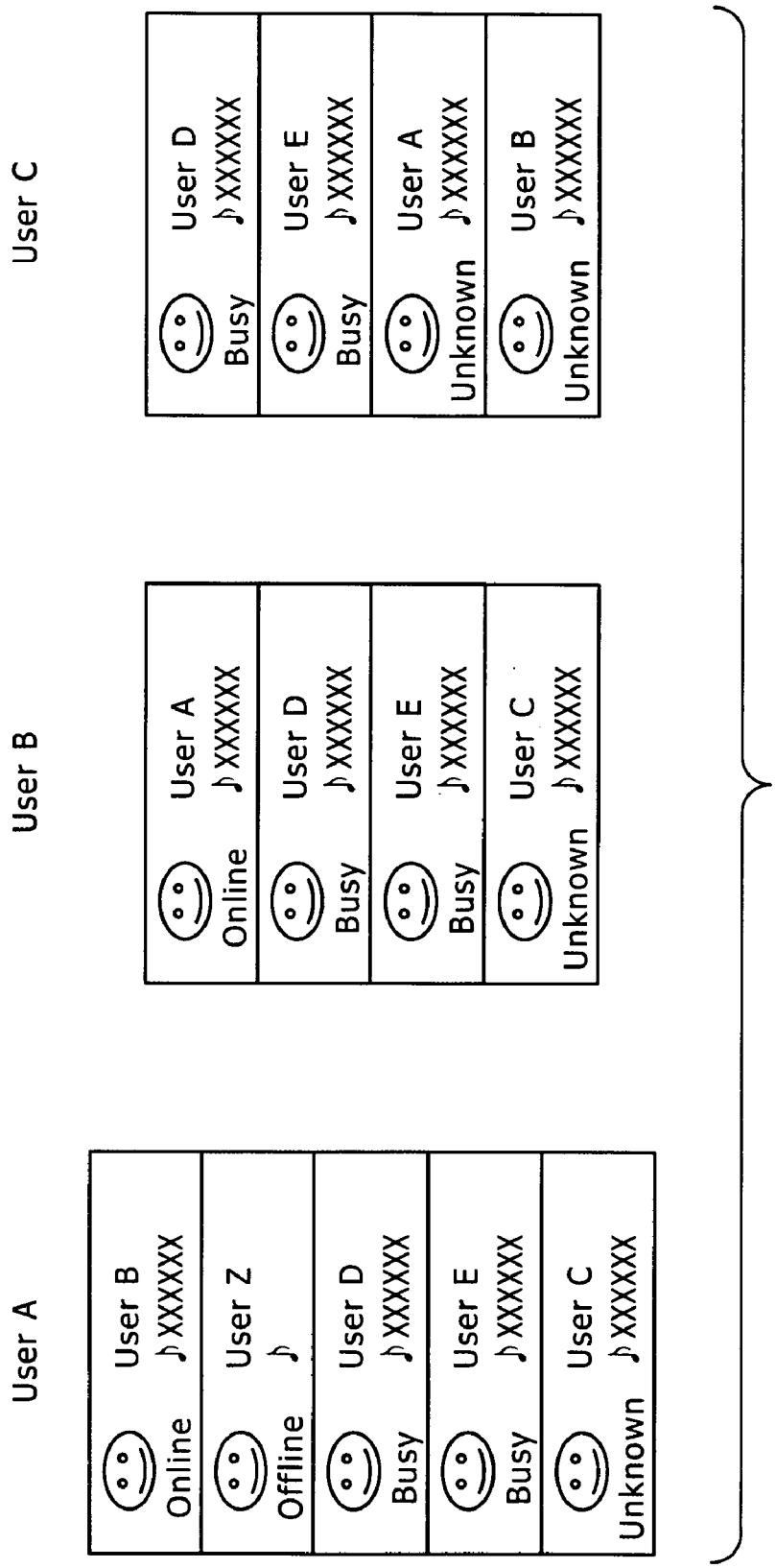
FIG. 25 is an explanatory diagram showing ad-hoc user list display screens.

In the examples shown in FIG. 25, let us assume that a decision is made by user A to confirm selection of the information communication terminal 1 owned by user C but not registered in the information communication terminal 1 owned by user A, a decision is made by user B to confirm selection of the information communication terminal 1 owned by user C but not registered in the information communication terminal 1 owned by user B or a decision is made by user C to confirm selection of the information communication terminal 1 owned by either of user A or B but not registered in the information communication terminal 1 owned by user C. In this case, a dialog box is displayed to show a message for verifying execution of a mutual registration process to register the selected user in the information communication terminal 1 owned by the selecting user and register the selecting user in the information communication terminal 1 owned by the selected user.

FIG. 26 is a diagram explaining typical user information exchanged between the information communication terminals 1 owned by the selecting and selected users serving as communication partners in the mutual registration process. As described above, the mutual registration process is carried out in order to register the selected user in the information communication terminal 1 owned by the selecting user and register the selecting user in the information communication terminal 1 owned by the selected user.

It is desirable to exchange information in the mutual registration process as information including an apparatus unique ID, a user ID with a set profile, a text, image data of a face icon, user color information, an ID used in a communication application and the ID of the instant messenger. Examples of the text entered by the user for the registration purpose are the URL of a home page of the user itself and sentences introducing the user itself. It is needless to say that the face icon to be displayed on a standby screen to be described later does not have to be a photo of the actual face of the user. The user color information set by the user is information on the display color of the background (or the so-called wallpaper) to be displayed during a process to communicate with the user as the background of the display unit 21. An example of the communication application cited above is a tool such as a chatting tool or an IP-telephone tool.

A message can be exchanged even between information communication terminals 1 owned by users not mutually registered in the information communication terminals 1 provided that the information communication terminals 1 exchanging the message exist in the range of implementable communications. For example, the radio communication module 148 employed in the information communication terminal 1 on the sender side transmits a message to a information communication terminal 1 on the recipient side as a message requesting the information communication terminal 1 serving as the message recipient to carry out a mutual registration process for registering the information communication terminals 1 in each other to in order to turn them into mutually registered terminals 1. After the information communication terminal 1 serving as the message recipient approves the request made by the information communication terminal 1 on the sender side, the information shown in FIG. 26 is exchanged between the terminals 1 and supplied to the application processors 131 employed in the terminals 1. The application processors 131 each supply the exchanged information to the flash memory 146 connected to the application processor 131 or either of the flash memory 156 and the large-capacity flash memory 154, which are connected to the audio processor 132. In this way, the exchanged information is stored in each specific one of the information communication terminals 1 as information on the other information communication terminal 1 owned by a user registered in the specific information communication terminal 1 as a communication partner capable of carrying out processing such as a process of exchanging files and a streaming reproduction process in an ad-hoc mode.

Between information communication terminals 1 mutually registering the other information communication terminal 1 as a communication partner capable of carrying out processing such as a process of exchanging files and a streaming reproduction process in an ad-hoc mode, a communication is always performed on a one-to-one basis in the same way as the communication between the information communication terminals 1-4 and 1-5 shown in FIG. 23 in order to implement the processing such as a process of exchanging files and processing to reproduce a musical content in a streaming reproduction process.

It is to be noted that, basically, all data files recorded internally in the information communication terminal 1 can be exchanged with the communication partner of the terminal 1 in the process of exchanging files. In the case of a data file exchanged in a file exchange process as a file having a protected copyright, however, the information communication terminal 1 serving as the communication partner receiving the data file in the file exchange process is not capable of opening (or reproducing) the file unless, for example, the information communication terminal 1 has a descramble key for decrypting the file.

In addition, in the case of a content to be reproduced in a streaming reproduction process as a content with a protected copyright in an ad-hoc mode by an information communication terminal 1 serving as a communication partner receiving the content in a file exchange process and having permission to reproduce the content, the information communication terminal 1 is not capable of opening (or reproducing) the data file containing the content unless, for example, the information communication terminal 1 has a descramble key for decrypting the streamed file.

By referring to FIGS. 27 to 32, the following description explains typical processing carried out by execution of the music tool 463 selected by confirmation from items included in a menu displayed on the home screen 451 explained earlier by referring to FIG. 14. As described before, the displayed menu is a list of application programs that can be executed in the information communication terminal 1 or, as an alternative, the displayed menu can also be a list of items each including a plurality of such application programs. The processing carried out by execution of the music tool 463 is typically a process to handle audio data, which is mainly musical data.

Figure 27:
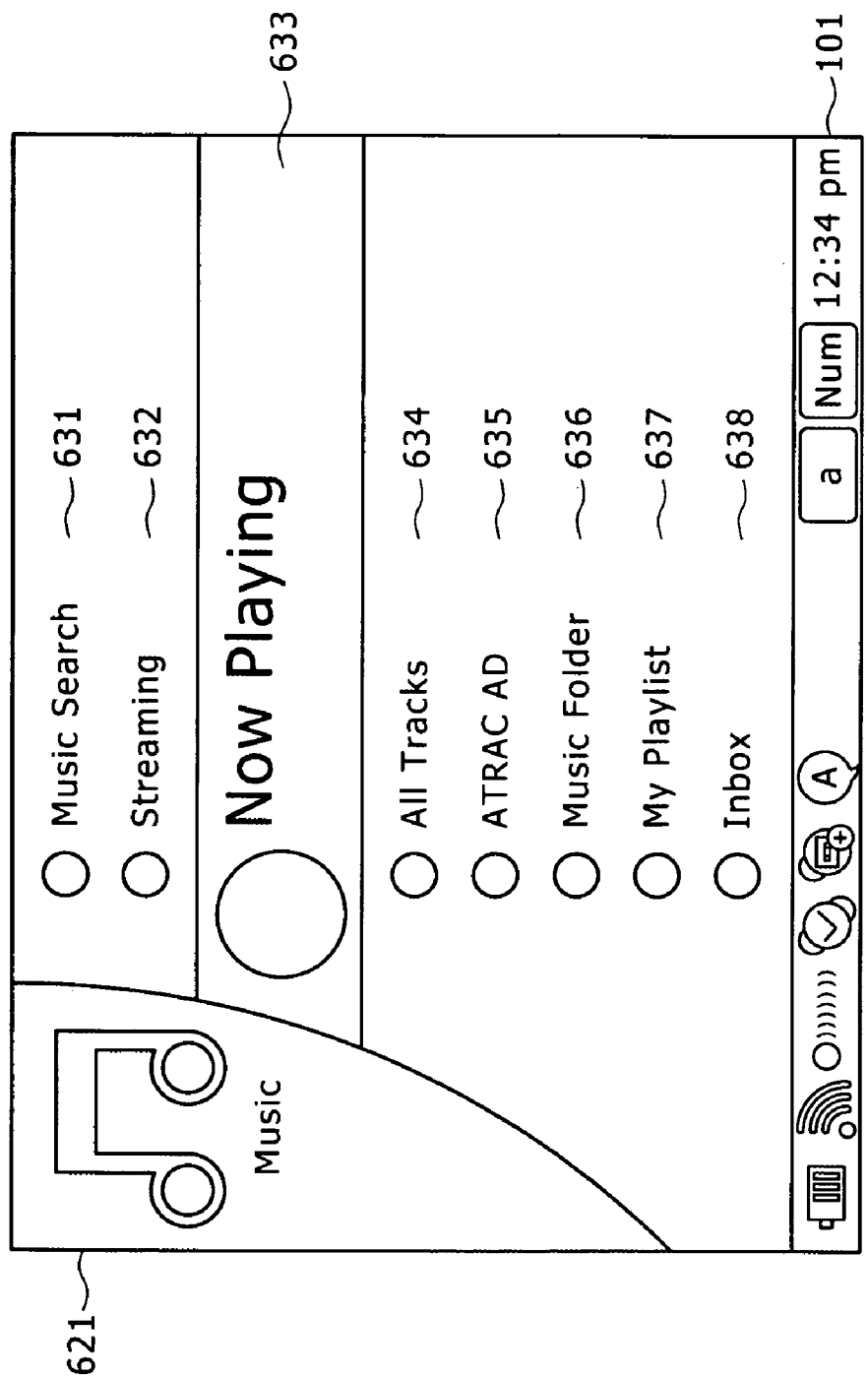
FIG. 27 is an explanatory diagram showing a menu screen.

FIG. 27 is an explanatory diagram showing a list menu screen 621 displayed on the display unit 21 as a list menu screen 621 of the music tool 463 selected by confirmation from items included in a menu displayed on the home screen 451 explained earlier by referring to FIG. 14. As shown in FIG. 27, the list menu screen 621 of the music tool 463 selected by confirmation from items included in a menu displayed on the home screen 451 shows a list of menu items such as Music Search 631, Streaming 632, Now Playing 633, All Tracks 634, ATRAC AD 635, Music Folder 636, My Playlist 637 and Inbox 638. The user is capable of selecting any desired one of the menu items by confirmation by operating the 4-direction keys 26 and the enter button 27.

If the Music Search menu item 631 is selected by confirmation from the list menu screen 621, for example, the music search application of the application layer explained before by referring to FIG. 12 is activated. The activated music search application displays a search screen 651 like one shown in FIG. 28. Then, the user enters a desired search key to a text input area 661 in order to select a musical content as follows.

First of all, when the user enters the desired search key to the text input area 661 and presses the enter button 27, the music search application activated by the application processor 131 supplies the search key received from the keyboard module 149 to the audio processor 132.

By carrying out the music-DB function explained earlier by referring to FIG. 13, the audio processor 132 searches content titles, album titles and artist names for ones each including the search keyword received from the music search application and supplies the result of the search process to the music search application activated by the application processor 131. Let us assume for example that the result of the search process is content titles each including the search keyword.

Figure 28:
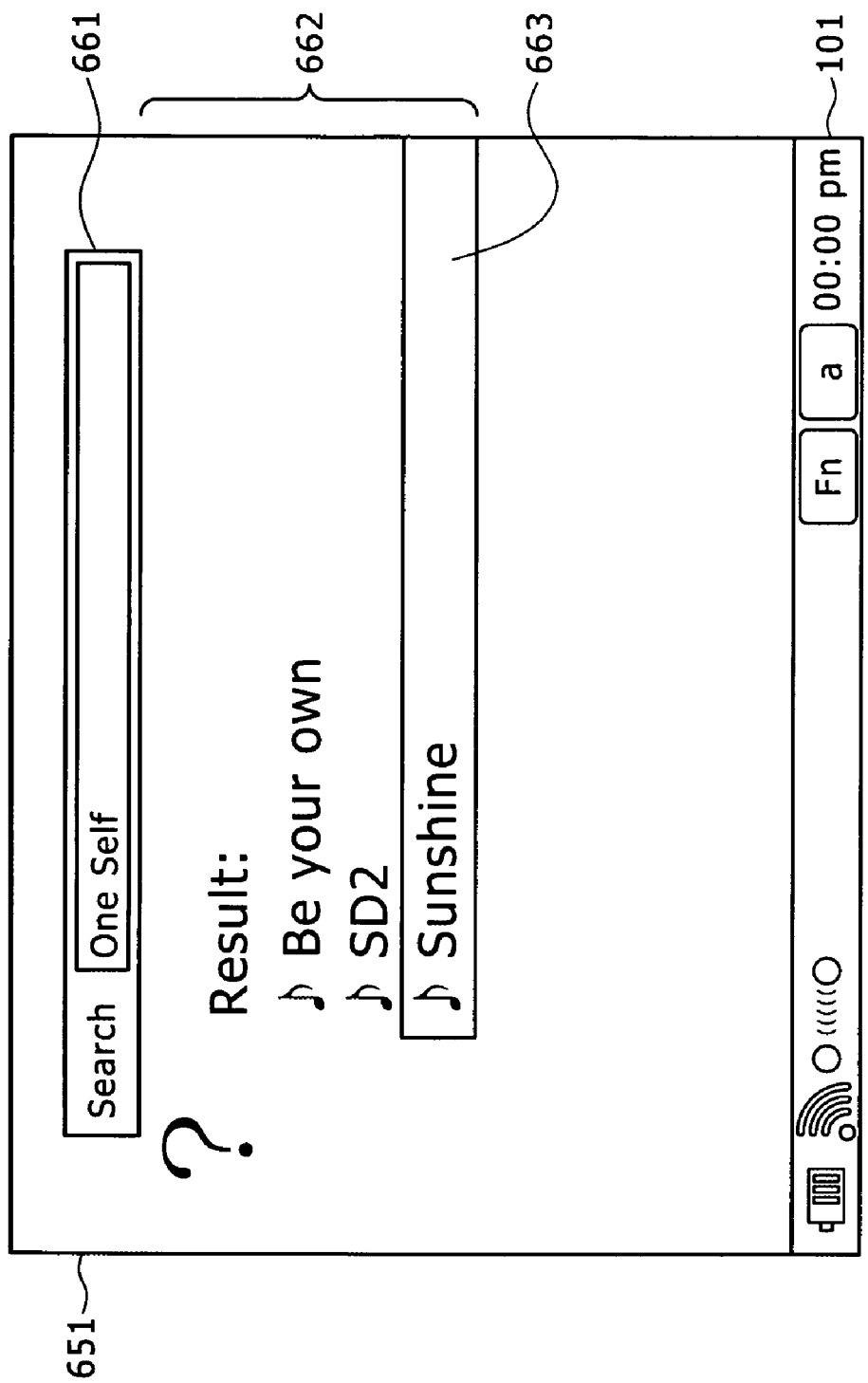
FIG. 28 is an explanatory diagram showing a search screen.

The music search application activated by the application processor 131 displays the search result, which is a list of content titles, in a search-result display area 662 of the search screen 651 as shown in FIG. 28.

Then, the user operates the 4-direction keys 26 in order to move the cursor 663 to the position of a desired content title selected from the list displayed in the search-result display area 662 of the search screen 651, and presses the enter button 27 to confirm the selection of the desired content title pointed to by the cursor 663. In this case, the application processor 131 activates the audio player explained before by referring to FIG. 12 and, if necessary, controls the audio processor 132 to output the musical data of the content, the title of which has been selected by confirmation by the user, as reproduced data. That is to say, by carrying out the function of the audio player explained before by referring to FIG. 13, the audio processor 132 starts a process to reproduce the musical data of the content, the title of which has been selected by confirmation by the user.

To put it concretely, the audio processor 132 reads out the musical data managed by making use of the music DB from the large-capacity flash memory 154 as the musical data selected by confirmation by the user. If the musical data selected by confirmation by the user is data with a protected copyright, the audio processor 132 carries out a process to descramble the data by making use of a function and data, which are stored in the DRM library. The audio processor 132 then supplies data obtained as the result of the descrambling process to the audio-signal processing module 152 and uses an audio coding/decoding function to control the audio-signal processing module 152 to carry out a decoding process and a D/A conversion process on the data obtained as the result of the descrambling process and supply the result of the decoding process and the D/A conversion process to the ringer speaker 42 or a headphone connected to the connector jack 52 to be output as reproduced data.

Figure 29:
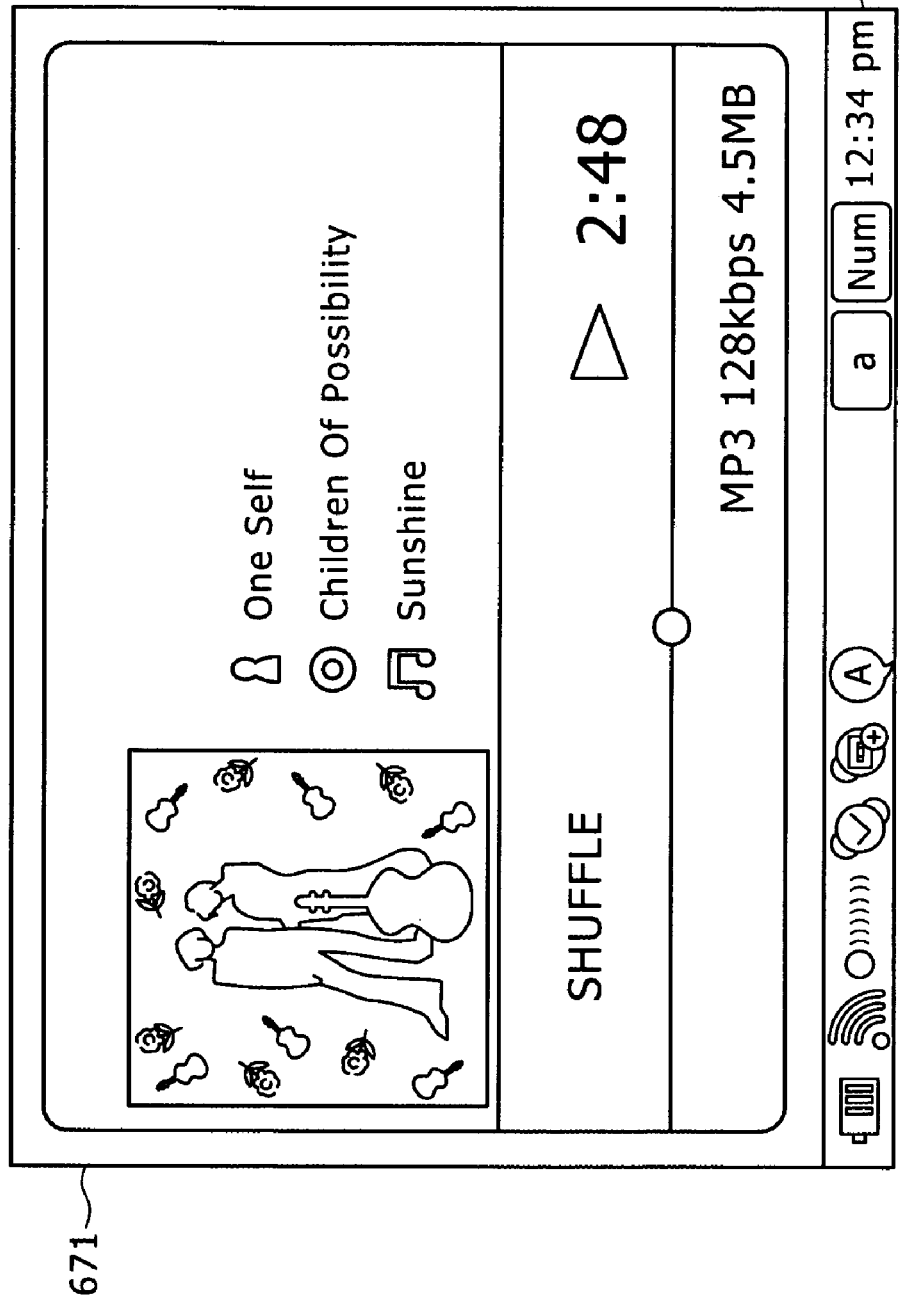
FIG. 29 is an explanatory diagram showing a musical-data reproduction display screen.

FIG. 29 is an explanatory diagram showing a musical-data reproduction display screen 671 appearing on the display unit 21 employed in the information communication terminal 1. The musical-data reproduction display screen 671 displays information on the musical content being reproduced. The information typically includes the title of the musical content, the name of an artist singing the content, the title of an album including the content and the thumbnail image of the jacket of the album.

Figure 30:
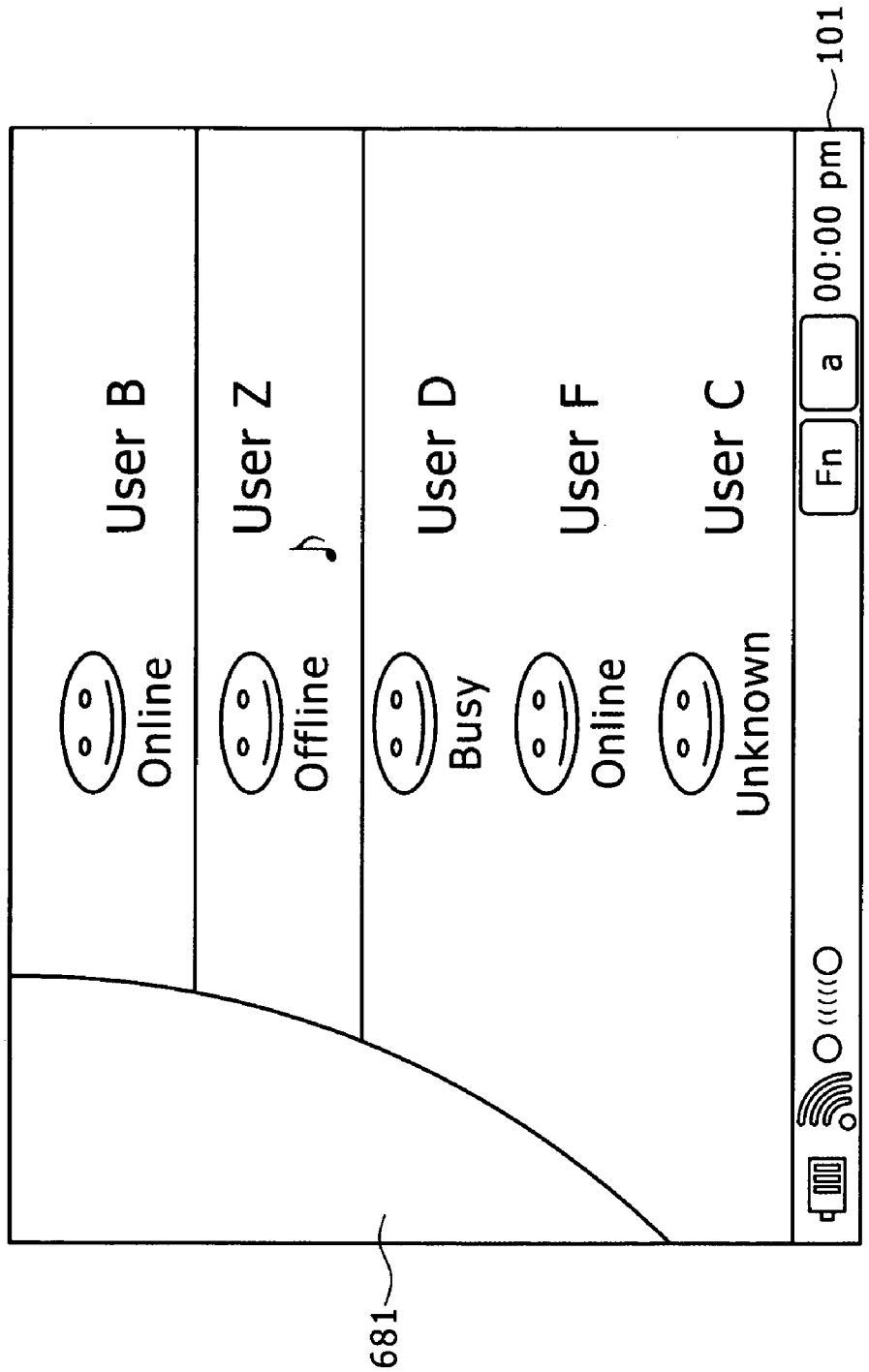
FIG. 30 is an explanatory diagram showing an ad-hoc user list display screen.

Let us now assume that the Streaming 632 is selected by confirmation from items of the menu screen 621 shown in FIG. 27 with the WLAN ad-hoc mode set. In this case, an ad-hoc user list screen 681 like one shown in FIG. 30 is displayed. If the Streaming 632 is selected by confirmation from items of the menu screen 621 shown in FIG. 27 without setting the WLAN ad-hoc mode, on the other hand, the information communication terminal 1 may display a dialog box including a message prompting the user to carry out an operation to set the WLAN ad-hoc mode. In this case, if the user carries out an operation to set the WLAN ad-hoc mode after selecting the Streaming 632 from the menu screen 621 shown in FIG. 27, an ad-hoc user list screen 681 like one shown in FIG. 30 is displayed.

As described before by referring to FIG. 25, the ad-hoc user list screen 681 basically shows a list of pieces of information on users each owning an information communication terminal 1 registered as an ad-hoc communication partner and users each owning an information communication terminal 1 located in a range of implementable communications but not registered as an ad-hoc communication partner.

Figure 31:
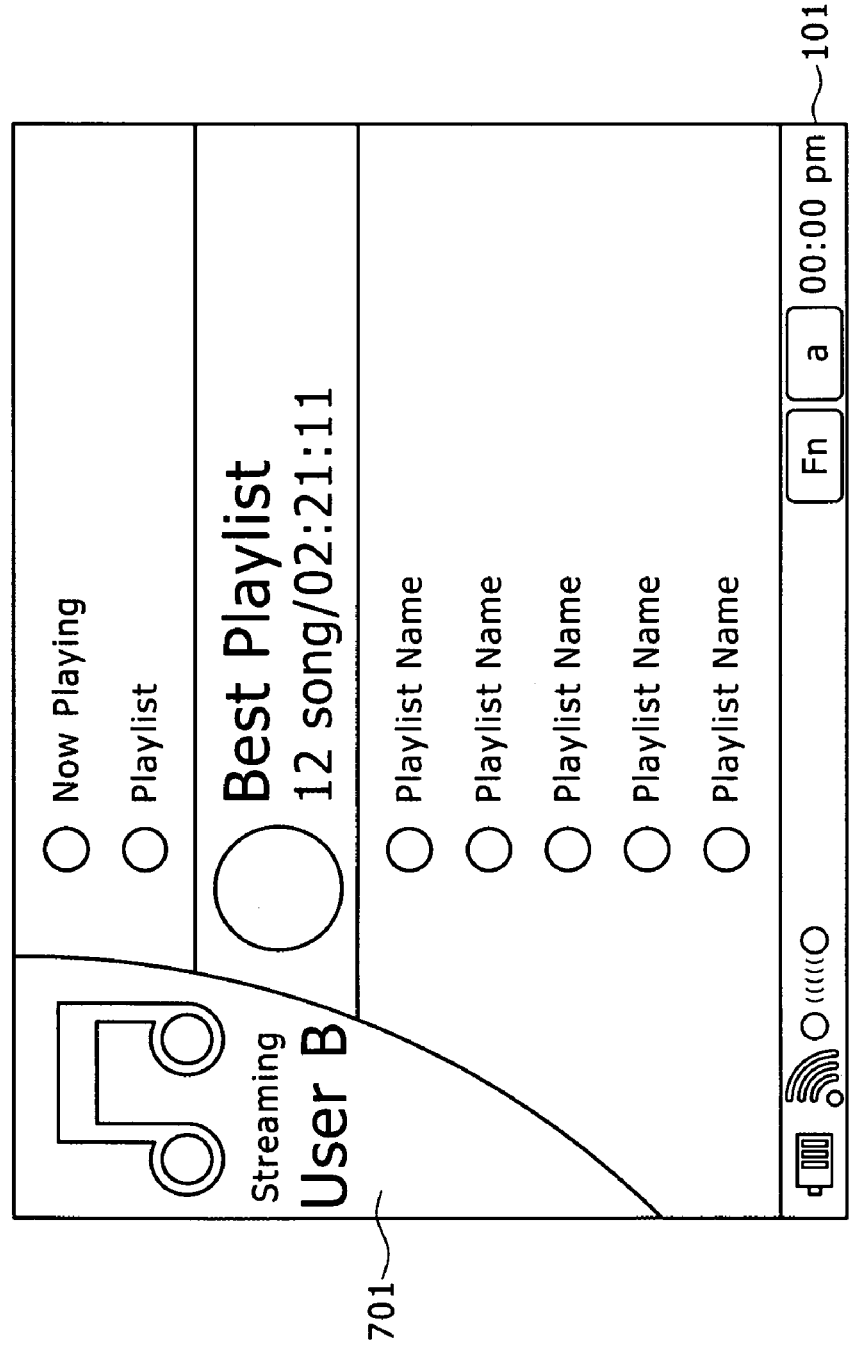
FIG. 31 is an explanatory diagram showing a released-playlist list display screen.

Let us assume for example that user B in an online state is selected by confirmation among users shown on the ad-hoc user list screen 681 of FIG. 30. In this case, the connection of the information communication terminal 1 to an information communication terminal 1 owned by user B in an online state is confirmed and disclosable playlists that can be disclosed to users by broadcasting are exchanged with user B. A playlist to be described later in detail is a list of some musical contents stored internally in the information communication terminal 1. Then, a disclosed-playlist list display screen 701 like one shown in FIG. 31 is displayed. As shown in the figure, the disclosed-playlist list display screen 701 is a list showing disclosed playlists received from the information communication terminal 1 owned by user B as disclosed playlists of user B and information selected from pieces of broadcasted information as information on a musical content being reproduced by (or now playing in) the information communication terminal 1 owned by user B. At that time, if the playlist including the musical content being reproduced by (or now playing in) the information communication terminal 1 owned by user B is a playlist disclosed to users, the disclosed-playlist list display screen 701 shows the playlist as a disclosed playlist in a selected state.

Figure 32:
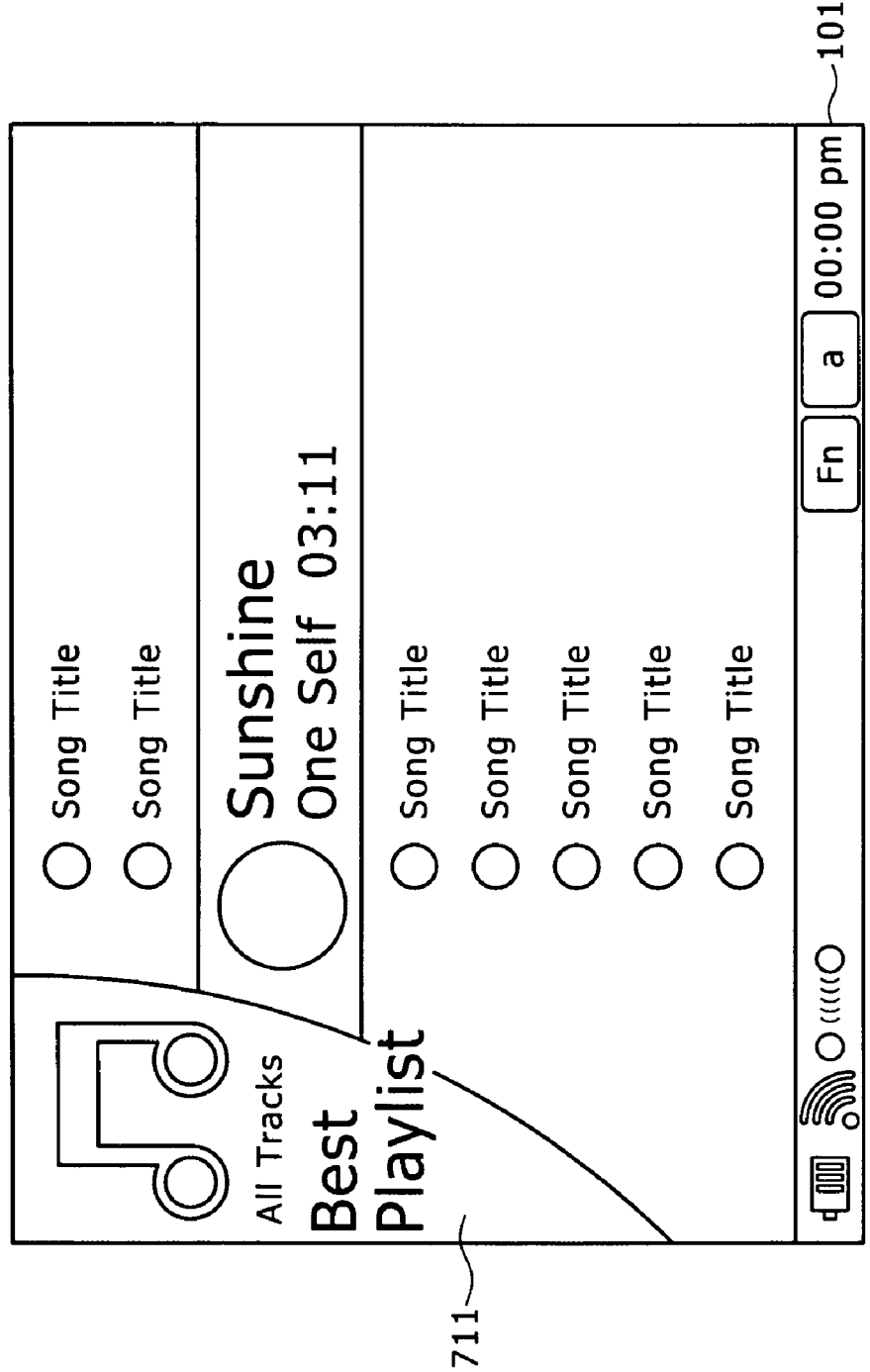
FIG. 32 is an explanatory diagram showing a track display screen.

Let us assume that the user selects by confirmation a desired playlist among the disclosed playlists shown on the disclosed-playlist list display screen 701 of FIG. 31 as disclosed playlists of user B. In this case, a track-list display screen 711 like one shown in FIG. 32 is shown. As shown in the figure, the track-list display screen 711 is a list of tracks included in the desired playlist selected by confirmation among the disclosed playlists shown on the disclosed-playlist list display screen 701. In other words, the track-list display screen 711 is a list of musical contents included in the desired playlist. If the user selects a desired track by confirmation among the tracks shown on the track-list display screen 711, the information communication terminal 1 reproduces the desired track while receiving the track from the information communication terminal 1 owned by user B in a streaming reproduction process.

To put it concretely, the music streaming application executed by the application processor 131 employed in the information communication terminal 1-1 owned by user A receives a signal representing an input operation carried out by the user from the input module 150 and controls the radio communication module 148 to transmit information specifying the musical content selected by user A by confirmation from those included in the desired playlist also selected by user A by confirmation to the information communication terminal 1-2 owned by user B.

At that time, the display unit 21 employed in the information communication terminal 1-2 owned by user B may or may not display a request made by user A as a request for a permission of a connection with the information communication terminal 1-1 owned by user A.

The music streaming application executed by the application processor 131 employed in the information communication terminal 1-2 receives information from the information communication terminal 1-1 through the radio communication module 148 employed in the information communication terminal 1-2 and supplies the information to the audio processor 132. The information received from the information communication terminal 1-1 is the information specifying the musical content selected by user A by confirmation from those included on the desired playlist also selected by user A by confirmation. The audio processor 132 reads out the musical content managed by making use of the music DB from the large-capacity flash memory 154 and supplies the musical data, which is streamed data, to the application processor 131. The application processor 131 then controls the radio communication module 148 to transmit the streamed musical content to the information communication terminal 1-1.

The music streaming application executed by the application processor 131 employed in the information communication terminal 1-1 receives the streamed musical content from the information communication terminal 1-2 through the radio communication module 148 employed in the information communication terminal 1-1. If the musical content is a content with a protected copyright, the audio processor 132 carries out a process to descramble the musical content by making use of a function and data, which are stored in the DRM library. The audio processor 132 then supplies data obtained as the result of the descrambling process to the audio-signal processing module 152 and uses an audio coding/decoding function to control the audio-signal processing module 152 to carry out a decoding process and a D/A conversion process on the data obtained as the result of the descrambling process and supply the result of the decoding process and the D/A conversion process to the ringer speaker 42 or a headphone connected to the connector jack 52 to be output as reproduced data.

At that time, the musical-data reproduction display screen 671 explained earlier by referring to FIG. 29 is displayed on the display unit 21 employed in the information communication terminal 1-1, which is reproducing the musical content in a streaming reproduction process. As shown in the figure, the musical-data reproduction display screen 671 displays information on the musical content being reproduced. The information typically includes the title of the musical content, the name of an artist singing the content, the title of an album including the content and the thumbnail image of the jacket of the album. In addition, the musical-data reproduction display screen 671 may also display other information such as information on the supplier of the streamed musical content. In this case, the supplier of the streamed musical content is user B.

If the Now Playing 633 is selected by confirmation from items shown on the menu screen 621 explained earlier by referring to FIG. 27, the application processor 131 activates the audio player described before by referring to FIG. 12 and, if necessary, controls the audio processor 132 to output the musical content desired by the user as reproduced musical data. That is to say, the function of the audio player described before by referring to FIG. 13 is executed by the audio processor 132 to start a process to reproduce the musical content selected by the user by confirmation.

The audio processor 132 executes the function of the music DB explained earlier by referring to FIG. 13 to generate a list of musical contents recorded in the large-capacity flash memory 154 or information on a file structure, supplying the list or the information to the application processor 131. The file structure can be a real file structure or a virtual file structure. The application processor 131 displays the list of musical contents recorded in the large-capacity flash memory 154 or the information on the file structure on the display unit 21 by making use of the function of the graphic library. The user enters an operation input selecting a desired musical content by confirmation from those included in the data displayed on the display unit 21.

The audio processor 132 reads out the desired musical content selected by confirmation from those managed by making use of the music DB from the large-capacity flash memory 154. If the desired musical content is a content with a protected copyright, the audio processor 132 carries out a process to descramble the musical content by making use of a function and data, which are stored in the DRM library. The audio processor 132 then supplies data obtained as the result of the descrambling process to the audio-signal processing module 152 and uses an audio coding/decoding function to control the audio-signal processing module 152 to carry out a decoding process and a D/A conversion process on the data obtained as the result of the descrambling process and supply the result of the decoding process and the D/A conversion process to the ringer speaker 42 or a headphone connected to the connector jack 52 to be output as reproduced data.

At that time, the musical-data reproduction display screen 671 explained earlier by referring to FIG. 29 is displayed on the display unit 21.

If the All Tracks 634 is selected from items shown on the menu screen 621 explained earlier by referring to FIG. 27, a list of all tracks recorded in the large-capacity flash memory 154 is displayed on the display unit 21.

It is to be noted that the a content such as musical data recorded in the large-capacity flash memory 154 can be a content directly acquired from a service provider for distributing data of musical contents, acquired from a predetermined recording medium or acquired from another information communication terminal 1 or the personal computer 13. In other words, the content such as musical data recorded in the large-capacity flash memory 154 can be acquired by carrying out a radio communication in the WLAN infrastructure mode or the WLAN ad-hoc mode or by a wire communication through a USB connection according to the MSC or MTP method.

The information communication terminal 1 is capable of recording contents such as musical data in the large-capacity flash memory 154 by classifying the contents in accordance with the acquisition technique, the coding/decoding type and the copyright protection method. For example, the data of musical contents may be received from different service providers for distributing musical contents conforming to different coding/decoding techniques and/or different copyright protection methods. In this case, the contents such as musical data are classified on the basis of the service providers, which can each be an organization or an enterprise.

In the following description, in accordance with a typical classification method, contents such as musical data are categorized into at least 3 groups, i.e., ATRAC AD, Music Folder and Inbox. Thus, when the All Tracks item 634 is selected by confirmation from items shown on the menu screen 621 explained earlier by referring to FIG. 27, a list of all tracks recorded in each of three folders, namely, ATRAC AD, Music Folder and Inbox, are displayed on the display unit 21.

Musical contents stored in the folders named ATRAC AD and Music Folder are contents each acquired by carrying out a radio communication in either the WLAN infrastructure mode or the WLAN ad-hoc mode. To be more specific, musical contents stored in the folder named ATRAC AD are contents each having the ATRAC format. On the other hand, musical contents stored in the folder named Music Folder are contents each having a format other than the ATRAC format. Musical contents stored in the folder named Inbox are contents each acquired by carrying out a wire communication through a USB connection.

In the past, the copyright management method and the coding/decoding method, which were adopted for acquired (or, in most cases, downloaded) musical contents, varied in many cases in accordance with the service provider for distributing the musical contents. In addition, in many cases, the traditional information communication terminal was provided with an application program to be executed to acquire a musical content from a service provider for distributing the musical contents and reproduce the acquired musical content. In such cases, the communication method permitted as a method for exchanging musical data also varied. On the other hand, the information communication terminal 1 is adapted to the WLAN infrastructure radio communication mode and the WLAN ad-hoc radio communication mode as well as the MSC and MTP methods adopted for the USB connection. Thus, by installing an application program (or, software codec or DRM protocol) proper for the WLAN infrastructure radio communication mode and the WLAN ad-hoc radio communication mode and/or the MSC and MTP methods in the information communication terminal 1, the information communication terminal 1 can be made capable of acquiring data of musical contents from a number of service providers as well as storing and reproducing the data.

If the ATRAC AD 635 is selected from items shown on the menu screen 621 explained earlier by referring to FIG. 27, a list of all tracks recorded in the ATRAC AD folder stored in the large-capacity flash memory 154 is displayed on the display unit 21. By the same token, if the Music Folder item 636 is selected by confirmation from items shown on the menu screen 621 explained earlier by referring to FIG. 27, a list of all tracks recorded in the 'Music Folder' folder stored in the large-capacity flash memory 154 is displayed on the display unit 21. In the same way, if the Inbox item 638 is selected by confirmation from items shown on the menu screen 621 explained earlier by referring to FIG. 27, a list of all tracks received in a file transfer through the USB connection and recorded in the 'Inbox' folder stored in the large-capacity flash memory 154 is displayed on the display unit 21.

Musical contents recorded in the folder named Inbox are each a content acquired from the personal computer 13 connected to the information communication terminal 1 by a USB connection. To put it in detail, musical contents recorded in the folder named Inbox are each a content acquired from the personal computer 13 connected to the information communication terminal 1 by a wire communication through the USB connection according to the MSC or MTP method adopted as the USB connection method.

As described above, in the past, the copyright management method and the coding/decoding method, which were adopted for acquired (or, in most cases, downloaded) musical contents, varied in many cases in accordance with the service provider for distributing the musical contents. In addition, in many cases, the traditional information communication terminal was provided with an application program to be executed to acquire a musical content from a service provider for distributing the musical contents and reproduce the acquired musical content. That is to say, in many cases, since the personal computer 13 has installed application programs provided by a plurality of service providers, a content (such as musical data) stored in the personal computer 13 can be handled only by a predetermined application program provided by a service provider supplying the content. In other words, in many cases, an operation to copy a content from the personal computer 13 connected to the information communication terminal 1 by a USB connection to the information communication terminal 1 can be carried out only by a predetermined application program provided by a service provider distributing the content. Even in such a case, the information communication terminal 1 is capable of acquiring contents such as musical data from the personal computer 13, which has received the data from a variety of service providers, as well as storing and reproducing the data. This is because the information communication terminal 1 is adapted to both the MSC and MTP modes adopted as the USB connection mode for the USB connection.

An operation to switch the USB connection mode from MSC to MTP or vice versa can be started by selecting the Tools 468 from the items shown on the home screen 451 explained before by referring to FIG. 14. The setting tool described earlier by referring to FIG. 13 as a tool for the application processor 131 has a function to switch the USB connection mode from MSC to MTP or vice versa by controlling the audio processor 132 to select the MSC or MTP software owned by the audio processor 132 as described earlier by referring to FIG. 13. In this way, the function used by application programs such the file exchange application can be switched.

If the My Playlist 637 is selected from items shown on the menu screen 621 explained earlier by referring to FIG. 27, a list of contents such as musical data is displayed in accordance with an input operation carried out by the user. To put it concretely, My Playlist is a list of contents (such as musical data) managed as a virtual file generated as a file of a virtual-file system in a process to classify the contents in accordance with a method determined by the user. As described before, the contents such as musical data are categorized into at least three groups, i.e., ATRAC AD, Music Folder and Inbox and recorded in three folders, namely, the aforementioned ATRAC AD, Music Folder and Inbox folders respectively. For example, the playlist is a list of favorite contents such as songs. In order to manage a number of musical contents, playlists are typically classified by genre into, for example, a playlist of indoor music, a playlist of orchestral music, a playlist of instrumental music and a playlist of vocal music. At the same time, playlists may also be classified by artist and/or performer into, for example, a playlist of music performed by musician A, a playlist of music performed by musician B, a playlist of music performed by orchestra A, a playlist of music performed by orchestra B, a playlist of music performed by conductor A and a playlist of music performed by conductor B. In addition, playlists may also be classified by composer into a playlist of music written by composer A and a playlist of music written by composer B.

In addition, it is needless to say that playlists represented by the My Playlist menu can organized in a layer structure consisting of a plurality of layers. For example, the playlists are classified by composer into large groups such as a playlist of music written by composer A and a playlist of music written by composer B. Then, music pertaining to each of the large groups is further classified by genre into middle groups such as a playlist of indoor music, a playlist of orchestral music, a playlist of instrumental music and a playlist of vocal music. Furthermore, music pertaining to each of the middle groups is classified by music title into small groups, which including the same title of music performed by different artist and/or performer, or orchestra. By organizing musical contents in a layer structure consisting of a plurality of layers as described above, the user is capable of searching the structure for a musical content, which the user wants to listen to, with ease. For example, the user can easily find a musical content included on the orchestral-music playlist pertaining to the playlist of music written by composer A as a content performed by orchestra B named the Xth Symphony Orchestra.

In addition, it is possible to have a plurality of My Playlist musical groups. In this case, it is needless to say that the same musical content may pertain to more than one My Playlist musical group. Since each of the My Playlist musical groups is a virtual file of a virtual-file system, a musical content is actually stored as a real data file in the large-capacity flash memory 154 even if the same musical content pertains to more than one My Playlist musical group.

On top of that, each of the My Playlist musical groups may include a flag indicating whether or not the group can be disclosed at an ad-hoc broadcasting time. That is to say, it is possible to provide a configuration in which only some of the My Playlist musical groups are disclosed at an ad-hoc broadcasting time.

Moreover, My Playlist can be newly created, deleted or updated with a high degree of freedom in accordance with an operation input entered by the user. For example, it is desirable to provide a configuration in which, when the user presses downward the option button 25 with information on My Playlist displayed on the display unit 21, a dialog box appears on the screen of the display unit 21 as a box for letting the user select an operation to newly create, delete or update My Playlist.

Figure 33:
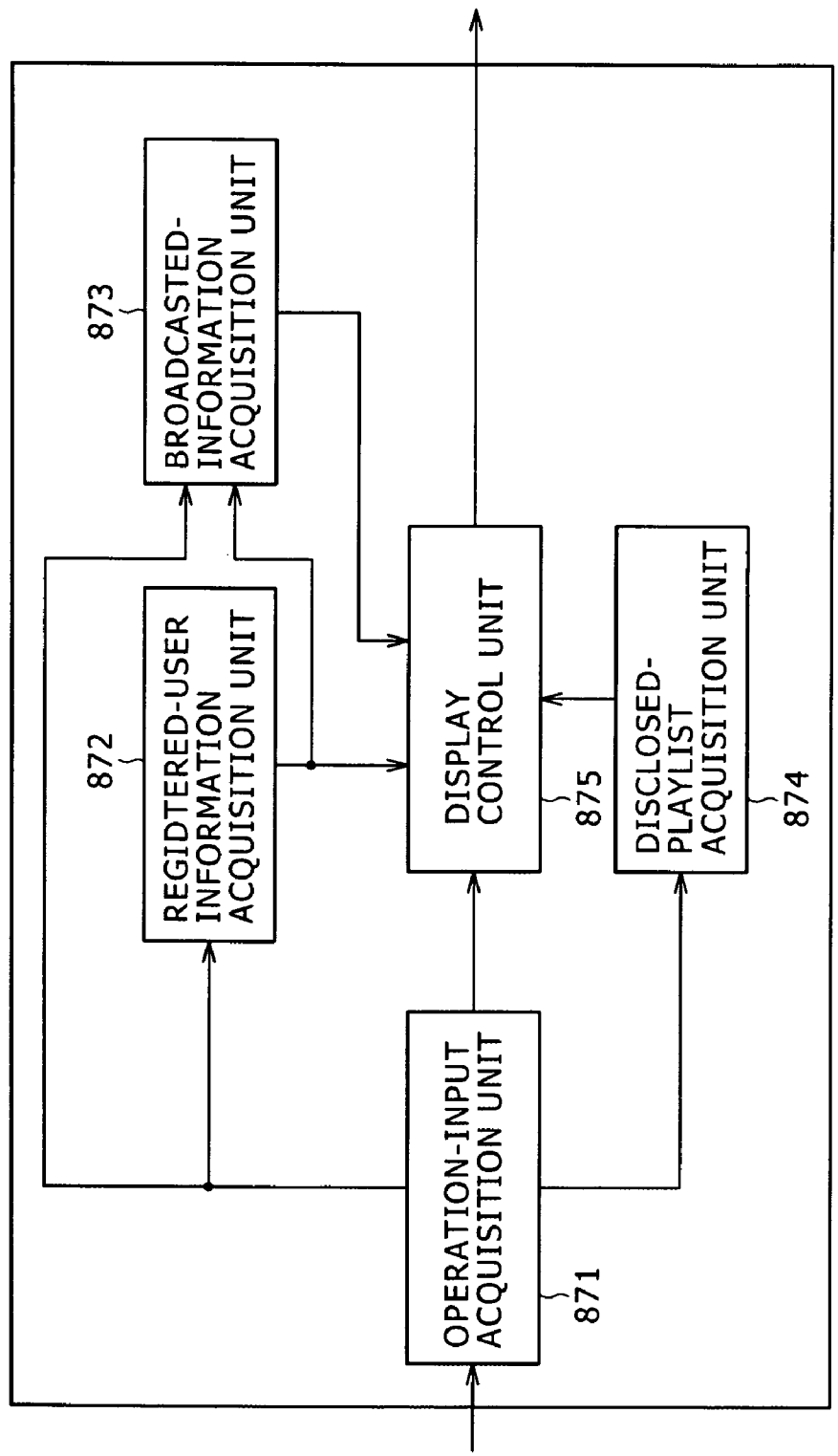
FIG. 33 is a functional block diagram showing functions of a menu display tool.

FIG. 33 is a functional block diagram showing functions of a menu display tool shown in FIG. 12 as a tool employed in the application processor 131. The menu display tool is activated in execution of control of a process to display a musical-data reproduction display screen 671 shown in FIG. 29 as a screen displayed in a streaming reproduction process, which is carried out to reproduce a musical content being received from another information communication terminal 1 when a streaming menu item 632 is selected from items displayed on the menu screen 621 shown in FIG. 27 and the selection of the streaming menu item 632 is confirmed. It is to be noted that the menu display tool employed in the application processor 131 further has a function other than the functions shown in FIG. 33 for controlling displaying of the other display screen. However, the description is omitted here.

As shown in FIG. 33, the menu display tool includes an operation-input acquisition unit 871, a registered-user information acquisition unit 872, a broadcasted-information acquisition unit 873, a disclosed-playlist acquisition unit 874 and a display control unit 875. The operation-input acquisition unit 871 is a section for receiving a signal representing an operation input entered by the user from the input module 150 shown in FIG. 11 by way of a device driver under control executed by the OS.

The registered-user information acquisition unit 872 is a section for acquiring information on a registered user from typically the large-capacity flash memory 154 by way of the audio processor 132 through a device driver under control executed by the OS. The information on a registered user is also referred to hereafter as registered-user information. A registered user is a user capable of serving as a communication partner in a music streaming reproduction process or a file transfer process in the WLAN ad-hoc mode. A registered user may also be a user with which communications can be carried out by executing a plurality of programs to carry out the communications by making use of the WLAN infrastructure mode in the WLAN structure mode.

The broadcasted-information acquisition unit 873 is a section for acquiring information broadcasted in the WLAN ad-hoc mode explained earlier by referring to FIG. 24 and received by the radio communication module 148 by way of a device driver under control executed by the OS. The information broadcasted in the WLAN ad-hoc mode is also referred to as broadcasted information.

The disclosed-playlist acquisition unit 874 is a section for acquiring a disclosed playlist transmitted by another information communication terminal 1 serving as a source supplying musical data to be reproduced in a streaming reproduction process and received by the radio communication module 148.

The display control unit 875 is a section for generating a display screen related to streaming operations in accordance with an operation input received from the operation-input acquisition unit 871 and on the basis of the registered-user information received from the registered-user information acquisition unit 872, the broadcasted information received from the broadcasted-information acquisition unit 873 as well as the disclosed playlist received from the disclosed-playlist acquisition unit 874 and for displaying the generated display screen on the display unit 21 by controlling the display module 142, which controls a device driver through the OS. An example of the display screen is the ad-hoc user list screen 681 shown in FIG. 30.

Figure 34:
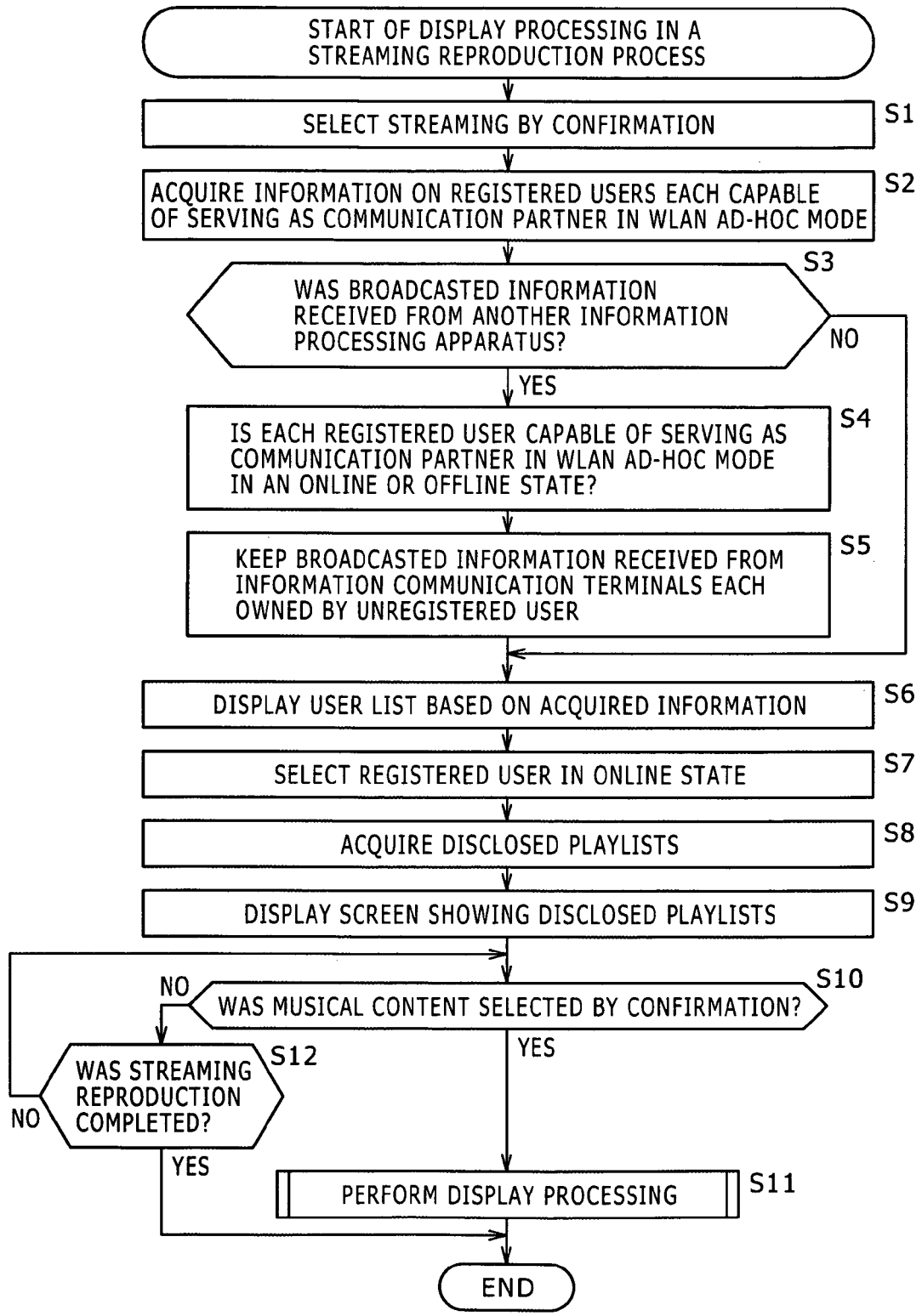
FIG. 34 shows a flowchart referred to in explanation of processing to display a screen in a streaming reproduction process.

By referring to a flowchart shown in FIG. 34, the following description explains processing carried out by the menu display tool of the application processor 131 to display screens in a streaming reproduction process to reproduce a musical content being received from another information communication terminal 1 when the streaming menu item 632 is selected from those shown on the menu screen 621 shown in FIG. 27 and the selection of the streaming menu item 632 is confirmed.

The flowchart shown in the figure begins with a step S1 at which the user enters an operation input to select the streaming menu item 632 from those shown on the menu screen 621 and confirms the selection of the streaming menu item 632. Then, the operation-input acquisition unit 871 notifies the registered-user information acquisition unit 872, the broadcasted-information acquisition unit 873 and the display control unit 875 that the streaming menu item 632 has been selected from those appearing on the menu screen 621 shown in FIG. 27 and the selection of the streaming menu item 632 has been confirmed.

Subsequently, at the next step S2, the registered-user information acquisition unit 872 reads out information on registered users each capable of serving as a communication partner in the WLAN ad-hoc mode from the large-capacity flash memory 154 typically through the audio processor 132 and supplies the information to the display control unit 875.

Then, at the next step S3, the broadcasted-information acquisition unit 873 produces a result of determination as to whether or not broadcasted information has been received from another information communication terminal 1. If the result of the determination indicates that broadcasted information has been received from another information communication terminal 1, the flow of the processing goes on to a step S4. If the determination result produced at the step S3 indicates that broadcasted information has not been received from another information communication terminal 1, on the other hand, the flow of the processing goes on to a step S6, skipping processes of steps S4 and S5.

At the step S4, the broadcasted-information acquisition unit 873 passes on the broadcasted information to the display control unit 875. On the basis of the registered-user information and the broadcasted information, the display control unit 875 produces a result of determination as to whether each of the registered users each capable of serving as a communication partner in the WLAN ad-hoc mode is in an online or offline state.

Then, at the next step S5, on the basis of the registered-user information and the broadcasted information, the broadcasted-information acquisition unit 873 extracts broadcasted information, which has been received from information communication terminals 1 each owned by an unregistered user, from the received broadcasted information and supplies the extracted information to the display control unit 875.

Subsequently, at the next step S6, on the basis of the determination result produced at the step S4, the information supplied to the display control unit 875 at the step S5, the registered-user information or the broadcasted information, the display control unit 875 generates an ad-hoc user list screen 681 and displays the ad-hoc user list screen 681 on the display unit 21. The ad-hoc user list screen 681 is a screen showing a list of pieces of information on users as shown in FIG. 30.

Then, at the next step S7, a registered user in an online state is selected from a list shown on the ad-hoc user list screen 681 as the list of pieces of information on users and the selection of the user is confirmed. Let us assume for example that user B is selected. Then, the operation-input acquisition unit 871 notifies the disclosed-playlist acquisition unit 874 that user B has been selected. Subsequently, at the next step S8, the disclosed-playlist acquisition unit 874 acquires a disclosed playlist set by user B through an ad-hoc communication engine executed by the application processor 131, and supplies the playlist to the display control unit 875.

When registered user B in an online state is selected from a list shown on the ad-hoc user list screen 681 as the list of pieces of information on users and the selection of the user is confirmed, the ad-hoc communication engine executed by the application processor 131 establishes streaming connection with an information communication terminal 1 owned by user B and obtains the disclosed playlist.

Then, at the next step S9, on the basis of the disclosed playlist obtained at the step S8 and now-playing information included in the broadcasted information received from the information communication terminal 1 owned by the selected user, the display control unit 875 generates a disclosed-playlist list display screen 701 like one shown in FIG. 31 and displays the generated disclosed-playlist list display screen 701 on the display unit 21.

Subsequently, at the next step S10, on the basis of an operation input received from the operation-input acquisition unit 871, the display control unit 875 produces a result of determination as to whether or not a musical content has been selected and the selection of the musical content has been confirmed. If the result of the determination indicates that a musical content has been selected and the selection of the musical content has been confirmed, the flow of the processing goes on to a step S11.

Let us assume for example that the now playing item shown in FIG. 31 or a predetermined disclosed playlist is selected and the selection is confirmed. If a predetermined disclosed playlist is selected and the selection is confirmed, musical data included in the selected disclosed playlist shown in FIG. 32 may then be selected and the selection is confirmed. In other words, if a musical track is selected from the track display screen 711 showing a list of musical tracks, the selection of the musical track can then be confirmed. In this case, the flow of the processing goes on to the step S11.

At the step S11, predetermined display processing is carried out. Details of this processing will be explained later by referring to a flowchart shown in FIG. 35. It is to be noted that, in this case, the application processor 131 starts a music streaming reproduction process by receiving musical data to be reproduced in the music streaming reproduction process from another information communication terminal 1 serving as the source supplying the musical data.

The flowchart shown in the figure begins with a step S21 at which the display control unit 875 extracts user-color information and wallpaper information, which are shown in FIG. 26 as attributes of an apparatus serving as a source supplying the musical data to be reproduced in the music streaming reproduction process, from the registered-user information. The display control unit 875 also extracts text memo information from the broadcasted information shown in FIG. 24 as the broadcasted information received from the information communication terminal 1 serving as the source supplying the musical data.

Subsequently, at the next step S22, the display control unit 875 generates a musical-data reproduction display screen 671 like one shown in FIG. 36 and displays the generated musical-data reproduction display screen 671 on the display unit 21. As shown in the figure, the musical-data reproduction display screen 671 includes a content-introduction information display area 671A and a content-reproduction information display area 671B. The content-introduction information display area 671A has a background color based on the user-color information of an apparatus serving as a source supplying the musical data to be reproduced in the music streaming reproduction process. On the other hand, the content-reproduction information display area 671B is an area showing a text based on the text memo information of the same apparatus serving as the source supplying the musical data to be reproduced in the music streaming reproduction process. An example of the text is the name of the user. In the case of the example shown in the figure, the name of the user is xxxxx.

Then, at the next step S23, on the basis of an operation input received from the operation-input acquisition unit 871, the display control unit 875 produces a result of determination as to whether or not a command to change the display screen has been received. If the result of the determination indicates that a command to change the display screen has been received, the flow of the processing goes on to a step S24.

At the step S24, the display control unit 875 produces a result of determination as to whether or not the received command is a command to change the display screen to a musical-data reproduction display screen 671. If the result of the determination indicates that the received command is not a command to change the display screen to a musical-data reproduction display screen 671, the flow of the processing goes on to a step S25.

At the step S25, the display control unit 875 generates a display screen according to the operation input as a screen showing a wallpaper based on the wallpaper information extracted at the step S21 as an attribute of an apparatus serving as a source supplying the musical data to be reproduced in the music streaming reproduction process, and displays the generated display screen on the display unit 21.

Figure 37:
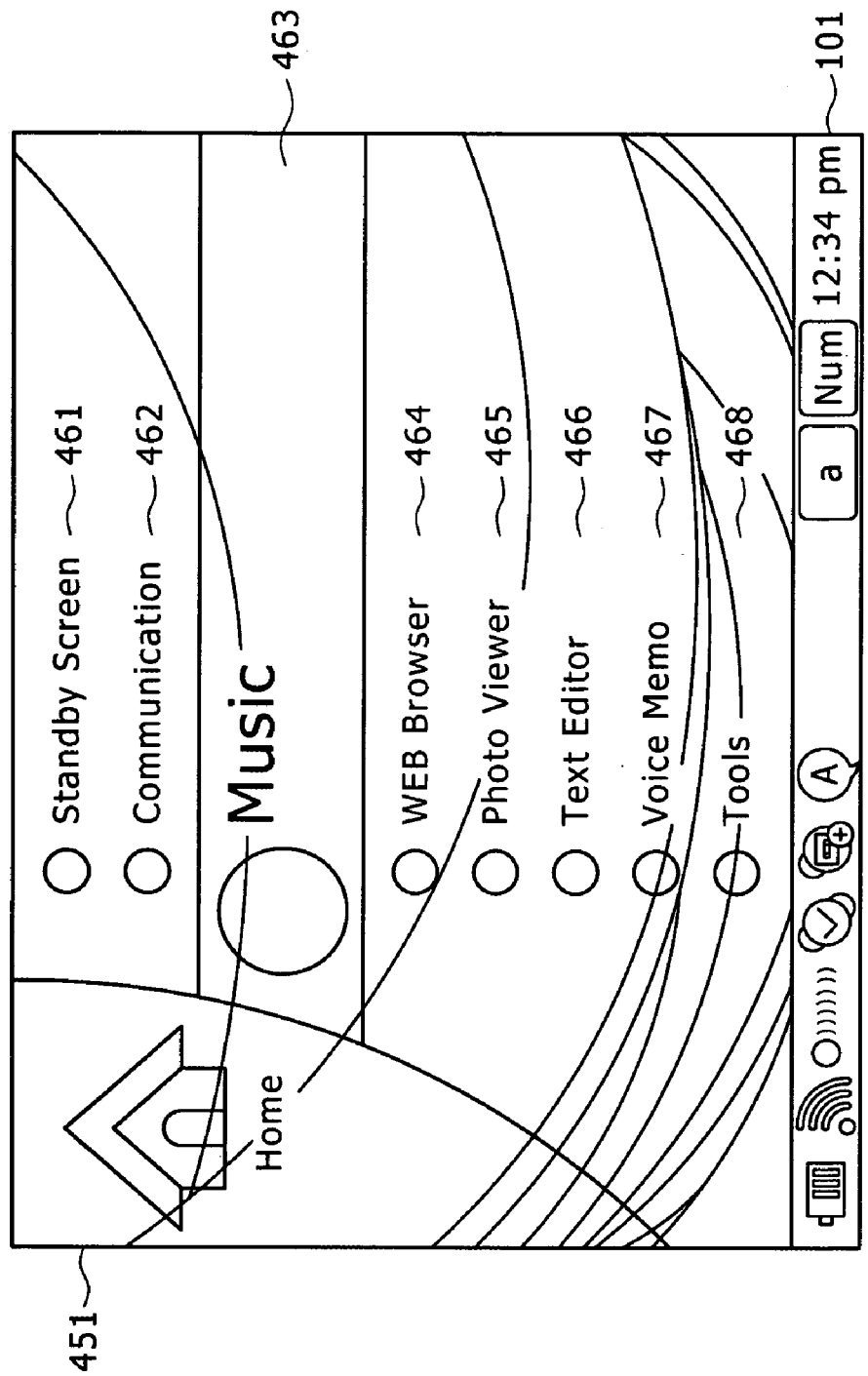
FIG. 37 is an explanatory diagram showing another home screen.

When the home button 23 is operated with the musical-data reproduction display screen 671 of FIG. 36 displayed, for example, the home screen 451 showing a wallpaper based on the wallpaper information received as an attribute of an apparatus serving as a source supplying the musical data to be reproduced in the music streaming reproduction process is displayed as shown in FIG. 37.

Then, the flow of the processing goes back to the step S23 to repeat the process of this step and the subsequent steps.

If the determination result produced at the step S24 indicates that the received command is a command to change the display screen to a musical-data reproduction display screen 671, on the other hand, the flow of the processing goes back to the step S22 to repeat the process of this step and the subsequent steps. As described above, the flow of the processing may go on from the step S24 to the step S25 at which the home screen 451 is displayed. If the back button 24 is operated in a process carried out previously at the step S25 after the home screen 451 is displayed, the determination result produced at the step S24 indicates that the received command is a command to change the display screen to a musical-data reproduction display screen 671 shown in FIG. 36 as a screen according to an apparatus serving as a source supplying the musical data to be reproduced in the music streaming reproduction process.

If the determination result produced at the step S23 indicates that a command to change the display screen has not been received on the other hand, the flow of the processing goes on to a step S26 in order to produce a result of determination as to whether or not the streaming reproduction process has been completed. If the result of determination indicates that the streaming reproduction process has not been completed, the flow of the processing goes back to the step S23 to repeat the process of this step and the subsequent steps.

If the determination result produced at the step S26 indicates that the streaming reproduction process has been completed, on the other hand, the processing is ended and control is returned to the processing represented by the flowchart shown in FIG. 34.

If the determination result produced at the step S10 of the flowchart shown in FIG. 34 indicates that a musical content has not been selected or the selection of the musical content has not been confirmed, on the other hand, the flow of the processing goes on to a step S12 in order to produce a result of determination as to whether or not the streaming reproduction process has been completed. If the result of the determination indicates that the streaming reproduction process has not been completed, the flow of the processing goes back to the step S10 to repeat the process of this step and the subsequent steps.

If the determination result produced at the step S12 indicates that the streaming reproduction process has been completed, on the other hand, the display processing is ended.

As described above, the display processing is carried out during a streaming reproduction process. It is to be noted that, if a musical content other than that reproduced in a streaming reproduction process is reproduced, the other musical content is reproduced in accordance with a procedure represented by a flowchart shown in FIG. 38.

That is to say, if the title of a musical content obtained as a result of the search process is selected by making use of the cursor 663 and the selection of the musical content is confirmed by pressing the determination button 27 as explained earlier by referring to FIG. 28, a process to reproduce the selected content is started and the following display processing is commenced.

Figure 38:
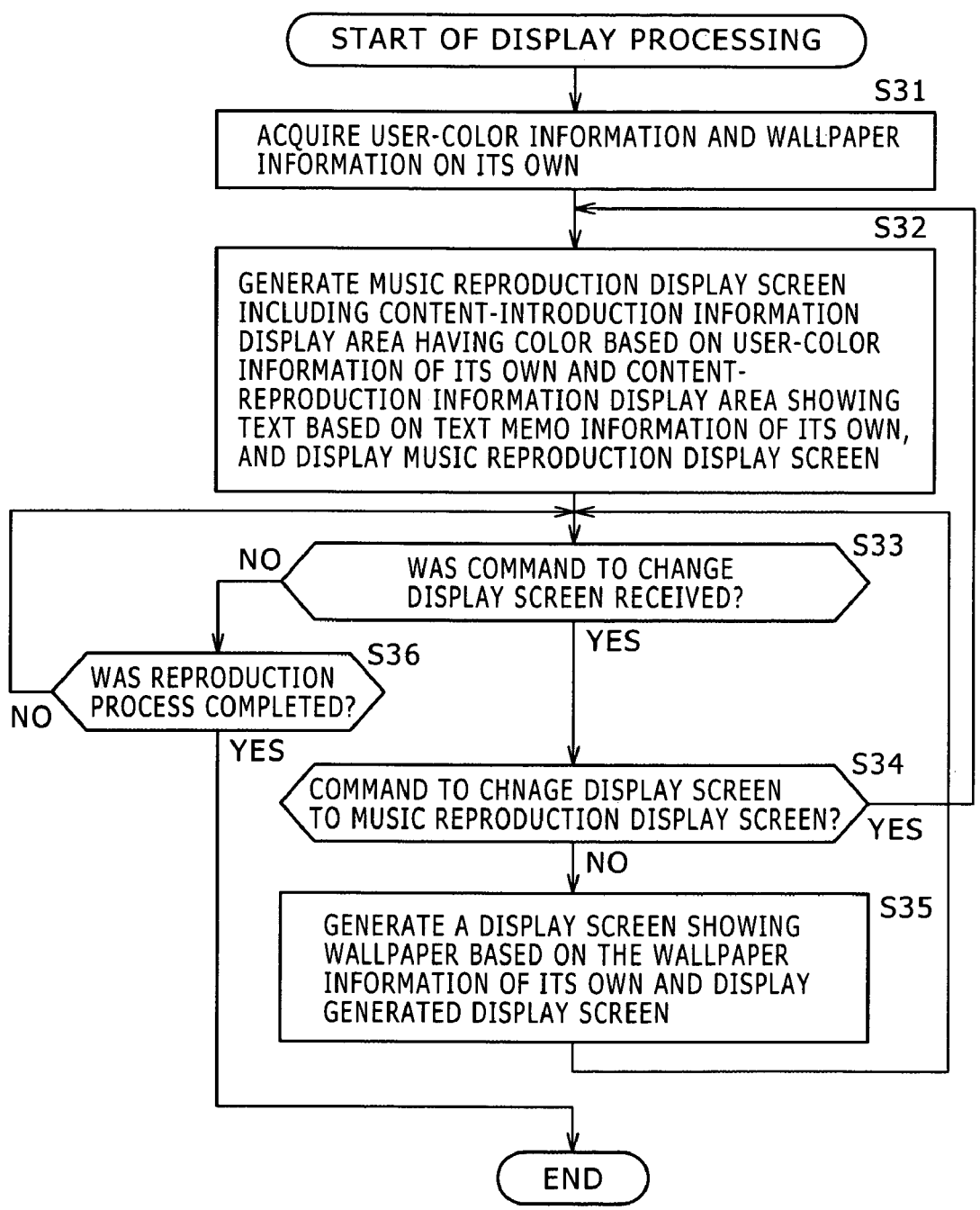
FIG. 38 shows a flowchart referred to in explanation of display processing carried out in a normal reproduction process.

To put it in more detail, the flowchart shown in FIG. 38 as a flowchart representing the display processing begins with a step S31 to acquire user-color information and wallpaper information, which have been stored in the large-capacity flash memory 154 as registered-user information for the user itself.

Then, the flow of the processing goes on to the next step S32 in order to generate a musical-data reproduction display screen 671 and display the generated musical-data reproduction display screen 671 like the one as shown in FIG. 29 on the display unit 21. As shown in the figure, the musical-data reproduction display screen 671 includes a content-introduction information display area 671A and a content-reproduction information display area 671B. The content-introduction information display area 671A has a background color based on the user-color information obtained at the step S31 as the user-color information for the user itself. In the case of the example shown in FIG. 29, the background has no color. On the other hand, the content-reproduction information display area 671B is an area showing normal information.

Subsequently, the flow of the processing goes on to the next step S33 in order to produce a result of determination as to whether or not a command to change the display screen has been received. If the result of the determination indicates that a command to change the display screen has been received, the flow of the processing goes on to a step S34.

At the step S34, the received command to change the display screen is examined in order to produce a result of determination as to whether or not the received command is a command to change the display screen to a musical-data reproduction display screen 671. If the result of the determination indicates that the received command to change the display screen is not a command to change the display screen to a musical-data reproduction display screen 671, the flow of the processing goes on to a step S35.

At the step S35, a display screen according to the command is generated as a screen showing a wallpaper based on the wallpaper information obtained at the step S31 and displayed on the display unit 21.

When the home button 23 is operated with the musical-data reproduction display screen 671 of FIG. 29 displayed, for example, the home screen 451 showing a wallpaper based on the wallpaper information of the user itself is displayed as shown in FIG. 14. In the case of the example shown in FIG. 14, the wallpaper has a solid color.

Then, the flow of the processing goes back to the step S33 to repeat the process of this step and the subsequent steps.

If the determination result produced as the step S34 indicates that the received command to change the display screen is a command to change the display screen to a musical-data reproduction display screen 671, on the other hand, the flow of the processing goes back to the step S32 to repeat the process of this step and the subsequent steps. As described above, the flow of the processing may go on from the step S34 to the step S35 at which the home screen 451 is displayed. The command to change the display screen to a musical-data reproduction display screen 671 can be entered by the user for example by operating the back button 24 in the process carried out previously at the step S35 after the home screen 451 is displayed.

If the determination result produced at the step S33 indicates that a command to change the display screen has not been received, on the other hand, the flow of the processing goes on to a step S36 in order to produce a result of determination as to whether or not the reproduction process has been completed. If the result of the determination indicates that the reproduction process has not been completed, the flow of the processing goes back to the step S33 to repeat the process of this step and the subsequent steps.

If the determination result produced as the step S36 indicates that the reproduction process has been completed, on the other hand, the display processing is ended.

That is to say, in a streaming reproduction process, unlike a reproduction other than the streaming reproduction process, the content-introduction information display area 671A having a background color based on the user-color information obtained as the user-color information for a user owning an apparatus serving a source supplying the musical data to be reproduced in the music streaming reproduction process is displayed as shown in FIG. 36. In a process to display a screen other than the musical-data reproduction display screen 671, the wallpaper of the other screen is based on the wallpaper information received as an attribute of the apparatus serving as the source supplying the musical data to be reproduced in the music streaming reproduction process as shown in FIG. 37. Thus, the screen displayed during a streaming reproduction process can have abundant variations.

In a streaming reproduction process, information on an apparatus serving as a source supplying a musical content to be reproduced in the music streaming reproduction process is shown typically in the content-reproduction information display area 671B. An example of the information on an apparatus serving as a source supplying a musical content to be reproduced in the music streaming reproduction process is the name of a user owning the apparatus serving as the source. Thus, the user can be notified of not only the background color of the content-introduction information display area 671A, but also a person who owns an apparatus serving as a source supplying a musical content to be reproduced in the music streaming reproduction process.

It is to be noted that, in accordance with the above description, if the reproduction process is a streaming reproduction process, a display screen according to an apparatus serving as a source supplying a musical content to be reproduced in the music streaming reproduction process is displayed at anytime. However, it is also possible to provide a configuration in which such a display screen can be displayed only during a reproduction process carried out by the apparatus serving as the source to reproduce a musical content being reproduced in a streaming reproduction process.

Also in this case, the same processing as the processing represented by the flowchart shown in FIG. 34 is carried out. In this case, however, the display processing carried out at the step S11 of the flowchart shown in FIG. 34 is implemented in accordance with a flowchart shown in FIG. 39.

Figure 39:
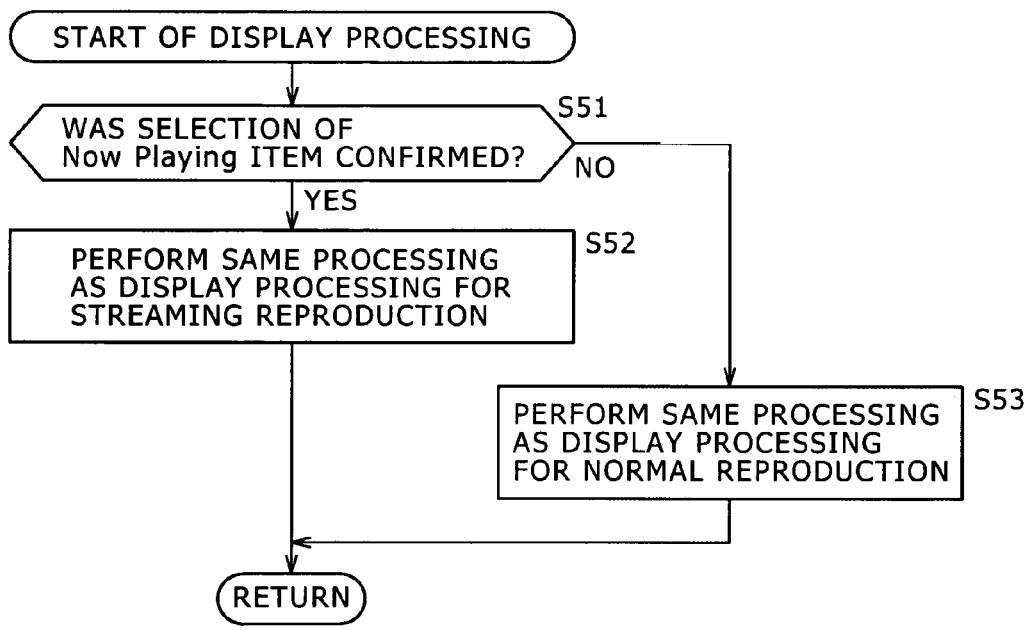
FIG. 39 shows another flowchart referred to in explanation of details of processing carried out at the step S11 of the flowchart shown in FIG. 34.

The flowchart shown in FIG. 39 begins with a step S51 at which, on the basis of an operation input received from the operation-input acquisition unit 871, the display control unit 875 produces a result of determination as to whether or not selection of the now-playing item appearing on the disclosed-playlist list display screen 701 shown in FIG. 31 has been confirmed. If the result of the determination indicates that selection of the now-playing item appearing on the disclosed-playlist list display screen 701 shown in FIG. 31 has been confirmed, the flow of the processing goes on to a step S52 at which the same processing as the processing represented by the flowchart shown in FIG. 35 is carried out. As a result, a display screen according to an apparatus serving as a source supplying a musical content to be reproduced in the music streaming reproduction process is displayed. In this way, if a reproduction process is carried out by an apparatus serving as a source supplying a musical content to be reproduced in the music streaming reproduction process to reproduce a musical content being reproduced in a streaming reproduction process, a display screen according to the apparatus serving as the source is displayed.

If the determination result produced at the step S51 indicates that the now-playing item appearing on the disclosed-playlist list display screen 701 shown in FIG. 31 has not been selected and/or the selection has not been confirmed, that is, if selection of a musical content included on a disclosed playlist shown in FIG. 32 has been confirmed, on the other hand, the flow of the processing goes on to a step S53 at which basically the same processing as the processing represented by the flowchart shown in FIG. 38 is carried out. As a result, if a streaming reproduction process is carried out to reproduce a musical content different from that being reproduced by an apparatus serving as a source supplying a musical content, a display screen determined in advance is displayed.

It is to be noted that, in this case, as a process corresponding to the step S36 of the flowchart shown in FIG. 38, it is necessary to carry out a process to produce a result of determination as to whether or not the streaming reproduction process has been completed in place of a process to produce a result of determination as to whether or not the normal reproduction process has been completed.

The above description has explained a case in which a musical content is reproduced in a streaming reproduction process. It is to be noted, however, that the present invention can also be applied to a case in which a content other than a musical content is reproduced in a streaming reproduction process.

The series of processes described previously can be carried out by hardware and/or execution of software. If the series of processes described above is carried out by execution of software, programs composing the software can be installed into a computer embedded in dedicated hardware, a general-purpose personal computer or the like from typically a recording medium. In this case, the computer or the personal computer serves as the information communication terminal 1 described above. A general-purpose personal computer is defined as a personal computer, which can be made capable of carrying out a variety of functions by installing a variety of programs into the personal computer.

The aforementioned recording medium for recording programs to be installed into a computer or a general-purpose personal computer as programs to be executed by the computer or the general-purpose personal computer respectively is typically a removable recording medium 172 provided to the user separately from the main unit of the computer as shown in FIG. 11. Examples of the removable recording medium 172 include a magnetic disk such as a flexible disk, an optical disk such as a CD-ROM (Compact Disk-Read Only Memory) or a DVD (Digital Versatile Disk), a magneto-optical disk such as an MD (Mini Disk, a trademark) as well as a semiconductor memory.

In this specification, steps of each program recorded on the recording medium can be carried out not only in a pre-prescribed order along the time axis, but also concurrently or individually.

It is worth noting that the technical term 'system' used in this specification implies the configuration of a confluence including a plurality of apparatus.

It is also to be noted that embodiments of the present invention are by no means limited to the embodiments described above. In addition, it is possible to make a variety of changes in a range not deviating from essentials of the present invention.

What is claimed is:

1. An information processing apparatus comprising:
 a display unit;
 a selection unit for selecting a user to establish communication with an external apparatus of the user;
 a communication unit for carrying out the communication with the external apparatus;
 a reproduction unit for reproducing a content;
 a determination unit for determining whether or not the content is streaming from the external apparatus;
 a control unit for changing a background of a content reproduction display screen appearing on the display unit based on user background information of the selected user acquired from the external apparatus based on a determination that the content is streaming from the external apparatus and for displaying the content reproduction display screen appearing on the display unit based on background information of the information processing apparatus based on a determination that the content is not streaming from the external apparatus; and
 a user interface for receiving a request to change from the content reproduction display screen to a display screen other than the content reproduction display screen, wherein, based on the request, the control unit displays the other display screen based on background information of the selected user acquired from the external apparatus and based upon the determination that the content is streaming from the external apparatus;
 wherein the content reproduction display screen is displayed based on a first set of attributes of the background information of the selected user acquired from the external apparatus and the other display screen is displayed based on a second set of attributes of the background information of the selected user acquired from the external apparatus.

2. The information processing apparatus according to claim 1 wherein:
   the background information of the selected user includes information on a color; and
   the control unit controls the display unit to change the background color of a specific area of the content reproduction display screen on the basis of the information on a color.

3. The information processing apparatus according to claim 2 wherein the control unit further controls the display unit to display at least a portion of information on the selected user in an area included in the content reproduction display screen.

4. The information processing apparatus according to claim 1 wherein:
   the background information of the selected user includes wallpaper information; and
   the control unit controls the display unit to change the background by changing the wallpaper of a particular area of the content reproduction display screen on the basis of the wallpaper information.

5. The information processing apparatus according to claim 4 wherein the control unit further controls the display unit to display at least a portion of information on the selected user in an area included in the content reproduction display screen.

6. The information processing apparatus of claim 1 wherein the control unit further comprises displaying information identifying the selected user in the content reproduction display screen when it is determined that the content is streaming from the external apparatus.

7. The information processing apparatus of claim 1 wherein determining that the content is not streaming from the external apparatus includes determining that the content being reproduced is a local content of the information processing apparatus.

8. The information processing apparatus of claim 1 further comprising a playlist manager for managing a playlist including content from multiple sources, wherein the control unit updates the content reproduction display screen or the other display screen based on a currently playing content.

9. An information processing method comprising:
   selecting a user to establish communication with an external apparatus of the user;
   reproducing a content using a reproduction unit;
   determining whether or not the content is streaming from the external apparatus;
   changing a background of a content reproduction display screen appearing on a display unit based on user background information of the selected user acquired from the external apparatus and based on a determination that the content is streaming from the external apparatus;
   displaying the content reproduction display screen changed at the screen changing step on the display unit based on the determination that the content is streaming from the external apparatus;
   displaying the content reproduction display screen on the display unit based on background information of the information processing apparatus based on a determination that the content is not streaming from the external apparatus; and
   receiving a request to change from the content reproduction display screen to a display screen other than the content reproduction display screen, wherein, based on the request, the other display screen is displayed based on background information of the selected user acquired from the external apparatus and based on the determination that the content is streaming from the external apparatus;
   wherein the content reproduction display screen is displayed based on a first set of attributes of the background information of the selected user acquired from the external apparatus and the other display screen is displayed based on a second set of attributes of the background information of the selected user acquired from the external apparatus.

10. A recording medium recorded with a computer-readable program which causes a computer to implement a method comprising:
   selecting a user to establish communication with an external apparatus of the user;
   reproducing a content;
   determining whether or not the content is streaming from the external apparatus;
   changing a background of a content reproduction display screen appearing on a display unit based on user background information of the selected user acquired from the external apparatus and based on a determination that the content is streaming from the external apparatus;
   displaying the content reproduction display screen changed at the screen changing step on the display unit based on the determination that the content is streaming from the external apparatus;
   displaying the content reproduction display screen on the display unit based on background information of the information processing apparatus based on a determination that the content is not streaming from the external apparatus;
   receiving a request to change from the content reproduction display screen to a display screen other than the content reproduction display screen, wherein, based on the request, the other display screen is displayed based on background information of the selected user acquired from the external apparatus and based on the determination that the content is streaming from the external apparatus;
   wherein the content reproduction display screen is displayed based on a first set of attributes of the background information of the selected user acquired from the external apparatus and the other display screen is displayed based on a second set of attributes of the background information of the selected user acquired from the external apparatus.

* * * * *